United States Patent
Gilmore et al.

(10) Patent No.: US 10,089,703 B2
(45) Date of Patent: Oct. 2, 2018

(54) REALTIME LAND USE RIGHTS MANAGEMENT WITH OBJECT MERGES

(71) Applicant: Tracts.co

(72) Inventors: Ashley A. Gilmore, Houston, TX (US); David L. Dewey, Grapeview, WA (US); Robert Anderson, Salt Lake City, UT (US); Gerald Gilmore, Houston, TX (US)

(73) Assignee: CHAINLINK TECHNOLOGIES, Houston, TX (US)

( * ) Notice: Subject to any disclaimer, the term of this patent is extended or adjusted under 35 U.S.C. 154(b) by 0 days.

(21) Appl. No.: 15/968,671

(22) Filed: May 1, 2018

(65) Prior Publication Data

US 2018/0247384 A1    Aug. 30, 2018

Related U.S. Application Data

(63) Continuation-in-part of application No. 15/430,441, filed on Feb. 10, 2017.

(60) Provisional application No. 62/293,348, filed on Feb. 10, 2016.

(51) Int. Cl.
*G06Q 50/16* (2012.01)
*G06Q 50/18* (2012.01)
*G06Q 40/00* (2012.01)

(52) U.S. Cl.
CPC ........... *G06Q 50/165* (2013.01); *G06Q 40/12* (2013.12); *G06Q 50/16* (2013.01); *G06Q 50/167* (2013.01); *G06Q 50/18* (2013.01)

(58) Field of Classification Search
CPC .... G06Q 50/16; G06Q 50/165; G06Q 50/167; G06Q 50/18; G06Q 40/12
See application file for complete search history.

(56) References Cited

U.S. PATENT DOCUMENTS

2011/0035304 A1* 2/2011 Moore ................. G06Q 10/025
705/35
2016/0140677 A1* 5/2016 Hejny ................. G06Q 50/163
705/40

FOREIGN PATENT DOCUMENTS

WO    WO-2017049344 A1 * 3/2017 ............. G06F 15/16

OTHER PUBLICATIONS

Luccio, Matteo, "Recording, Registration, and Cadastres," Sep. 6, 2017, www.xyht.com/suveying/recording-registration-cadastres/ (Year: 2017).*

* cited by examiner

*Primary Examiner* — Carrie S Gilkey
(74) *Attorney, Agent, or Firm* — Compass IP Law PC

(57) ABSTRACT

Land use rights management where land use rights are represented as bounded space, and portions of rights are represented as portions of whole rights. The portions are specifically designated subspaces within the bounded space. Rights or ownership interests can be determined by a set or array of interests as indicated by separate computer objects. Conveyances that indicate a split of rights causes the generation of multiple separate interests. Conveyances that indicate a merger of rights can cause the generation of a merged interest where rights from multiple sources can be combined in one interest as indicated by a single computer object. The merged interest can reduce the number of individual rights in the set to enable the computer to perform more efficient computation of ownership interests.

16 Claims, 30 Drawing Sheets

OWNERSHIP 1100

| OWNER | ADDRESS | SURFACE | EXECUTIVE | BONUS | DELAY | ROYALTY | NPRI | WI | NRI | NOR | OI |
|---|---|---|---|---|---|---|---|---|---|---|---|
| STATE | | 1.00000000 | | | | | | | | | |
| A | – | – | 0.50000000 | 0.75000000 | 0.75000000 | 0.50000000 | 0.50000000 | – | – | 0.12500000 | – |
| D | | | | | | | | 0.50000000 | 0.37500000 | | |
| B | – | – | 0.50000000 | 0.25000000 | 0.25000000 | 0.50000000 | 0.50000000 | – | – | – | – |

IH1     H1

REFRESH     EXPORT     CLOSE

FIG. 11

| RUNSHEET 1200 | | | | | | | |
|---|---|---|---|---|---|---|---|
| GRANTOR | GRANTEE | TYPE | DATE | RECORDED | BOOK | PAGE | INSTRUMENT |
| STATE | A | DEED | 1750-01-01 | | | | |
| A | B | DEED | 1755-01-01 | | | | |
| B | C | DEED | 1765-01-01 | | | | |
| C | B | DEED | 1800-01-01 | | | | |
| B | A | DEED | 1900-01-01 | | | | |
| A | D | LEASE | 2000-01-01 | | | | |
| D | A | ASSIGN | 2010-01-01 | | | | |
| D | | ASSIGN | 2015-01-01 | | | | |

REFRESH  EXPORT SPREADSHEET  EXPORT FILES  CLOSE

FIG. 12

```
                    PSEUDOCODE 1300

1302    CREATE OBJ {
1304            ID NAMES;
1306            ID PROPERTY;
1308            ID PROPERTY RIGHTS;
1310            GENERATE RIGHTS SETS AS RANGES;
1312            PERFORM SET OPERATIONS TO DEFINE OBJ RIGHTS;
1314            GENERATE NEW INSTANCE WITH DEFINED RIGHTS;
1316            GENERATE CHAIN RELATIONSHIPS;
1318    }
```

FIG. 13

```
                    PSEUDOCODE 1400

1402    DISPLAY OBJ {
1404            GENERATE OBJ GUI FOR OBJ TYPE;
1406            ID RELATIONSHIPS FOR OBJ;
1408            ID SOURCE AND CHILD OBJ;
1410            COMPUTE RIGHTS SETS AS RANGES;
1412            GENERATE CHAIN GRAPHICS;
1414            IF INTERACTION RECEIVED {
1416                    HIGHLIGHT RELATIONSHIPS;
1418            }
1420    }
```

FIG. 14

REALTIME LAND USE RIGHTS MANAGEMENT WITH OBJECT MERGES

PRIORITY

This application is a continuation-in-part of U.S. patent application Ser. No. 15/430,441, filed Feb. 10, 2017, and entitled "Realtime Land Use Rights Management", which in turn is a nonprovisional of U.S. Provisional Patent Application No. 62/293,348, filed Feb. 10, 2016. This application claims the benefit of priority of these prior applications, which are hereby incorporated by reference.

FIELD

Descriptions herein relate generally to property and land use rights tracking, and more particular descriptions are related to realtime tract rights management based on weighting land use rights instead of using scalar percentages.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2016, 2017 Tract.co. All Rights Reserved.

BACKGROUND

Real property ownership has long been the basis of wealth in human society. Real property ownership can accompany certain rights to use the land that is the subject of the real property ownership. One right that has long been part of the governance of real property is surface and mineral ownership rights. Mineral ownership is traditionally made up of multiple different rights, often referred to a "bundle of sticks." Such sticks or rights can include: Executive rights, or the right to lease; Bonus rights, or the right to receive bonus; Delay rights, or the right to receive delay rentals; Royalty rights, or the right to receive royalty; and, Ingress/Egress rights, or the right to enter property.

Each right can be severed from any other, and can be separately conveyed or reserved. Each right ties back to the other. In addition to being able to separately convey individual rights, each right can be conveyed in whole or in part, and based on specified extents of horizontal property coordinates (i.e., specified plots), depth, in time, and separately for different minerals. The conveyances can thus result in multidimensional tracking problems, where each separate right can be conveyed in any of the other dimensions or axes of extent of conveyance.

Natural human understanding is generally limited to conceptualizing in three dimensions, since we are familiar with three dimensional space. However, when property rights management can involve five or six dimensions, depending on how the rights are split, it is outside normal human conceptual understanding. As a result, despite hundreds of years of such property rights conveyances, there are no solutions to guarantee that the conveying party has the ability to convey the exact rights promised.

Thus, throughout history and even today, interest is error prone and tracked totally by hand. The modern creation of spreadsheets has brought more order to the issue, but the author must traditionally set to memory the individual's names and aliases and do the best job they can of tracking the interest throughout time as mergers of interest collide across the title chain. All forms of charts are complicated and nearly impossible to interpret or follow, and do not enable the natural tracking of all possible dimensions.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

FIG. 11 is a representation of an embodiment of a graphical ownership report.

FIG. 12 is a representation of an embodiment of a graphical runsheet report.

FIG. 13 is a representation of an embodiment of pseudocode for a conveyance management engine.

FIG. 14 is a representation of an embodiment of pseudocode for a display of a conveyance management engine.

Figure 1A:
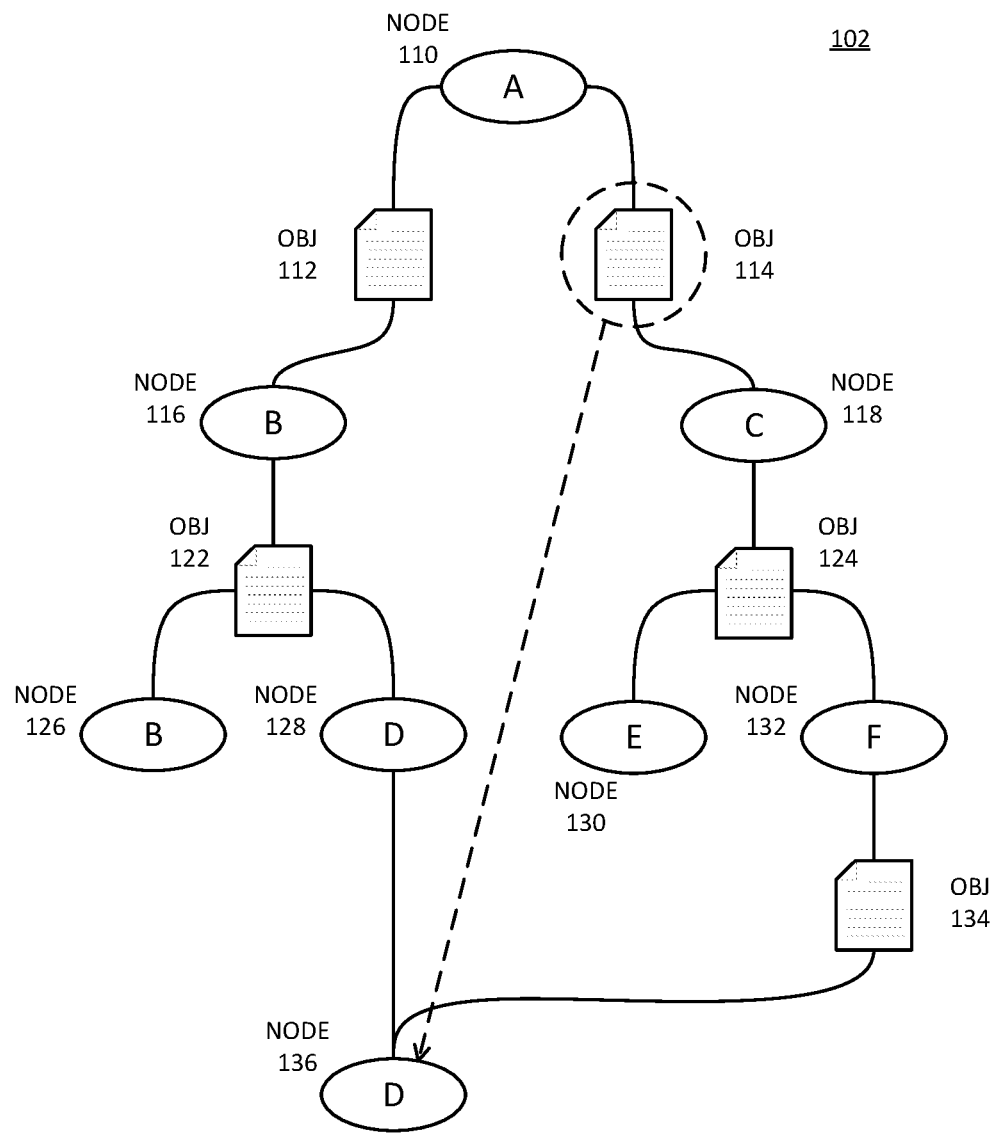
FIG. 1A is a representation of an embodiment of a conveyance flowchart illustrating influence of one conveyance document over another portion of the chain of title.

Descriptions of certain details and embodiments follow, including a description of the figures, which can depict some or all of the embodiments described below, as well as discussing other potential embodiments or implementations of the inventive concepts presented herein.

DETAILED DESCRIPTION

As described herein, a system provides realtime land use rights management. The realtime land use rights management represents in real time the conveyance information entered. The system computes chain of title information in multidimensional space to provide an accurate representation of rights conveyed. The system can implement land rights objects that include properties that have ranges of affected rights. In one embodiment, the system generates an interactive graphical model of the chain of title. Such a model can be or include a flowchart illustrating conveyance information and relationships between conveyance instruments. The system can compute and graphically represent relationships between conveyance instruments or documents. In one embodiment, the graphical representations include lines or other graphical relationships connecting conveyance instruments to indicate influence of one instrument to other instruments downstream (later in time) and/or show influence based on source (documents earlier in time).

In one embodiment, the management system includes computer equipment configured to execute a management engine. The management engine includes configuration to compute conveyance information in multiple dimensions. In one embodiment, the management engine generates objects that manage the multidimensional conveyance information and relationships. In one embodiment, the management system includes a rendering engine to generate a graphical representation of the conveyance information.

The management system represents a land use right as a bounded space. In one embodiment, the system generates or modifies one or more objects that include the bounded space information as operable properties of the object. The object can be generated as multiple instances to represent distinct transactions and historical documents related to the property rights. The object instances can include relationships that manage the influence of one transaction on another, including traceable rights to source and to children or progeny of the documents, referring to conveyance transactions and information that comes later in time.

Within the management system, the right can be conveyed in whole or in part, and the management system creates a representation of a partial right as a portion of the whole right, which is a specifically designated subspaces within the bounded space. In one embodiment, the partial right is represented as an interval, or a vector, or other weighted object, which includes specific upper and lower bounds within the bounded space. For example, the whole bounded space can be represented as having an interval of 1.0, and a half portion can have an interval of 0.5. However, instead of only having a scalar value to represent the amount of the portion, as has previously been done, the management system represents a half portion specifically by the upper and lower bounds of the conveyance. For example, a half portion can be an interval of 0 to 0.5, or 0.25 to 0.75. Thus, the management system can accurately track not only the scalar amounts of conveyances, but also preserve the precise rights conveyed. By making the specific intervals be operable properties of the weighted object, the system can track whole or partial conveyance of specific rights across multiple dimensions, and represent the information in a manner that is trackable and understandable to a person.

Consider a specific example where A has 100% of the executive right and B has 100% of the royalty of the exact same plot of land. B has no right to lease, but only to receive a Royalty from the lease that A signs. The management system can represent A's rights as 0-1 for executive rights of a specific plot of land, and B's rights as 0-1 for royalty rights for the same plot. As the example stands, there is little confusion. However, if A and/or B further convey portions of rights to other parties who may then also convey all or portions of rights, and certain parties convey rights to each other, it can become difficult if not impossible to track who has what rights. However, the management system can keep track of specific conveyances and preserve the conveyance information through the entire chain of title.

Consider a second specific example where A has 100% of everything and conveys 50% to B and 50% to C. B then severs the Executive right and conveys it to C. If C later severs his executive right and gives it to B, when C signs a lease he is now leasing B's Royalty and when B signs a lease he is leasing C's Royalty. The royalty and the executive rights tie directly back to the original interest they were severed from. This is a relatively simple example considering it deals with only the severing of two rights from the whole, and considering a single plot of land.

However, in practice all rights can be severed on any axis and throughout time, which can create a 6 dimensional space to be tracked. The axes of the 6 dimensional space can include an x-axis and a y-axis indicating horizontal or acreage splits, a z-axis indicating depth or formation, a t-axis indicating time, an m-axis indicating mineral type, and an r-axis indicating type of right. An example of x-axis and y-axis severing can include A conveying the Southeast quarter of a 10-acre tract named Whiteacre to B. An example of a z-axis severance is that any one or more of the rights can be conveyed for any depth (e.g., 1000'-2000') or formation (the Eagleford Resource formation). An example of a t-axis severance can include C conveying a 5-year term lease or a life estate to D. An example of an m-axis severance can include E conveying rights for any one or more (separately or together) of oil, gas, coal, or other mineral rights, or a combination. The r-axis can also be referred to as an "interest axis," referring to how much interest is owned in each of the "bundle of sticks."

In one embodiment, the management system tracks each element of information about mineral ownership and/or other land use rights and relates them to each other. In one embodiment, the management system represents each mineral ownership or land use right ownership as an interval on the real number line. For example, the management system can use any consecutive interval as defined in the system, such as the interval from 0 to 1 to represent 100% ownership of a specific right. Such a system using the interval from 0 to 1 can subdivide the ownership into portions of the whole, for example, down to hundredths (0.01 granularity) or thousandths (0.001 granularity). Alternatively, a system could use an interval of 0 to 100, 0 to 1000, or other interval as will be understood by those skilled in the art. The intervals create a bounded space to represent ownership of a right.

For any conveyance of rights, the management system can apportion or represent the conveyance as a specific sub-portion or sub-interval of the interval. The portion of rights conveyed can also be a bounded space within the bounded space of the whole. For example, if A owns 100% and conveys 50% to B and 50% to C, the management system can represent the rights ownership as B having interval 0 to 0.5, and C having interval 0.5 to 1. A will now have nothing. This allows every piece of information related to mineral ownership and/or land use rights to be tied back to where the right originated. Thus, for example, every ownership can be related back to specific conveyances and specific source rights that resulted in the rights conveyed.

In one embodiment, the management system manages rights including computation of rights and ownership. The system can compute the subdivisions of rights, and determine specifically what rights were conveyed. In one embodiment, when intervals or other vectors or comparable mechanism is used, the management system can use set theory operations to perform conveyance calculations. Such set operations can include set intersections, unions, negations, subtractions, or other set theory operations, or a combination. Thus, the system can operate on an object or object instance with set operators to perform modifications to rights, either generating a new object with the changed information (e.g., a new instance), or modifying an object instance, or both.

It will be understood that an object refers to a defined structure of properties, including configuration properties and operational properties. The configuration properties define the values associated with the fields of the object structure. The operational properties refer to interfaces, calls, permissions, and other elements of an object that define its use, operation, interaction, or other implementation. An object typically refers to a class or type of component that can be created in accordance with the defined object structure, and an instance refers to that structure populated with information in at least one of the fields. Typically an instance is given a handle or name or other mechanism to call the object instance for use.

Returning to the discussion of computation of rights and ownership, consider the following example: Assume A owns 100% royalty rights, which A splits between B and C. A started out with [0-1], and B ends up, for example, with [0-0.5], and C with [0.5-1]. It will be understood that the endpoints of rights ownership intervals can represent asymptotes, in which the parties do not have overlapping rights, but the whole rights can be represented. Assume now that B conveys 50% rights (interval [0.25-0.5]) to D, and C splits its rights to E and F, with E owning [0.5-0.75] and F owning [0.75-1]. D can acquire F's rights and own the royalty rights on the interval [0.25-0.5, 0.75-1]. As such, D owns 50% of the total royalty for the tract, but the management system can identify what specific portions are owned by D. Such specificity of portions is different than traditional methods of tracking, which would simply indicate that D owns 50%, and further information would be needed to try to track down what is represented by D's ownership.

Assume now that G owns the executive rights on the interval [0-0.45, 0.95-1], which is coincidentally also 50%. If G executes a lease, to figure what royalty from the lease applies to D's royalty ownership, in one embodiment, the management system intersects D's royalty interval with the leased executive interval of G, to generate the new interval [0.25-0.45, 0.95-1], which is the portion of D's royalty that is affected by G's lease, or 25% of total tract royalty. By tracking the specific intervals, the management system easily and accurately tracks the relationship of G's lease document to D's royalty rights. Again, consider the difference in simply saying that G owns 50% of executive rights, and trying to track down whether and how much of G's 50% affects D's 50% ownership. What appears on its face as a simple question can have significant complexity, which can be managed by the system described herein that generates and manages weighted objects to track specific conveyance information.

Referring specifically to mineral rights for one example, it will be understood that multiple intervals of different ownership rights and multiple mineral depths, acreages, geologic formations, minerals, and/or other severances and ownership-related objects can be represented and operated on using set theory, in accordance with what is described herein. The contents of a set can be represented in many ways.

In one embodiment, the management system generates an expression including a union of terms, where each term is an intersection of objects. In one embodiment, another representation is an intersection of terms where each term is a union of objects. The unioned term representation can be converted to the intersected term representation with an algorithm applying the distributive law.

In one embodiment, the following set operations can be applied by the management system.

Sets can be unioned by converting all sets to the unioned term representation, then combining all of their terms, then simplifying out redundant terms. Similarly, sets can be intersected by converting all representations to intersections of terms, combining terms, and simplifying out redundant terms.

A set can be negated by negating each object in the set (such as by applying a Boolean negation flag to each object in the set, or by performing a negation operation on the object, if it supports one) and converting every union to intersection and every intersection to union (e.g., applying deMorgan's law).

Two sets can be "subtracted" (i.e., keep everything in set A that isn't in set B) by negating set B and intersecting the result with set A.

The examples above do not provide an exclusive list of set operations the management system can apply, and are to be understood illustratively rather than restrictively. In one embodiment, the management system includes set operation capability defined in in code, to compute the sets of ownership that each owner ends up with after each legal instrument is applied to the title chain. As in the simple interval example above, it allows different pieces of ownership to be related back to each other via intersection and other operations to determine which part of which ownership applies to which part of other ownerships, and thus distribute lease royalties and other interests correctly.

FIG. 1A is a representation of an embodiment of a conveyance flowchart illustrating influence of one conveyance document over another portion of the chain of title. Diagram 102 represents a conveyance from A to B and C, a partial conveyance from B to D, a full conveyance from C to E and F, and a conveyance from F to D. While percentages of ownership transfer are not shown, it will be understood that any amount of conveyance of any rights could be represented by the various conveyance documents shown. As illustrated, the last conveyance includes a conveyance from F to D, in which case the conveyance from A to C will influence the ownership rights of D.

For purposes of illustration, the elements designated as letters (i.e., A, B, C, D, E, F) represent objects that indicate ownership associated with a named party, where the letters represent the different parties. It will be understood that parties to a transaction or conveyance can include natural persons or individuals, groups of individuals, legal entities (e.g., a company, a trust, or other), groups of legal entities, or a combination. The object elements that indicate the ownership interest associated with a party are referred to as nodes. Thus, the initial node 110 indicates the whole ownership interest of party A, which is then conveyed as provided in diagram 102. It will be understood that A's ownership interest can be the whole ownership interest of a piece of real property, or could be a partial ownership, where diagram 102 only focuses on the dependent or child transactions of A's interest. Thus, diagram 102 does not necessarily indicate all dispositions of land that is the subject of the illustrated transactions.

For further purposes of illustration, the elements represented by document icons represent objects that indicate a conveyance of a part or all of one or more rights. For purposes of convention, if one party has a node prior to a conveyance, and does not have a node after the conveyance, the conveying party's interest can be considered to be completely conveyed. For example, node 110 represents A's interests, which are completely divested to B and C through object 112 (conveyance to B) and object 114 (conveyance to C) as illustrated respectively by nodes 116 and 118. In contrast, when a party includes a node before and after a conveyance, at least a portion of rights are retained. For example, node 116 represents B's interests, which are split via object 122 to B (at node 126) and D (at node 128).

It will be observed that separate conveyance documents can be used to convey to separate parties, or a single conveyance document can convey to multiple parties. For example, object 112 represents a conveyance document that provides rights to B, and is separate from a conveyance document represented by object 114 to provide rights to C. Both objects 112 and 114 provide rights from A, but are separate documents, and are thus represented by separate objects. In contrast, object 122 represents a conveyance document that provides rights to B and D, and thus, a single conveyance document as represented by a single objet 122 provides rights to both B and D. Similarly, the rights of C as represented at Node 118 are passed to E (as represented at node 130) and F (as represented at node 132) through a common conveyance document as represented by object 124.

Diagram 102 also illustrates object 134 to represent a conveyance of F's rights to D at node 135. It will be understood that node 128 represents D's rights as provided by object 122, and node 136 includes more rights, which include the rights represented at node 128 and the rights conveyed by object 134 to D. Thus, a party's right can be subtracted (as represented by node 126 of B after the conveyance of object 122) or added to (as represented by node 146 of D after the conveyance of object 134).

In one embodiment, nodes and objects represent different object types. In one embodiment, nodes are part of an object, or objects are part of the same object as a node. A node includes structured information to represent a real party in interest, the type of rights possessed, and one or more ranges indicating the amount of ownership of one or more rights. Thus, nodes can represent one or more or all rights owned by the indicated party. In one embodiment, the ranges represent bounded regions to indicate specific rights types and amounts of rights. However, bounded spaces indicate not only the amount or percentage of rights, but what specific portion of rights are possessed. For example, ownership of [0.3-0.8] is 50% ownership, as is [0.25-0.5, 0.75-1], but the specific portion of rights are different, and will have different sources, and can be separately managed as described herein.

The document objects represent conveyance document objects. The conveyance document objects include information to identify the conveying party and the receiving party, and the portion of rights conveyed. As with node objects, the conveyance objects include bounded space to identify the specific regions conveyed. It will be understood that conveyance documents do not explicitly indicate a bounded space that is to be conveyed. Rather, the conveyance documents indicate specific metes and bounds of the real property rights being transferred. The management system as described herein converts the metes and bounds into a bounded space to represent the conveyance. Thus, the system converts detailed conveyance information into a bounded space of a structured data representation or object of the management system.

Diagram 102 also illustrates another feature of the management system that becomes clear in the management system, which is not easily recognizable in traditional tracking methods. It will be observed that D's rights at node 128 derive solely through object 112 via the conveyance from A to B. Until node 128, object 114 representing the conveyance from A to C has no direct influence on D's rights. Rather, until node 128, object 114 could be considered only to illustrate what is not conveyed through object 112, and seeing that B retains an interest, it could be said that D's entire interest is illustrated comes through object 112.

However, it will also be observed that all of F's interest is derived through object 114. Therefore, when F makes a conveyance to D through object 134, object 114 now influences D's interests at node 136. Therefore, what previously had no relationship now has a relationship or an influence. Reference to an "influence" refers to the fact that rights possessed by a party are at least partially derived through an instrument. A relationship refers to either a source (earlier in time) of rights or a receiver (later in time) of rights. The relationship identifies that the two objects are connected through chain of title, and the influence can identify the specific amount that is derived or granted with respect to a source or receiver, respectively.

While the chain of title can trace D's interests at node 136 to a conveyance document represented by object 114, with diagram 102, it can be readily seen that the conveyance of object 114 influences node 136. Also, the specific amount of influence can be represented by the bounded spaces of the ranges in the objects.

Figure 1B:
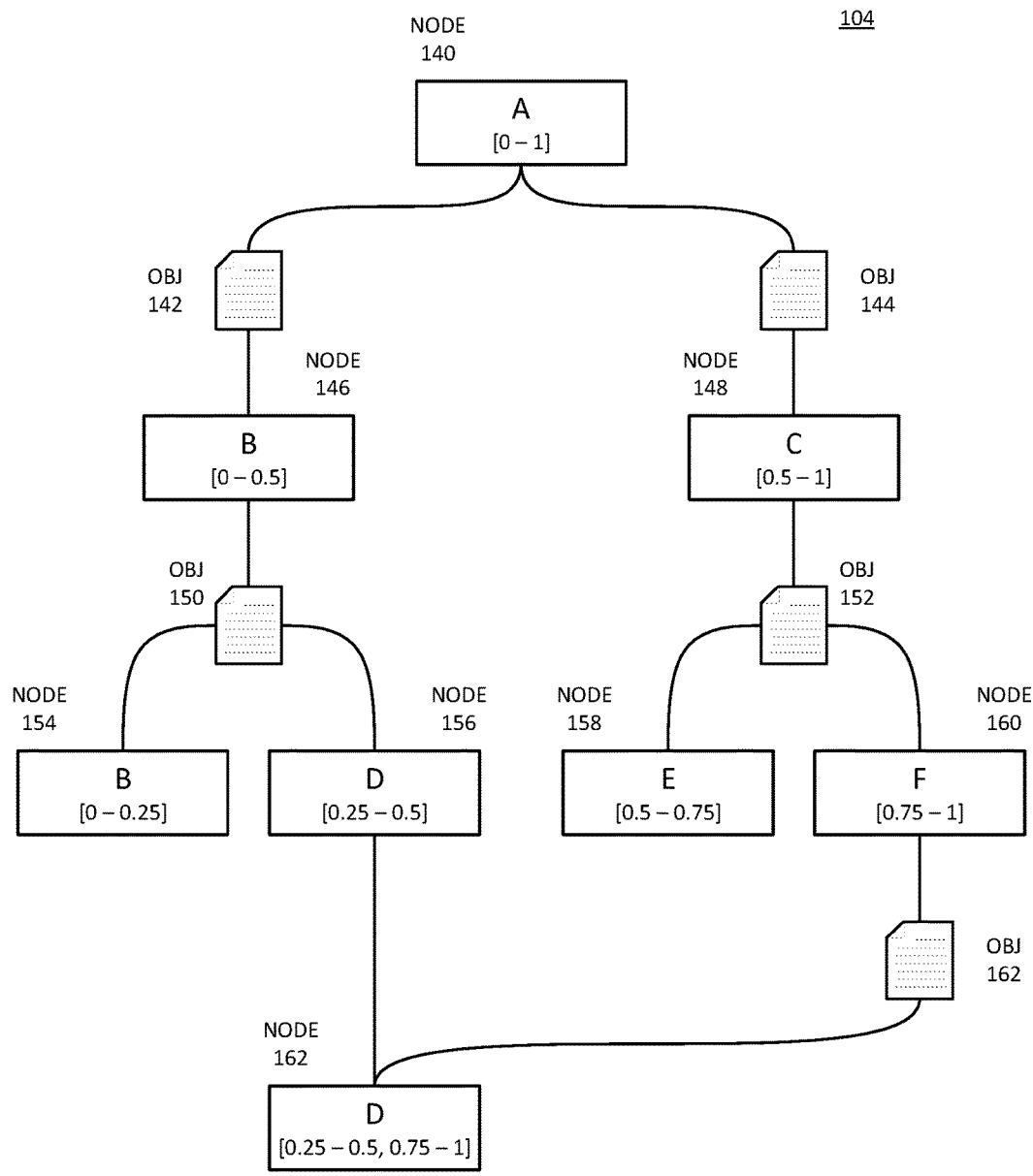
FIG. 1B is a representation of an embodiment of a conveyance flowchart illustrating ownership in accordance with interval sets.

FIG. 1B is a representation of an embodiment of a conveyance flowchart illustrating ownership in accordance with interval sets. Diagram 104 provides an alternative view of diagram 102 of FIG. 1A. More specifically, diagram 104 illustrates the same conveyance scenario as diagram 102, and illustrates specific conveyance portions. While equal percentage conveyances are illustrated, it will be understood that any percentages could be conveyed. Diagram 104 can be considered one non-limiting example of diagram 102, as it will be understood that an infinite combination of portions and conveyances can be represented for diagram 102.

Referring diagram 104, in one embodiment, a management system represents conveyances via intervals that indicate amount of ownership, as well as the specific boundaries of the rights ownership. For example, after conveyance from A, B owns a 50% ownership, and specifically the interval from [0-0.5]. It will be understood that the conveyance documents can represent one or more conveyance documents each. A single conveyance document can illustrate a conveyance to one party or to multiple parties. Multiple conveyance documents can be used to perform conveyances.

Node 140 represents a state or condition where A owns all of a property [0-1]. After conveyances represented by object 142 and object 144, two new states of possession exist. Namely the states represented by node 146 where B owns [0-0.5], and node 148 where C owns [0.5-1].

The conveyance represented by object 150 provides the new ownership states of node 154 where B owns [0-0.25], and node 156 where D owns [0.25-0.5]. The conveyance represented by object 152 creates new ownership states represented by node 158 where E owns [0.5-0.75], and node 160 where F owns [0.75-1]. Again, it will be understood that equal portions are represented merely to represent a simple case for illustration, but any range or combination of ranges can be conveyed.

The conveyance represented by object 162 transfers F's interest to D, which changes the state of ownership of D to be represented by node 162 where D owns [0.25-0.5, 0.75-1]. It will be observed that object 162 does not affect or influence the B's ownership interest in node 154 or E's ownership interest in node 158. Thus, those states of ownership remain valid, and D's and F's ownership interests have combined in D.

Any combination of scenarios is possible. The example of diagram 104 provides a simple illustration of how ownership interests can be tracked across various branches of a chain of title tree, and accounted for by the use of bounded space representations for the interests in the objects.

Figure 2:
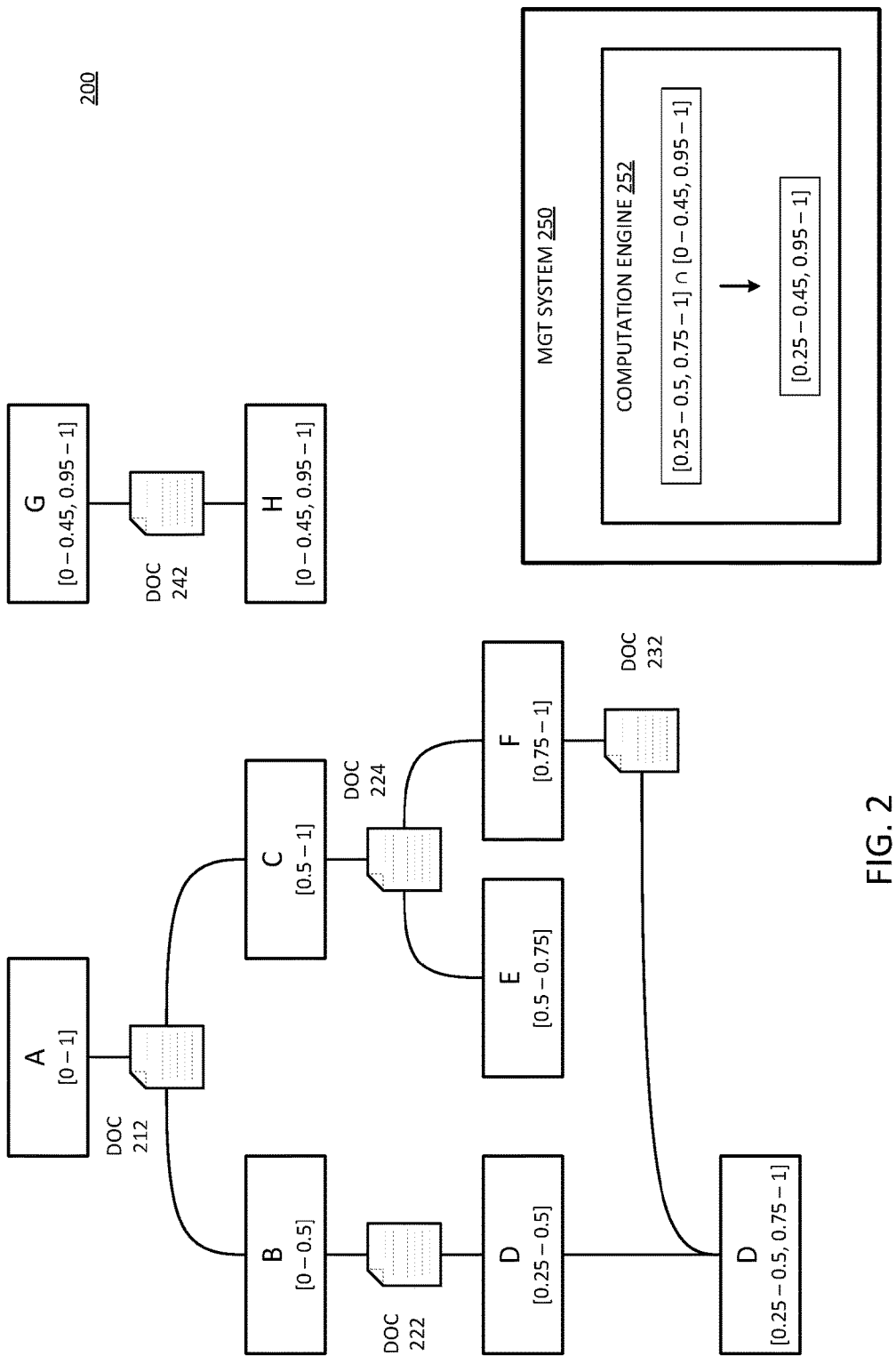
FIG. 2 is a representation of an embodiment of conveyance information in accordance with interval sets where a management system computes relationships based on set operations.

FIG. 2 is a representation of an embodiment of conveyance information in accordance with interval sets where a management system computes relationships based on set operations. System 200 illustrates two conveyance chains and an operation of the management system based on those two chains. Thus, system 200 illustrates how the management system can utilize set operators to compute interests managed as bounded spaces.

As illustrated, system 200 includes a conveyance chain for royalty rights from A to B and C, from B to D, from C to E and F, and from F to D. System 200 also includes a conveyance chain to represent an executive right. In one embodiment, the management system represents the conveyances based on intervals. For the royalty rights, consider a scenario in which A conveys [0-0.5] to B through document (doc) 12, and [0.5-1] to C through document 212, representing the rights as bounded intervals. It will be observed that documents in system 200 are referred to as "documents" rather than objects as in the previous diagrams. The change in convention is simply for purposes of illustration, to indicate that the conveyance object represent actual documents that convey interests. Thus, in system 200 the objects that represent the conveyance of interests are referred to as documents. Such documents within the context of system 200 can be understood to be object representations of the actual documents. While the actual documents will make conveyance based on specified portions of land, system 200 represents the conveyances through the objects as bounded space intervals.

The conveyances of document 212 produce ownership states in B and C. B then conveys an interest in [0.25-0.5] to D through document 222, and C conveys interest in [0.5-0.75] to E and an interest in [0.75-1] through document 224. Finally, F conveys an interest in [0.75-1] to D through document 232, and D owns [0.25-0.5, 0.75-1]. The royalty rights are simple enough to follow, and mirror what is provided in diagram 104. However, when multidimensional issues arise, following the rights becomes more complex. For example, the conveyance of G to H can represent a lease to H for [0-0.45, 0.95-1] via document 242. In one embodiment, to determine the effect of G's conveyance to H on D's rights, the management system can compute an intersection of D's interval set with H's interval set. In one embodiment, management system 250 can perform any of a variety of set operations on the sets to determine ownership. As illustrated, computation engine 252 of management system 250 executes the computations including the set operations to indicate an effect for D of [0.25-0.45, 0.95-1]. In one embodiment, computation engine 252 computes the intersection of [0.25-0.5, 0.75-1] with [0-0.45, 0.95-1] to result in [0.25-0.45, 0.95-1].

Management system 250 with computation engine 252 can compute any type of interest relationship based on the set operations on the intervals of the interacting objects. In the example provided, the object of the state of H's interest and the object of the state of D's interest are the interacting objects, and the intervals indicated result in an output object that provides for D's rights. Because the intervals preserve the specific portions of land, and the set operators preserve the relationship of the intervals, the management system can produce computations that are highly reliable. Furthermore, the rights computed can be translated back to specific identifiable land portions based on the understanding of the intervals.

Figure 3:
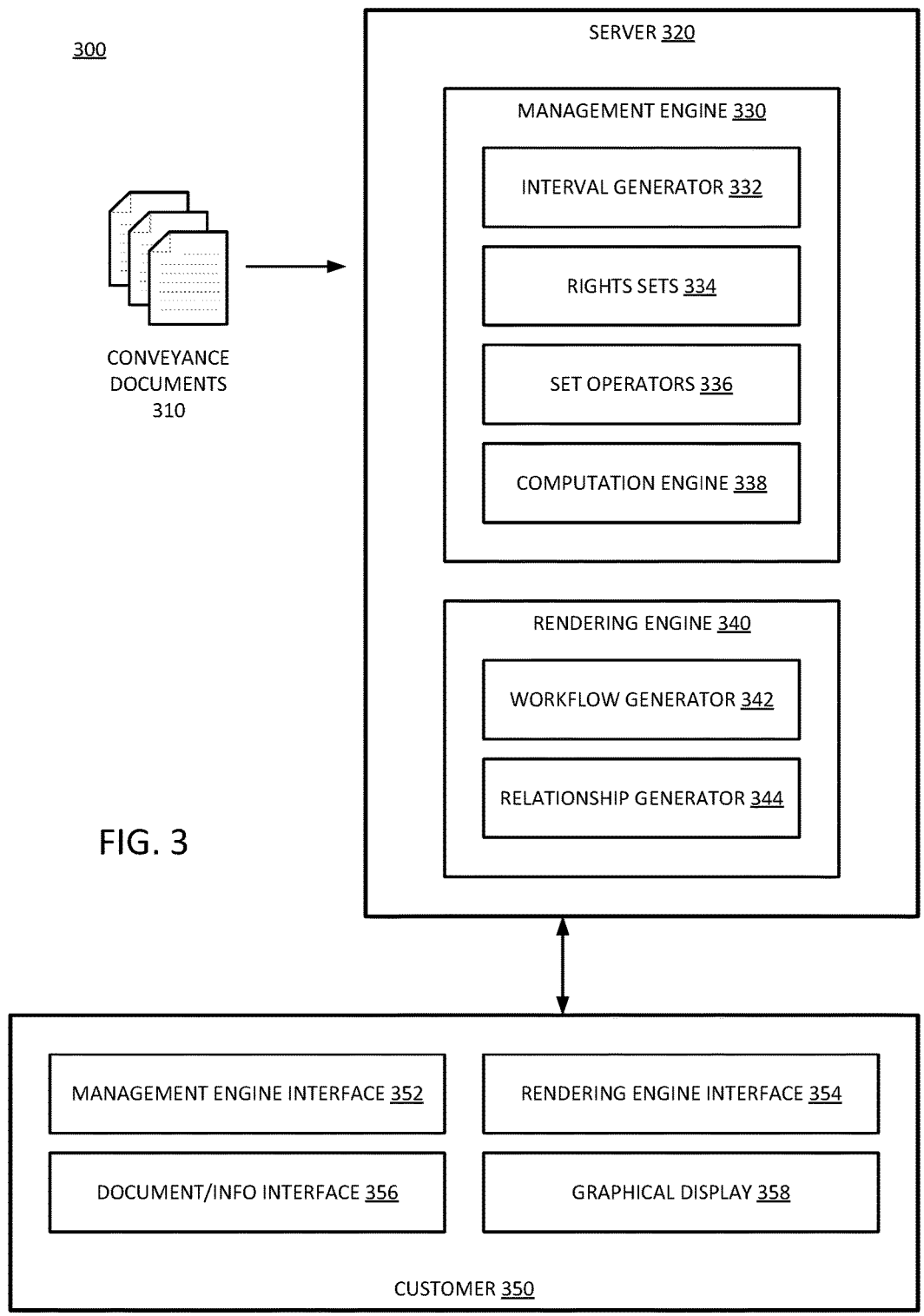
FIG. 3 is a block diagram of an embodiment of a management system.

FIG. 3 is a block diagram of an embodiment of a management system. Management system 300 represents elements that can be a part of a management system in accordance with any embodiment described throughout. Not all components will necessarily be in all management system implementations. Certain management system implementations can include elements not illustrated in system 300.

In one embodiment, management system 300 includes server 320 and customer 350. Such a management system can operate as a remote server accessed in a server-client relationship. In one embodiment, server 320 includes management engine 330 or rendering engine 340, or both. In one embodiment, server 320 provides code to customer 350, which then executes the code at the customer end rather than executing at the server end. In one embodiment, management system 300 executes the code at the server end and provides a display to customer 350.

In one embodiment, server 320 includes management engine 330. Management engine 330 can include code to be executed at the customer. Management engine 330 can include code to be executed at a server side, remote from customer 350, or over a network from customer. It will be understood that remote from the customer refers to executing on different hardware than the hardware with which a customer user interfaces. Management engine 330 can be or include a computation engine. In one embodiment, management engine 330 includes interval generator 332, rights set generator 334, one or more set operator engines 336, and computation engine 338. In one embodiment, reference to an engine can refer to the execution of a function or routine by computing hardware. Thus, the code representing the function or the routine or call can configure and guide the execution of the processing hardware to generate a transformation of data from one state to another.

In one embodiment, computation engine 338 can include set operators 336. Interval generator 332 enables management engine 330 to generate interval objects to track specific bounded ownership rights. In one embodiment, rights set generator 334 and rights sets enable management engine 330 to manage rights as sets of rights, which can then be operated on in accordance with set operations by set operators. Set operators 336 represent the ability or the engine of management engine 330 to perform set operations to manage land use rights, including the multidimensional issues associated with land use rights tracking. Set operators 336 can include code to perform specific set operations. Computation engine 338 enables management engine 330 to perform the set operations to compute ownership of rights in multiple dimensions.

In one embodiment, server 320 includes rendering engine 340. In one embodiment, rendering engine 340 includes workflow generator 342, which can enable rendering engine 340 to use conveyance information to generate a graphical representation of ownership after the conveyances. In one embodiment, workflow generator 342 can generate multiple different types of workflow representations. For example, in one embodiment, a standard workflow can show conveyance documents and relationship between them and the relationship of the conveyance documents to the parties of the conveyances. Other workflows, such as a tree structure, a timing workflow, or other workflows can be created. The workflow can be thought of as a mapping or indexing of conveyance information. In one embodiment, a workflow can include standard conveyance document layout information layered with party information.

In one embodiment, rendering engine 340 includes relationship generator 344. Relationship generator 344 enables rendering engine 340 to generate and display relationship information in the graphical representation. In one embodiment, relationship generator 344 enables rendering engine 340 to highlight influence of conveyance documents along the chain of title. For example, in one embodiment, management system 300 as executed at customer 350 generates an interactive graphical representation via rendering engine 340, and a user can select a conveyance document by clicking or hovering over the document, or through other interaction. Thus, in one embodiment, selection of a conveyance document can illustrate relationship data, including influence of the conveyance document on other conveyances or ownership or a combination.

In one embodiment, customer 350 includes one or more management engine interfaces 352. Management engine interface 352 at customer 350 can enable the customer to download code from server 320 to execute the management engine functions described with respect to management engine 330 of server 320. In one embodiment, customer 350 can operate offline after receiving code from server 320. In one embodiment, customer 350 includes one or more rendering engine interfaces 354. Rendering engine 354 interface enables customer 350 to execute the functions described with respect to the relationship rendering engine described with respect to rendering engine 340 of server 320.

In one embodiment, customer 350 includes document or information interface 356, which can enable a user to upload conveyance information into management system 300. The conveyance documents represent conveyance information that can be inputted into the management system. In one embodiment, some conveyance information is input into server 320 directly, and can be used as the basis for conveyance information representations at customer. In one embodiment, all conveyance information is input via the customer conveyance information or document interface 356. In one embodiment, information input locally at customer 350 is only used locally (e.g., customer 350 can download functions from server 320). In one embodiment, information input locally at customer 350 can be used at server 320 to generate data or data objects or data representations at the server that are sent back to customer 350. Customer 350 includes graphical display 358, which can include graphical representation information generated by management system 300 (whether computed at server 320, at customer 350, or both) for the conveyance information and the ownership information generated. In one embodiment, rendering engine 340 displays information generated by management engine 300.

In one aspect, a method for land use rights management includes: representing each of multiple land use rights in an object as a bounded space, where a portion of a whole right is a specifically designated subspace within the bounded space; and managing land use rights conveyances through object interactions as subdivisions of whole or partial subspaces within the bounded space, including performing set operations on bounded spaces of interacting objects to compute the subdivisions.

In one embodiment, representing each of the multiple land use rights as a bounded space further comprises representing the land use rights as objects having the bounded space, and representing a subspace as an object having a specifically designated interval portion of the bounded space, including defined starting and ending points of the interval to preserve the specific right conveyed. In one embodiment, managing the land use rights conveyances further comprises performing a set operation on separate subspaces to compute a subdivision conveyed. In one embodiment, performing the set tracking the land use rights conveyances further comprises performing the set operation comprises performing a union operation between two or more subspaces. In one embodiment, performing the set tracking the land use rights conveyances further comprises performing the set operation comprises performing an intersection operation between two or more subspaces. In one embodiment, managing the land use rights conveyances further comprises tracking conveyances based on a combination of at least two of: right type, x-axis and y-axis tract dimensions, z-axis land depth, mineral type, and time. In one embodiment, managing the land use rights conveyances further comprises tracking conveyances based on all of: right type, x-axis and y-axis tract dimensions, z-axis land depth, mineral type, and time. In one embodiment, managing the land use rights conveyances comprises computing a subdivision conveyed based on right type intervals, x-axis tract dimension intervals, y-axis tract dimension intervals, z-axis land depth intervals, mineral type intervals, and time intervals.

In one aspect, a computing device for land use management includes: a memory device to store data related to land use rights conveyances; and a processor to generate multiple objects to represent the land use rights conveyances, including to represent each of multiple land use rights in an object as a bounded space, where a portion of a whole right is a specifically designated subspace within the bounded space; and to manage land use rights conveyances through object interactions as subdivisions of whole or partial subspaces within the bounded space, including the execution of set operations on bounded spaces of objects to compute the subdivisions.

In one embodiment, the processor is to represent the land use rights as objects having the bounded space, and represent a subspace as an object having a specifically designated interval portion of the bounded space, including defined starting and ending points of the interval to preserve the specific right conveyed. In one embodiment, the processor is to manage the land use rights conveyances including to perform a set operation on separate subspaces to compute a subdivision conveyed. In one embodiment, the processor is to perform a union operation between two or more subspaces. In one embodiment, the processor is to perform an intersection operation between two or more subspaces. In one embodiment, the processor is to manage the land use rights conveyances including to manage conveyances based on a combination of at least two of: right type, x-axis and y-axis tract dimensions, z-axis land depth, mineral type, and time. In one embodiment, the processor is to manage the land use rights conveyances including to manage conveyances based on all of: right type, x-axis and y-axis tract dimensions, z-axis land depth, mineral type, and time. In one embodiment, the processor is to manage the land use rights conveyances including to compute a subdivision conveyed based on right type intervals, x-axis tract dimension intervals, y-axis tract dimension intervals, z-axis land depth intervals, mineral type intervals, and time intervals.

In one aspect, a method includes: computing land use rights conveyances as conveyances of specified intervals of a whole land use right, where each interval includes a starting and ending point within the whole land use right, the conveyances based on conveyance instruments; generating a graphical representation of the conveyance instruments, including representing the conveyance instruments ordered in accordance with specific rights intervals affected by the respective conveyance instruments; and generating relationship lines between graphical representations of conveyance instruments, each relationship line indicating an influence of the conveyance instrument on one or more other conveyance instruments to which it is connected, the influence based on an amount of land use rights conveyed by the conveyance instrument.

In one embodiment, generating the graphical representation further comprises generating a flowchart of conveyance instruments. In one embodiment, generating the relationship lines comprises generating a relationship line between representations of two conveyance instruments to indicate an influence per interval for at least one right type, and for one or more of: x-axis tract dimension, y-axis tract dimension, z-axis land depth, mineral type, or time.

Figure 4:
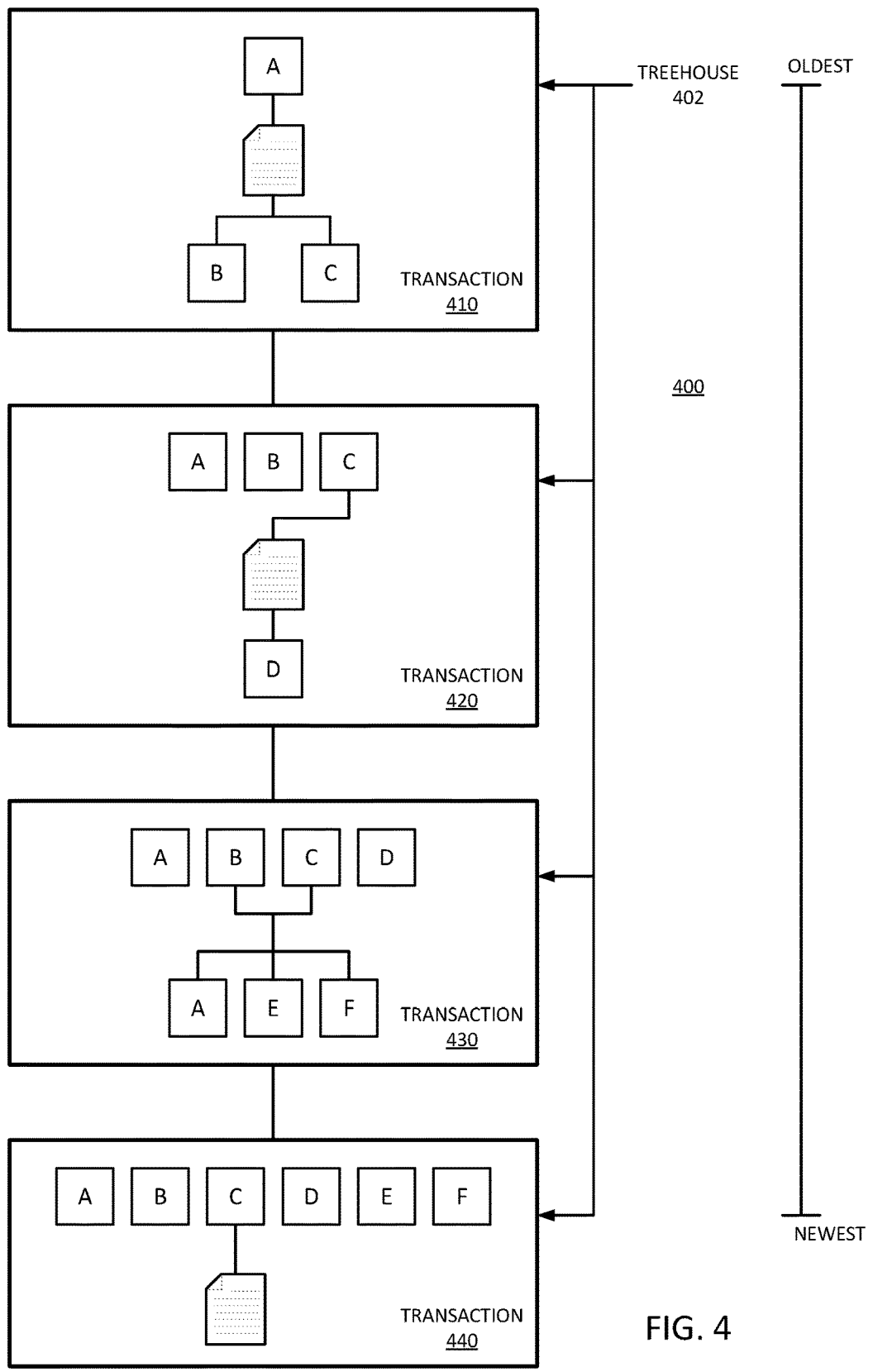
FIG. 4 is a representation of an embodiment of a treehouse view.

FIG. 4 is a representation of an embodiment of a treehouse view. Diagram 400 illustrates treehouse view 402. In treehouse view 402, the parties to a document are illustrated together in a box, and each separate conveyance document can have a different box illustrating the resulting ownership, as represented by intervals. Thus, each document or conveyance is represented as a separate transaction in treehouse view 402. In treehouse view 402, the oldest transaction or the source transactions can be set at the "top" of the page, and worked down to the newest transactions. In one embodiment, such a flow from top to bottom can be reversed.

As illustrated, transaction 410 provides a conveyance from A to B and C. In one embodiment, the management system can generate transaction 410 and the other transactions as separate objects, or as object containers, with documents and rights states for various parties being elements within the container. Transaction 420 illustrates a conveyance from C to D. It will be understood that management system can manage rights that pass through conveyance documents as well as operations of law (succession, inheritance, or other operation). While a specific document is not illustrated in transaction 430, interests of B and C pass to A, E, and F through a single transaction, or a series of related transactions. In one embodiment, the management and view can be configurable to provide the desired type of illustration. Transaction 440 illustrates a conveyance of rights from C. The receiving party is not illustrated, but can be include in the representation if known.

Figure 5:
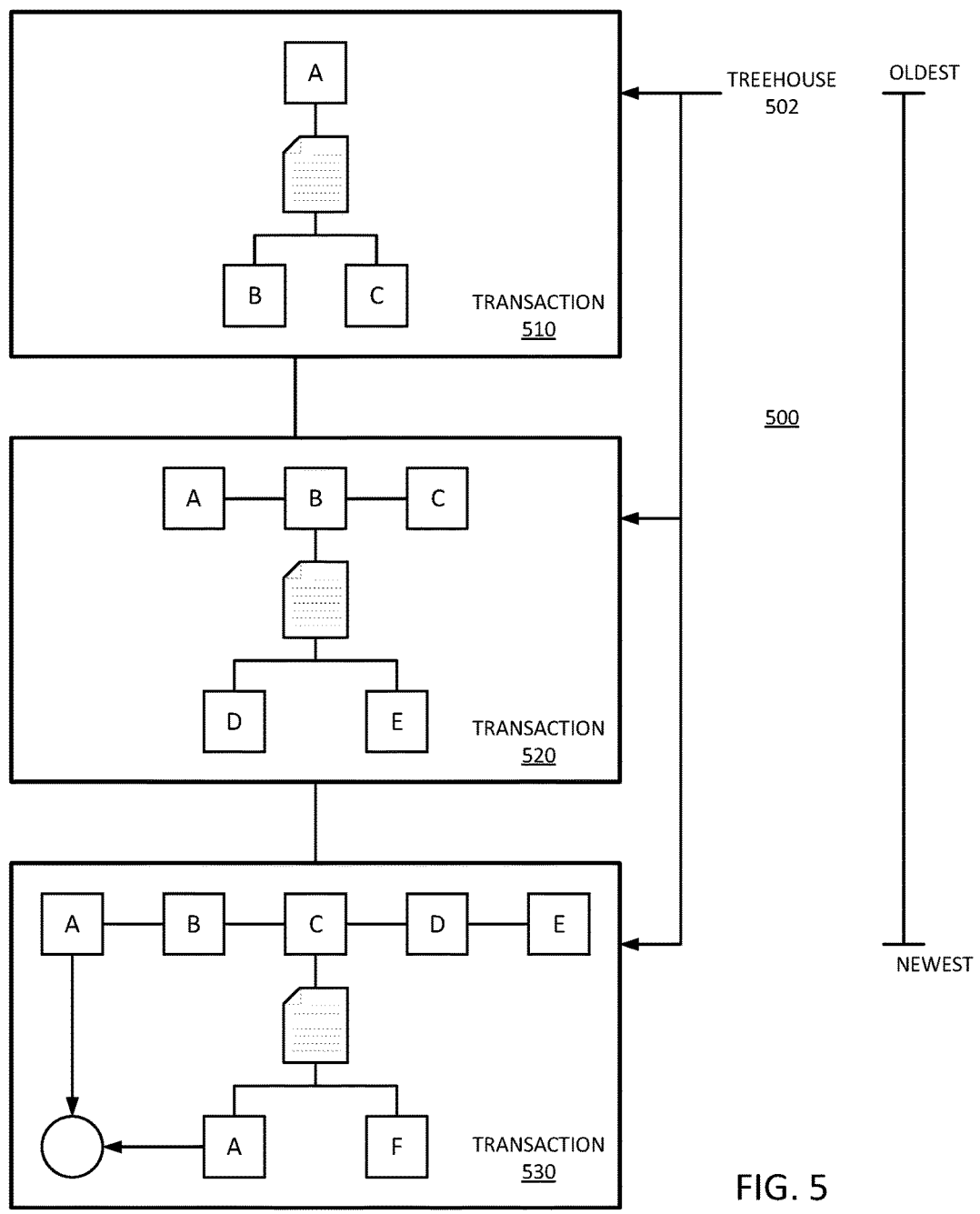
FIG. 5 is a representation of an alternative embodiment of the treehouse view.

FIG. 5 is a representation of an alternative embodiment of a treehouse view. Diagram 500 represent treehouse view 502, which illustrates an embodiment of a visualization where residual rights information can be represented in a particular box, such as the circle in the bottom box of transaction 530. Thus, for example, transaction 510 represents a conveyance from A to B and C. Transaction 520 represents a conveyance from B to D and E. It will be understood that A and C retain rights as illustrated in transaction 520. In transaction 530, C conveys rights to A and F, while A already had rights previously. Thus, the circle can represent the combination of rights that reside in A after the conveyance of transaction 530, and include the previous rights or interests.

Figure 6:
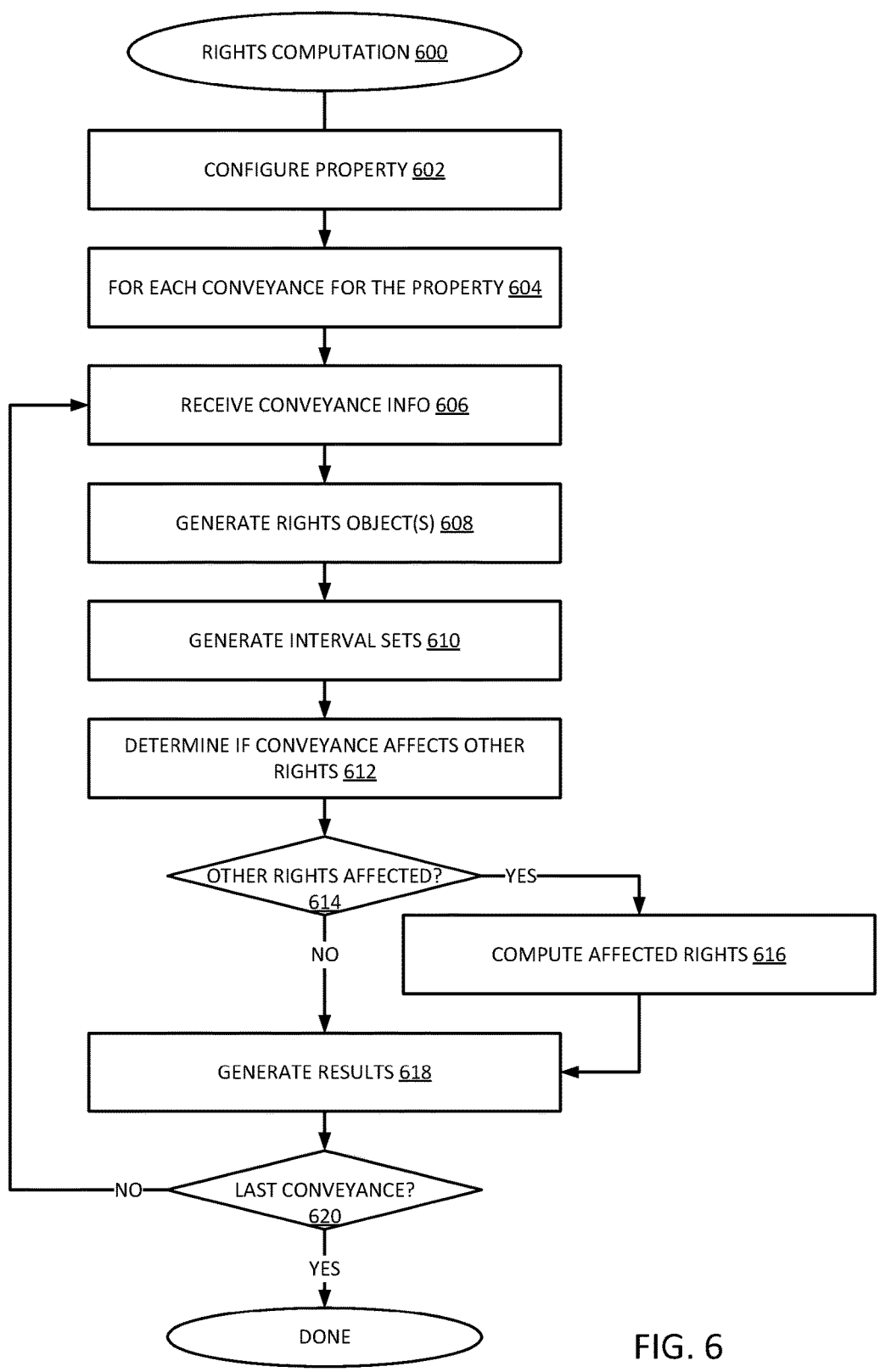
FIG. 6 is an embodiment of a flow diagram of a process for computing land use rights based on conveyance information.

FIG. 6 is an embodiment of a flow diagram of a process for computing land use rights based on conveyance information. One possible process flow 60 for rights computation or ownership computation can occur as follows. In one embodiment, the management system can configure the property such as by receiving input information on names and information about a real property, 602. Such information may also include an original grant of rights, which is typically from a government.

In one embodiment, for each conveyance related to the property, 604, the management system receives conveyance information, 606. For example, the user may input information about the conveyance. As another example, the system can access preloaded information or historical documents or other electronic information. The system generates one or more rights objects related to the conveyance and the parties to the conveyance, 608. The objects can include intervals or bounded spaces. In one embodiment, the objects can include or be organized into interval set information, 610. The management system can organize or manage the intervals/objects with set operations.

In one embodiment, for each conveyance, the management system can determine if the conveyance affects other rights, such as rights owned by other individuals or other rights, or both, related to the rights conveyed, 612. If other rights are affected, 614 YES branch, in one embodiment, the management system can compute the affected rights or generate a relationship to the other rights or a combination, 616. If no other rights are affected, 614 NO branch, or after computing the effect of the conveyance on other rights, in one embodiment, the system generates ownership results indicating rights ownership, 618. If the conveyance evaluated is the last conveyance, 620 YES branch, the computation for the chain of title can finish. If the last conveyance has not been reached, 620 NO branch, the system can continue to process other conveyance information (returning to 606) and continue until all conveyance information is processed.

Figure 7:
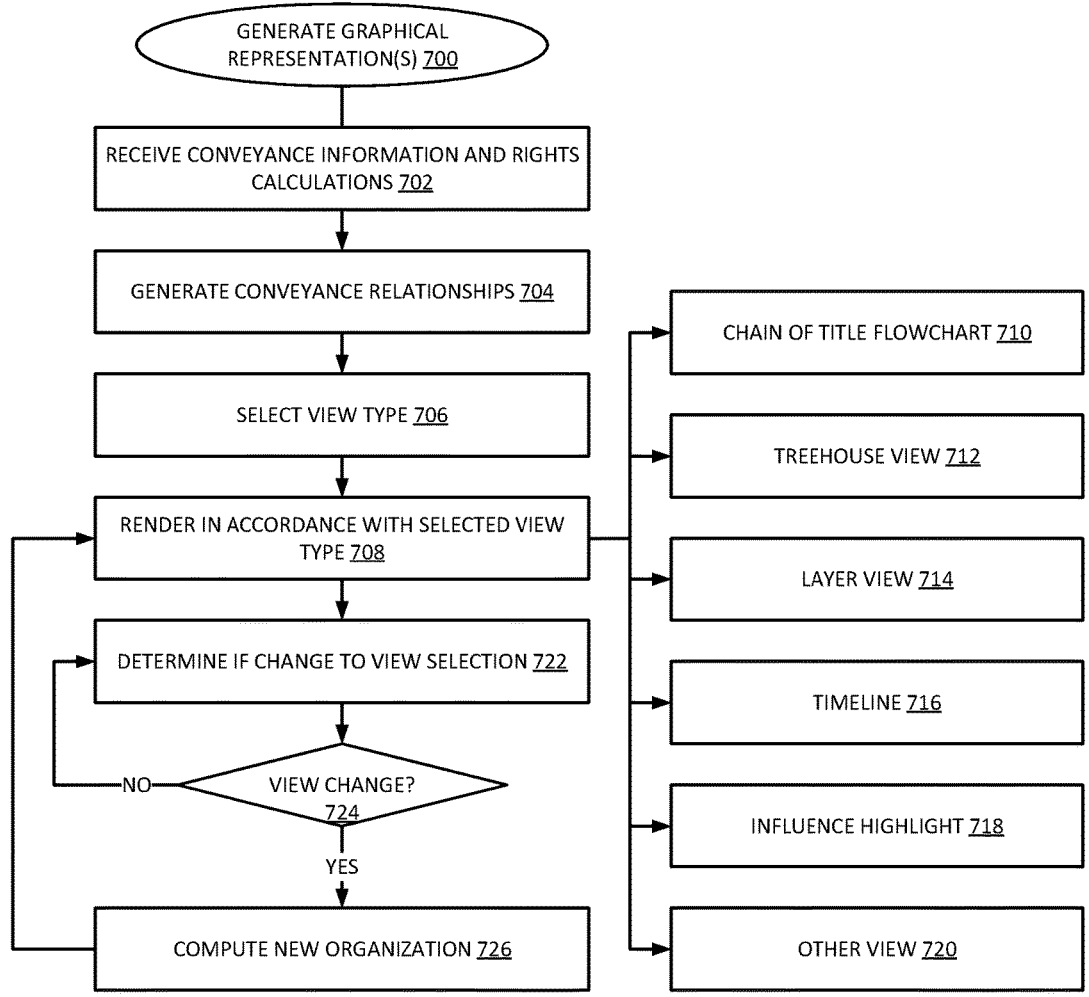
FIG. 7 is an embodiment of a flow diagram of a process for generating a graphical rendering of land use rights information.

FIG. 7 is an embodiment of a flow diagram of a process for generating a graphical rendering of land use rights information. In one embodiment, a management system generates graphical representation(s) of conveyance information. Process 700 represents a flow of operation for generating a graphical representation of conveyance information. In one embodiment, the system receives conveyance information and rights calculations, 702. In one embodiment, the management system includes a computation engine to make the calculations. In one embodiment, the management system includes integrated components that perform computations and generate graphical representations.

In one embodiment, the computation engine or the rendering engine or a combination generates conveyance relationships for the mapped conveyance information, 704. For example, the relationships can indicate how a conveyance document influences or affects rights associated with the conveyance and rights outside the direct conveyance. For example, a conveyance earlier in time will influence conveyances later in time, since a party cannot convey more than they have rights to convey.

In one embodiment, the system selects a view type, 706. The selection can be in response to an interactive request by a user. The system can render the graphical information in accordance with the selected view type, 708. A non-limiting list of view types can include a chain of title flowchart 710, a treehouse view that groups parties with each conveyance information to represent the full effects of the conveyance on rights 712, a layered view including documents and parties 714, a timeline view 716, an influence highlight, 718, or another view 720, or a combination. Timeline view 716 can represent the conveyances based on the timing of the conveyances. Influence highlight 718 can illustrate the effects of a conveyance on other conveyances or parties or both in the chain of title. In one embodiment, the system can support one or more other views 720.

In one embodiment, the system determines if there should be a change to the selected view, 722. For example, a user may interact with the graphical representation and select a change to the view type, or to the data to be viewed. In one embodiment, if there is no view change to be made, 724 NO branch, the system can continue to monitor for view changes, 722. In one embodiment, if there is a view change, 724 YES branch, the system can compute a new organization of the conveyance data for rendering, 726, and render in accordance with the selected view type, 708.

Figure 8A:
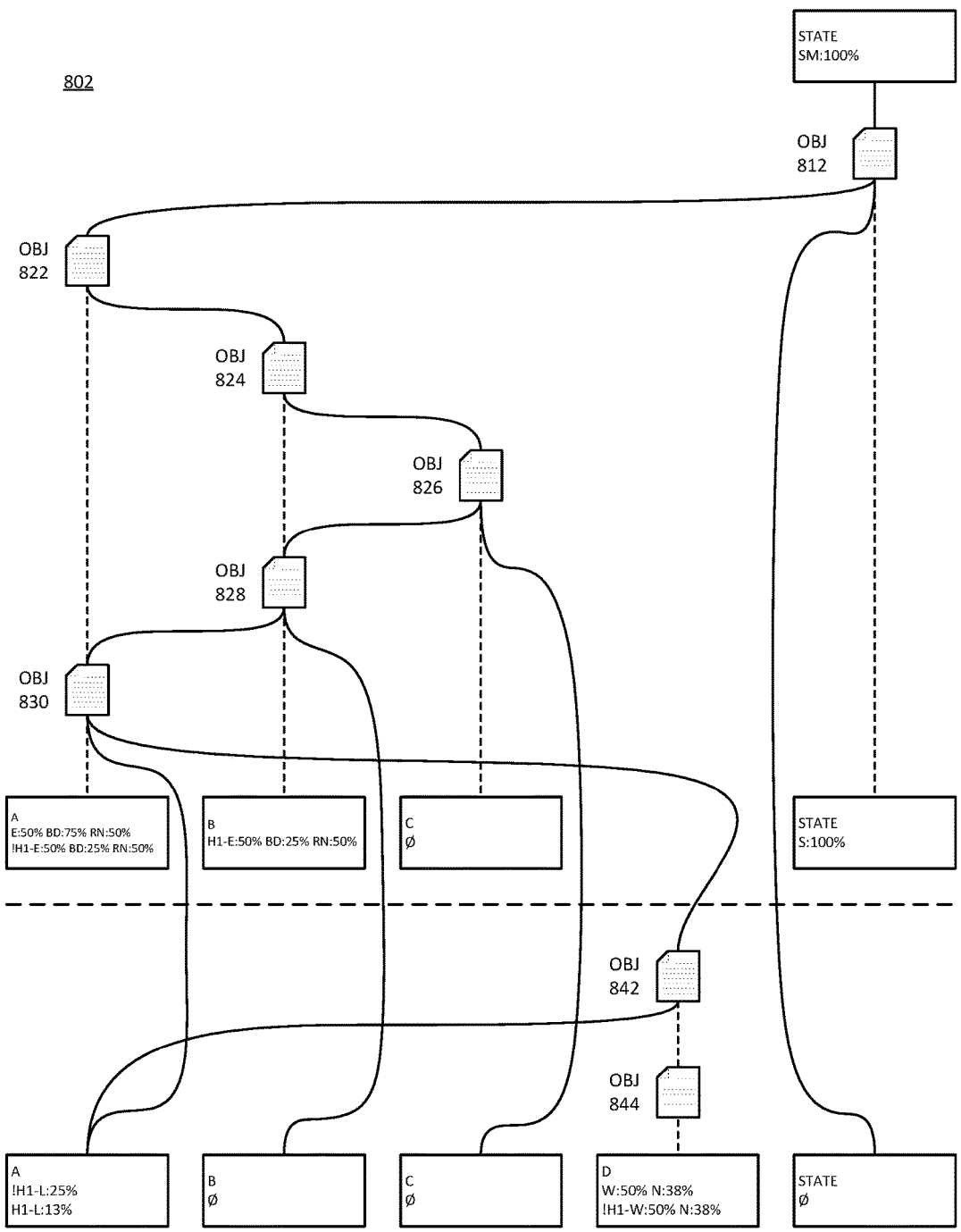
FIG. 8A is a representation of an embodiment of a standard graphical conveyance view.

FIG. 8A is a representation of an embodiment of a standard graphical conveyance view. Diagram 802 represents a standard or compact view of conveyance information, with parties to conveyances represented in boxes illustrating states of ownership, and document objects illustrating the conveyance information, with relationships represented by lines connecting document objects and party ownership states and other documents that come later in time, which directly derive from the document objects.

The parties to the conveyances are represented across the bottom in alphabetical order, but can be grouped in any of a number of different ways. Different groupings could include, but are not limited to: timeline order, order of percentage ownership, order of relationship (e.g., where parties related by conveyance are illustrated next to each other), or some other order.

The State starts as 100% owner of all rights. Object 812 represents a conveyance of mineral rights. The dashed line to State illustrates the connection to the party "State" at the bottom. Object 812 can convey some rights, while others are retained by State. Objects 822, 824, 826, 828, and 830 illustrate other transfers. In the view of diagram 802, the parties to the conveyances and the specifics of the conveyance are not illustrated, but other views can show some or all of such information. The view of diagram 802 simply illustrates the objects that represent conveyances or conveyance instruments, and the resulting or present rights or interests in light of all conveyances.

While the specific percentages shown are not necessarily important, they provide an illustration of the complexities of tracking rights. For example, Executive rights, Mineral rights, Leases, Royalties, Participating and Non-Participating Royalty rights, or other interests, or a combination can all be separately conveyed for separate portions. In one embodiment, diagram 802 illustrates percentage interests, but it can be understood that the percentages are based on tracking and management of actual portions (e.g., via intervals or bounded spaces). Thus, in the simple view of diagram 802, the final percentages may be sufficient for the view, but the actual portions can be tracked by the management system in accordance with any embodiment described herein. It will be understood that each right can be represented as separate bounded spaces, and operated on separately. For related or intersecting rights, the management system can perform computations to compute interests based on different bounded spaces.

In one embodiment, different types of rights can be displayed above and below a dashed line or other separator to illustrate the different interests. As an example, certain interests granted to A in object 822, which are then separated with object 830 can provide interests for D via objects 842 and 844, while maintaining certain rights for A. The other parties (B, C, and State) do not include any of the lower rights and are shown having null sets of interest.

It will be observed that in one embodiment, objects are aligned with parties represented. All parties represented either have a present interest (as of the time of the generation of the view), or had an interest. It will be understood that a "present" interest can be relative. For example, in one embodiment, the management system includes a filter component to select a specific period of time, and represent all transactions and interests starting from a period of time and ending at another selected period of time. Thus, a present interest refers to an interest that occurs within the timeline.

Figure 8B:
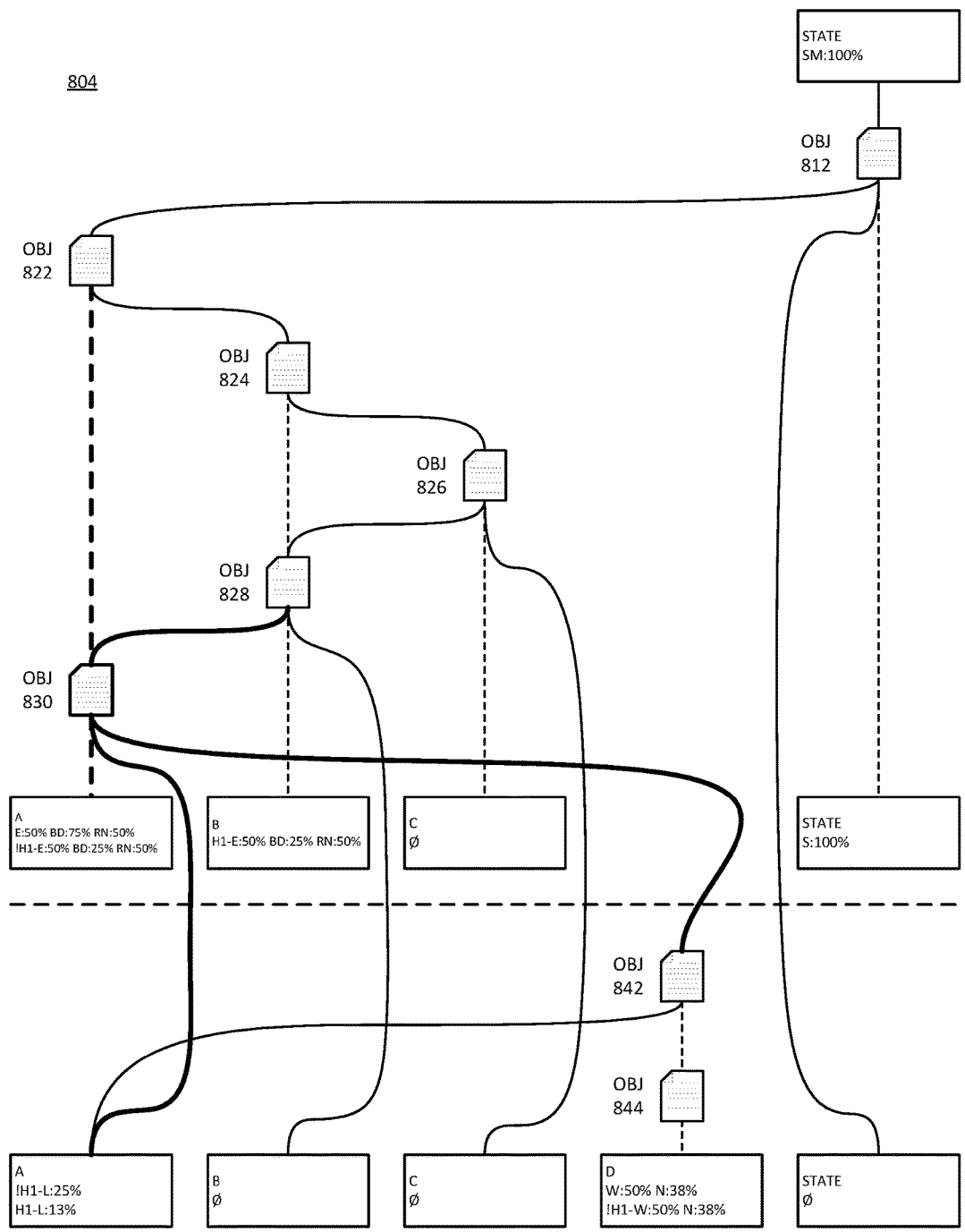
FIG. 8B is a representation of an embodiment of a standard graphical conveyance view showing highlighted relationships.

FIG. 8B is a representation of an embodiment of a standard graphical conveyance view showing highlighted relationships. Diagram 804 provides another illustration of diagram 802, and all the documents and conveyances are considered to be the same. The view of diagram 804 provides additional information through the selection of document object 830 by a user. Selection of object 830 can cause the system to highlight the object representing the conveyance document, and highlight its relationships. The relationships are highlighted from object 830 to other documents and to parties. For example, the system can highlight the source relationship of object 830 to object 822, the source relationship of object 830 to object 828, the child relationship (or resulting interest relationship) in A (of which there are actually two), and the resulting interest relationship from object 830 to object 842. The resulting interest relationship indicates that a conveyance document is the source of rights that a party possesses that permits either a continuing interest or the ability to convey an interest to another party. In one embodiment, a user can select further information to identify more details about the conveyances and resulting ownership rights.

Figure 9A:
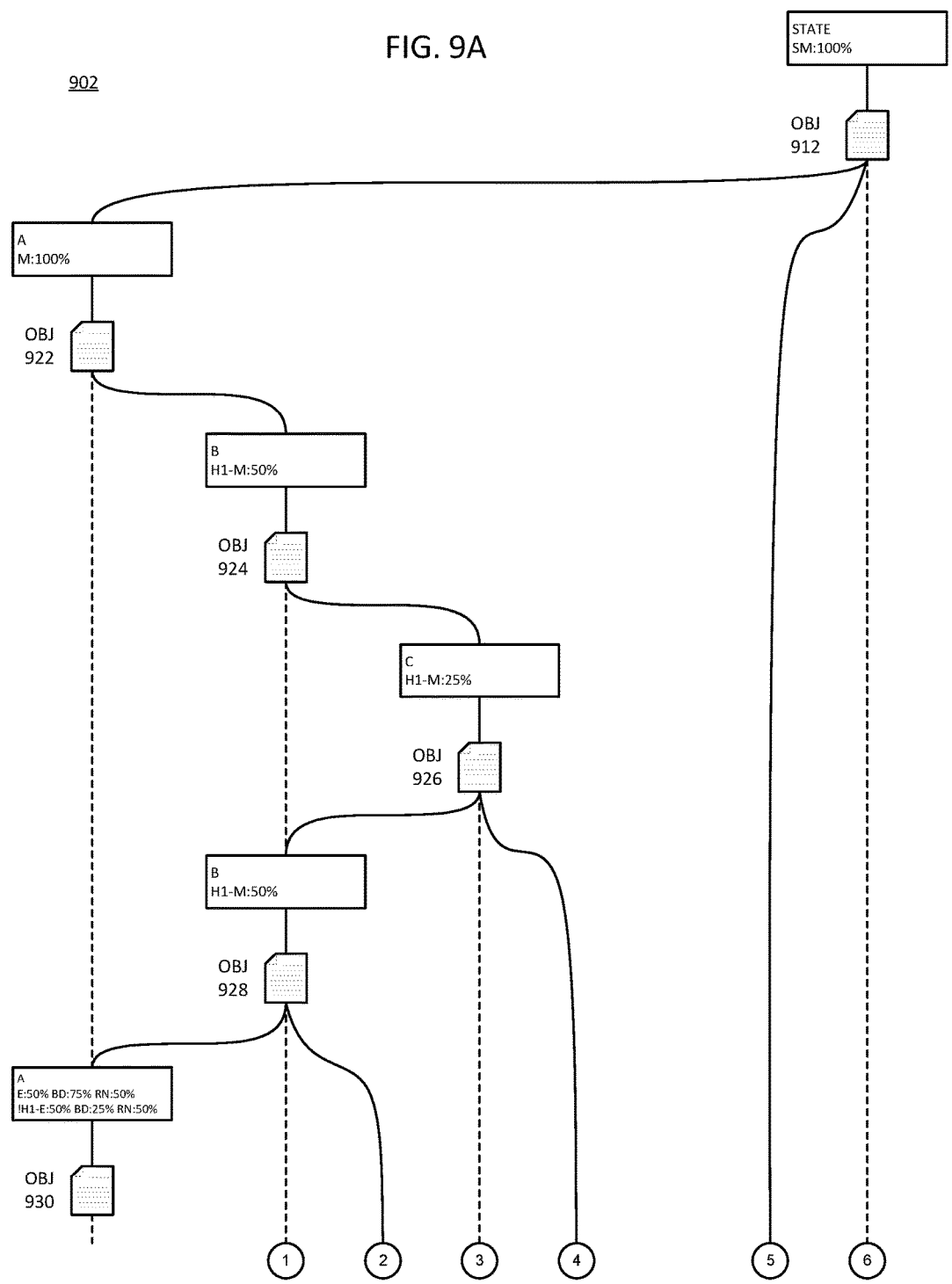
FIGS. 9A-9B illustrate a representation of an embodiment of a graphical layered view.
Figure 9B:
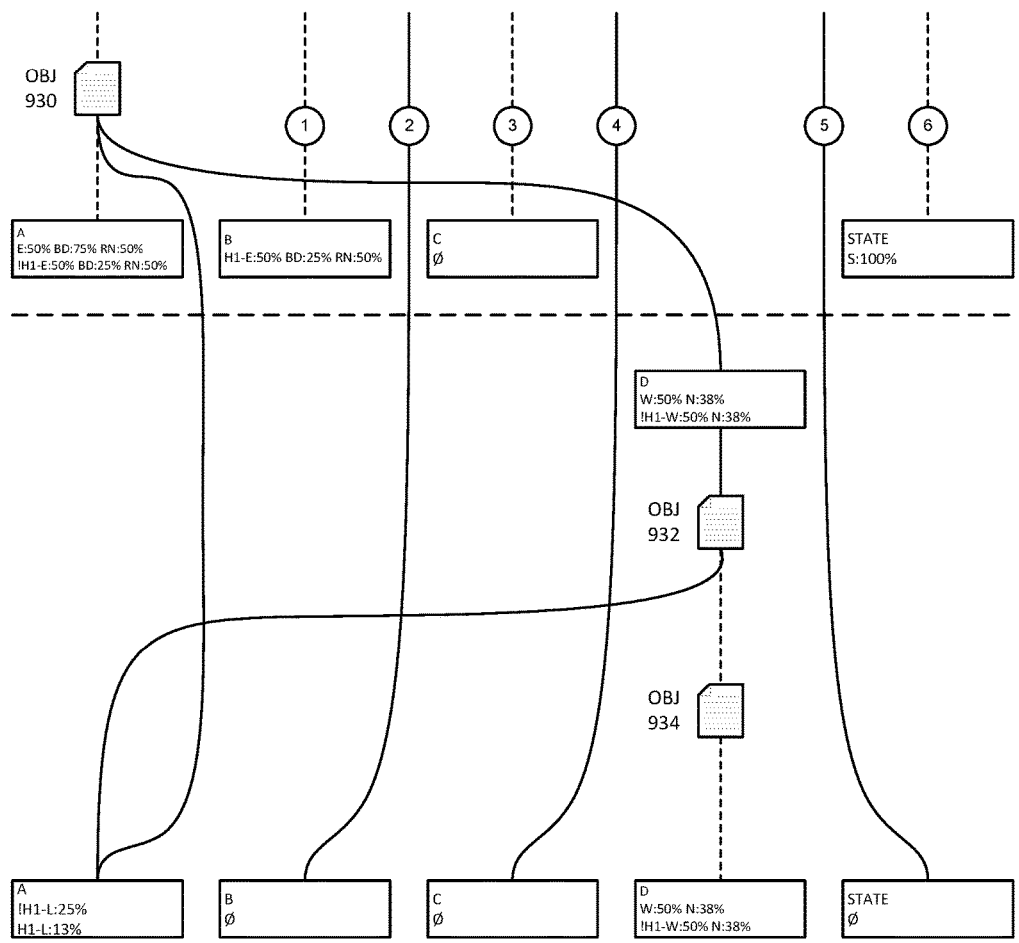

FIGS. 9A-9B illustrate a representation of an embodiment of a graphical layered view. The layered view of diagrams 902 and 904 represent the same information as illustrated in diagrams 802 and 804. The use of the same information is for purposes of illustration as to how the different views can be structured, and is not limiting in any way. In a layered view, the parties and their resulting ownership rights are layered between the conveyance documents. Thus, diagrams 902 and 904 include other objects to illustrate states of ownership.

Thus, State conveys rights to A via object 912, and A has a present interest at that moment of 100% mineral rights. With object 922, A conveys rights to B, as illustrated. Diagram 902 also illustrates the conveyance and resulting rights from object 924, object 926, and object 928. With the layered view, a user has more detail to trace information through the chain of title, instead of simple the final state of interests. The conveyance by object 930 continues into diagram 904 of FIG. 9B. Similar to the above diagrams, diagram 904 illustrates the final interests of the various parties. Object 930 grants rights to D, which are split with object 932 between A and D, and the conveyance of object 934 affirms the rights to D.

It will be observed that the diagrams illustrate certain rights prefixed by an exclamation operation (!), for example, !H1-L:25% for A in diagram 904. The ! operator can be understood as indicating all interest except for what is designated. Thus, A has interest in everything except H1-L: 25%. Other conventions could be used.

Figure 10:
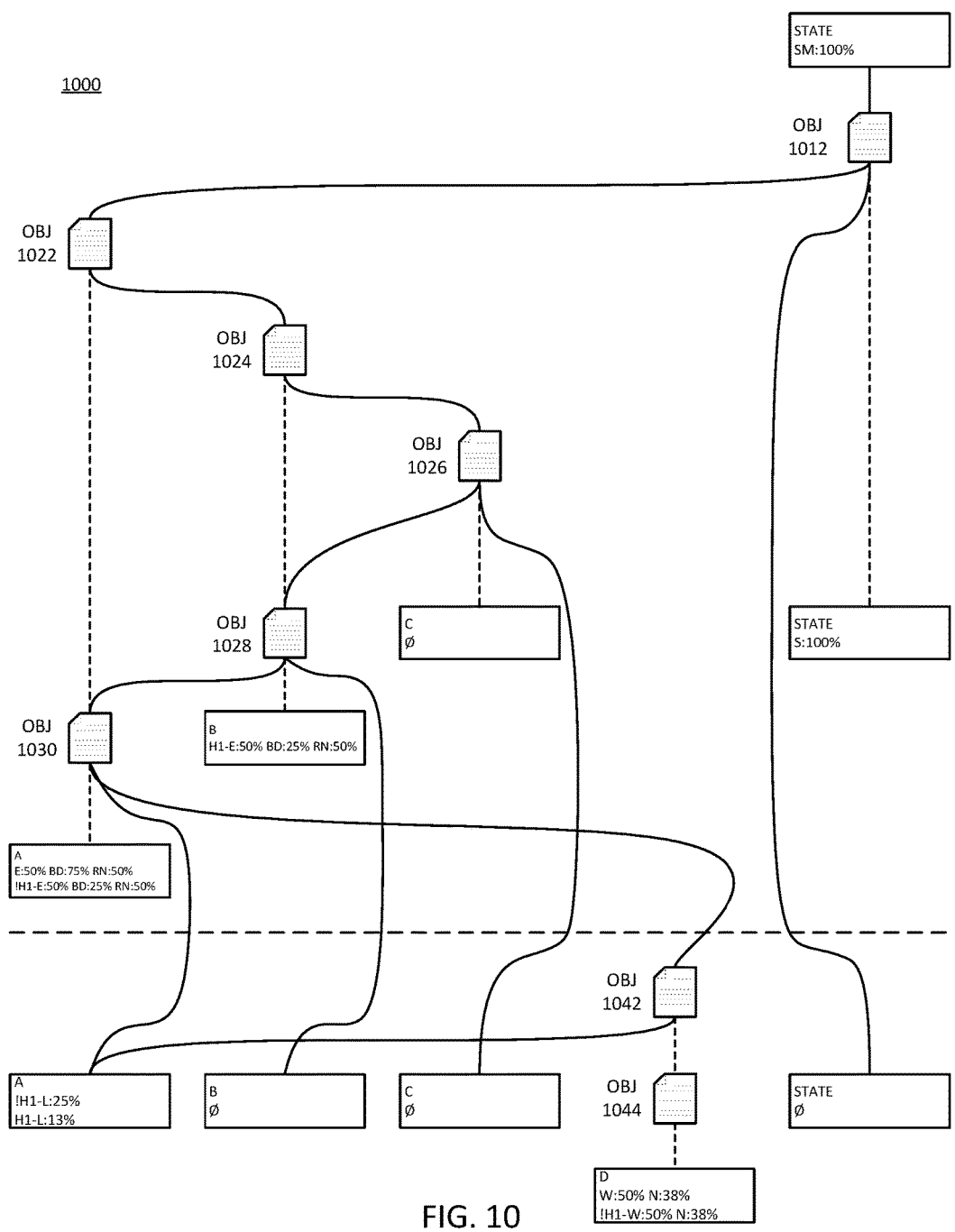
FIG. 10 is a representation of an embodiment of a graphical conveyance view illustrating the timing of conveyances.

FIG. 10 is a representation of an embodiment of a graphical conveyance view illustrating the timing of conveyances. As with diagrams 902 and 904, diagram 1000 represents the same information as provided in the standard view of diagram 802, but with timing information.

The timing of conveyances can change the location of where parties are illustrated. With more complex rights and conveyance situations, there can be more variation in the timing of when parties received their rights, and would look different than what is illustrated in diagram 1000. It will be observed that with timing information, diagram 1000 illustrates objects 1022, 1024, 1026, 1028, 1030, 1042, and 1044 in the same relative locations as provided in diagram 802. However, now the interest objects are shown in different relative locations consistent with the alignment of when the interests were passed. Thus, the interests of State and C can be determined after object 1026, and remain set at that point. The interest of B occurs later, after object 1028. The interest of A occurs after object 1030. On the lower portion of the diagram, the interests of State, A, B, and C are known after object 1042. The interests of D are known after object 1044.

FIG. 11 is a representation of an embodiment of a graphical ownership report. In the ownership report, all ownership rights are illustrated. In one embodiment, the system can display ownership view 1100 in response to an interaction with a user, such as a mouse "hover," or a click or other selection. On the left, the negative interests can be seen, which indicates that all rights are owned except what are shown. On the right are positive ownership interests, which displays affirmative interests. Ownership view 1100 can include "navigation" elements, such as selectable items to refresh the view, export the information, or close or exit the view.

In one embodiment, the management system displays ownership view 1100 as an overlay over a different view, such as a popup window or popup view. In one embodiment, ownership view 1100 is displayed as a separate view. While percentage information is illustrated in ownership view 1100, in one embodiment, specific ownership ranges could be illustrated. In one embodiment, ownership view 1100 can illustrate specific ownership segments, referring to specific plot information indicated by conversion of bounded space information to physical plot information.

FIG. 12 is a representation of an embodiment of a graphical runsheet report. The runsheet report indicates when conveyances occurred. In one embodiment, the system can display runsheet view 1200 in response to an interaction with a user, such as a mouse "hover," or a click or other selection. Runsheet view 1200 can include "navigation" elements, such as selectable items to refresh the view, export the information as a spreadsheet or export one or more files of the information, or close or exit the view.

In one embodiment, the management system displays runsheet view 1200 as an overlay over a different view, such as a popup window or popup view. In one embodiment, runsheet view 1200 is displayed as a separate view. Runsheet 1200 illustrates the information of conveyances by type of instrument, parties affected by the instrument, and the date. It will be understood that multiple Grantees can be listed together. It will be understood that the management system can generate a separate runsheet for the same plot of land for different rights.

FIG. 13 is a representation of an embodiment of pseudocode for a conveyance management engine. Pseudocode 1300 provides one simple example of functional code operations for creating an object, including computing rights interests as properties for the object. The management system can be said to include and execute the code. In practice a piece of computer hardware executes the operations. The simplified example of pseudocode 1300 is to be understood as illustrative, but not limiting. Other functions can be included. The functions illustrated can be executed by different function calls. There is no limitation on the order of the operations of the lines of code, except that lines dependent on other functions or information will occur after such information is obtained or function is performed.

At line 1302, the function is opened for creating an object. In one embodiment, some or all of the object creation functions can be callable. In one embodiment, object creation functions can be called in response to a conveyance document or conveyance object, and the system will compute new or modified interests in light of the conveyance. In one embodiment, one or more elements or conditions are included as input to create the object. At line 1304, the code identifies the names associated with the object. For a conveyance object, the names will include the conveying and receiving parties. For an ownership state object, the name will be the name of the party whose ownership interest is being computed.

At line 1306, the code can identify the property the object applies to. At line 1308, the code can identify the property rights or interests of the identified parties (i.e., names). It will be understood that one or multiple rights or interests could be implicated. For an ownership node object, the rights can be conveyed through multiple different documents, or a combination of a document and a previous state of ownership rights for the same party. For a conveyance document object, the document can convey multiple different types of rights.

At line 1310, the code generates the rights sets as ranges or intervals. The ranges refer to the bounded spaces referenced throughout. Each right can be separately identified as a bounded range or series of ranges. At line 1312, the code can perform set operations to define the object rights. For example, the code can take rights from a previous rights state and combine them (either additively or subtractively, depending on the object type and the position of the party) with the modification or new rights of the instant conveyance.

At line 1314, the code can generate a new instance of the object type with the defined rights that are computed. In one embodiment, the code uses an object class as a starting point for object creation. In one embodiment, the code uses another object instance as a starting point for object creation. The created object can inherit the properties of the parent object, subject to the modifications of the conveyance. In one embodiment, at line 1316, the code creates or generates chain of title relationships. Such chain of title relationships can be represented as pointers or calls or handles or other mechanism to another object managed by the management system. Thus, the management system can trace objects in a structured view, such as those illustrated above, to represent the chain of title. At line 1318, the code ends the create object functions.

FIG. 14 is a representation of an embodiment of pseudocode for a display of a conveyance management engine. Pseudocode 1400 provides one simple example of functional code operations for displaying an object, including rights interests managed as bounded space. The management system can be said to include and execute the code. In practice a piece of computer hardware executes the operations. The simplified example of pseudocode 1400 is to be understood as illustrative, but not limiting. Other functions can be included. The functions illustrated can be executed by different function calls. There is no limitation on the order of the operations of the lines of code, except that lines dependent on other functions or information will occur after such information is obtained or function is performed.

At line 1402, the function is opened for displaying an object. In one embodiment, some or all of the object displaying functions can be callable. In one embodiment, object display functions can be called in response to interaction of a user with a graphical display, or creation of an object, or a combination. In one embodiment, the system will compute new or modified interests in light of a conveyance, and update a graphical representation in realtime. In one embodiment, one or more elements or conditions are included as input to create the object. At line 1404, the code generates an object GUI (graphical user interface) for the object type to be displayed. For example, object types can include conveyance document objects, rights states objects which illustrate an instance of a party's interests, or other objects, such as display objects or containers.

At line 1406, the code can identify relationships for the object such as source relationships. For highlighting display changes, the relationships can also include child relationships. At line 1408, the code can identify source and child objects. It will be understood that as represented in lines 1406 and 1408, the relationships refer to relationships to states of interest, and the source and child objects refer to sources of rights and conveyances of rights. The terminology here is simply for purposes of illustration, and is not limiting. The operation of lines 1406 and 1408 are to identify a present state of interest, and sources and grants of interests that might affect the present state of interest.

At line 1410, the code can compute the rights sets as ranges or intervals. The ranges refer to the bounded spaces referenced throughout. Each right can be separately identified as a bounded range or series of ranges. At line 1412, the code can generate graphical elements to illustrate the chain of title, such as lines or curves to connect an object to another object, which was identified in lines 1406 or 1408 or a combination. In one embodiment, in line 1414, if the management system detects an interaction with a graphical representation, it can call the functions of the display object to perform operations in response to the interaction. In one embodiment, the operations in response to the operation results in calling the display object functions to display a different type of view. In one embodiment, as illustrated at line 1416, the code can highlight relationships in response to selections by a user. In one embodiment, the display object function can render a display with more detailed information. At line 1418, the interaction function ends. At line 1420, the display object functions end.

Figure 15:
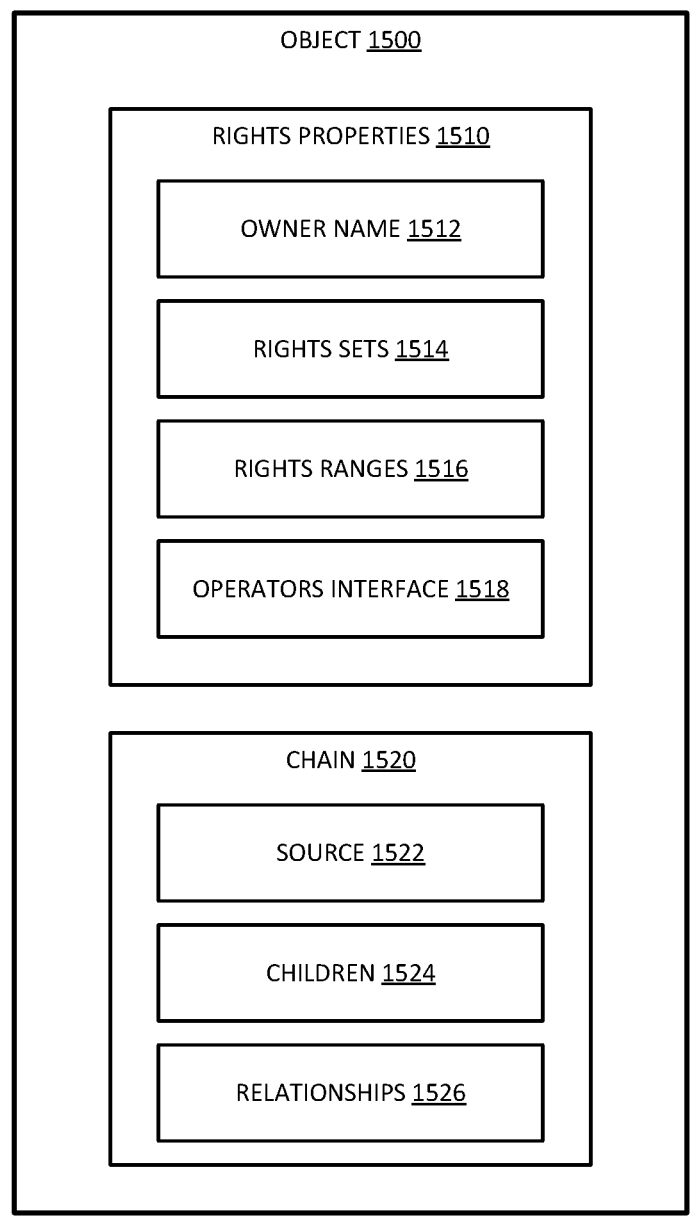
FIG. 15 is a block of an embodiment of a conveyance object with weighted rights management.

FIG. 15 is a block of an embodiment of a conveyance object with weighted rights management. Object 1500 represents an example of an object in accordance with embodiments of objects described throughout. Object 1500 is intended to illustrate a simplified view of structured data used to manage land use rights information. Other properties and functions can be included. Not every object instance will include all functions or data. Object 1500 generically represents an object, and different types of objects can be implemented in a management system.

In one embodiment, object 1500 includes rights properties 1510. The rights properties define the interests of a party. In one embodiment, right properties 1510 includes an owner name or an identification of a party 1512. Owner name 1512 represents an ownership. Instance of object 1500 that represent conveyances can include multiple instances of rights properties 1510, such as to represent all parties of the conveyance.

In one embodiment, rights properties 1510 includes rights sets 1514, which identify what interests are owned by owner name 1512. Rights properties 1510 include rights ranges 1516, which represent bounded space or intervals. Rights ranges 1516 provides a specific representation for the management system of how much and what specific rights are owned. Rights are operable by the management system via operators interface 1518, which represents that rights properties 1510 includes ranges that can be computed by set operators to compute new rights that preserve the quantity and portion information through the intervals. Thus, set operators can modify one or more intervals based on a type of interaction with a different set of one or more intervals.

In one embodiment, object 1500 includes chain information 1520. Chain information 1520 represents data, functions, interfaces, or a combination that enables the management system to associate object 1500 with other objects in chain of title relationships. The chain of title relationships will be understood to be within the context of the management system. Thus, there is no requirement that every relationship be exactly traceable to a specific real property document. For example, relationships between conveyance document objects and interest node objects (or objects representing the state of ownership), are derived by the management system, to represent the results of the documents. In the physical world, only the documents themselves exist, and the management system generates the relationships and interest node objects to represent information to a user as a summary or understanding of the results of the real world documents.

In one embodiment, chain information 1520 can include source 1522, which represents a source of rights. Source 1522 refers to one or more objects that represent the source of rights set out in rights properties 1510. In one embodiment, chain information 1520 can include children 1524, which represents rights conveyed to other parties. Children 1524 refers to one or more other objects that represent the receipt of rights conveyed from a party identified by rights properties 1510. In one embodiment, chain information 1520 includes relationships 1526, which can include all relationships or interactions with other objects that are not specifically source 1522 or children 1524. Such relationships can include placeholders, positioning, timing information, or any other relationship.

Figure 16:
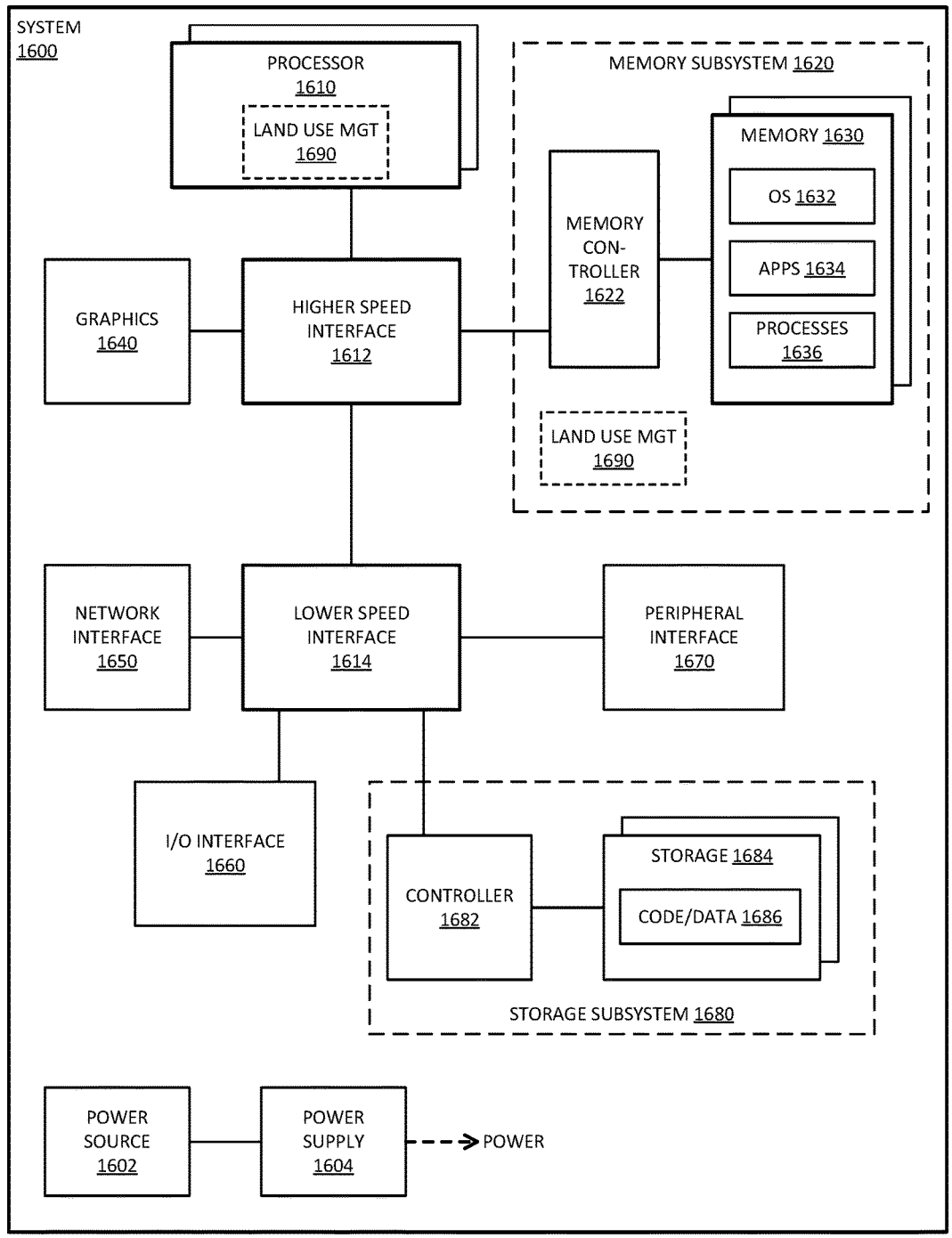
FIG. 16 is a block diagram of an embodiment of a computing system in which real property rights management can be implemented.

FIG. 16 is a block diagram of an embodiment of a computing system in which real property rights management can be implemented. System 1600 represents a computing device in accordance with any embodiment described herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 1600 includes processor 1610, which provides processing, operation management, and execution of instructions for system 1600. Processor 1610 can include any type of microprocessor, central processing unit (CPU), graphics processing unit (GPU), processing core, or other processing hardware to provide processing for system 1600, or a combination of processors. Processor 1610 controls the overall operation of system 1600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 1600 includes interface 1612 coupled to processor 1610, which can represent a higher speed interface or a high throughput interface for system components that needs higher bandwidth connections, such as memory subsystem 1620 or graphics interface components 1640. Interface 1612 can represent a "north bridge" circuit, which can be a standalone component or integrated onto a processor die. Where present, graphics interface 1640 interfaces to graphics components for providing a visual display to a user of system 1600. In one embodiment, graphics interface 1640 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, the display can include a touchscreen display. In one embodiment, graphics interface 1640 generates a display based on data stored in memory 1630 or based on operations executed by processor 1610 or both. In one embodiment, graphics interface 1640 generates a display based on data stored in memory 1630 or based on operations executed by processor 1610 or both.

Memory subsystem 1620 represents the main memory of system 1600, and provides storage for code to be executed by processor 1610, or data values to be used in executing a routine. Memory subsystem 1620 can include one or more memory devices 1630 such as read-only memory (ROM), flash memory, one or more varieties of random access memory (RAM) such as DRAM (dynamic RAM), or other memory devices, or a combination of such devices. Memory 1630 stores and hosts, among other things, operating system (OS) 1632 to provide a software platform for execution of instructions in system 1600. Additionally, applications 1634 can execute on the software platform of OS 1632 from memory 1630. Applications 1634 represent programs that have their own operational logic to perform execution of one or more functions. Processes 1636 represent agents or routines that provide auxiliary functions to OS 1632 or one or more applications 1634 or a combination. OS 1632, applications 1634, and processes 1636 provide software logic to provide functions for system 1600. In one embodiment, memory subsystem 1620 includes memory controller 1622, which is a memory controller to generate and issue commands to memory 1630. It will be understood that memory controller 1622 could be a physical part of processor 1610 or a physical part of interface 1612. For example, memory controller 1622 can be an integrated memory controller, integrated onto a circuit with processor 1610.

While not specifically illustrated, it will be understood that system 1600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

In one embodiment, system 1600 includes interface 1614, which can be coupled to interface 1612. Interface 1614 can be a lower speed interface than interface 1612. In one embodiment, interface 1614 can be a "south bridge" circuit, which can include standalone components and integrated circuitry. In one embodiment, multiple user interface components or peripheral components, or both, couple to interface 1614. Network interface 1650 provides system 1600 the ability to communicate with remote devices (e.g., servers or other computing devices) over one or more networks. Network interface 1650 can include an Ethernet adapter, wireless interconnection components, cellular network interconnection components, USB (universal serial bus), or other wired or wireless standards-based or proprietary interfaces. Network interface 1650 can exchange data with a remote device, which can include sending data stored in memory or receiving data to be stored in memory.

In one embodiment, system 1600 includes one or more input/output (I/O) interface(s) 1660. I/O interface 1660 can include one or more interface components through which a user interacts with system 1600 (e.g., audio, alphanumeric, tactile/touch, or other interfacing). Peripheral interface 1670 can include any hardware interface not specifically mentioned above. Peripherals refer generally to devices that connect dependently to system 1600. A dependent connection is one where system 1600 provides the software platform or hardware platform or both on which operation executes, and with which a user interacts.

In one embodiment, system 1600 includes storage subsystem 1680 to store data in a nonvolatile manner. In one embodiment, in certain system implementations, at least certain components of storage 1680 can overlap with components of memory subsystem 1620. Storage subsystem 1680 includes storage device(s) 1684, which can be or include any conventional medium for storing large amounts of data in a nonvolatile manner, such as one or more magnetic, solid state, or optical based disks, or a combination. Storage 1684 holds code or instructions and data 1686 in a persistent state (i.e., the value is retained despite interruption of power to system 1600). Storage 1684 can be generically considered to be a "memory," although memory 1630 is typically the executing or operating memory to provide instructions to processor 1610. Whereas storage 1684 is nonvolatile, memory 1630 can include volatile memory (i.e., the value or state of the data is indeterminate if power is interrupted to system 1600). In one embodiment, storage subsystem 1680 includes controller 1682 to interface with storage 1684. In one embodiment controller 1682 is a physical part of interface 1614 or processor 1610, or can include circuits or logic in both processor 1610 and interface 1614.

Power source 1602 provides power to the components of system 1600. More specifically, power source 1602 typically interfaces to one or multiple power supplies 1604 in system 1602 to provide power to the components of system 1600. In one embodiment, power supply 1604 includes an AC to DC (alternating current to direct current) adapter to plug into a wall outlet. Such AC power can be renewable energy (e.g., solar power) power source 1602. In one embodiment, power source 1602 includes a DC power source, such as an external AC to DC converter. In one embodiment, power source 1602 or power supply 1604 includes wireless charging hardware to charge via proximity to a charging field. In one embodiment, power source 1602 can include an internal battery or fuel cell source.

In one embodiment, system 1600 includes elements of a land use management or manager 1690 (alternately referred to as management system 1690) in accordance with any embodiment described throughout. In one embodiment, system 1600 represents a computing device that executes management system 1690. In one embodiment, system 1600 represents a computing device through which a user accesses a server that execute the management system. Management system 1690 exists within system 1600 as components for execution. As illustrated, code, data, and objects can be stored within memory subsystem 1620 for execution. Processor 1610 executes the code and objects, and uses the data to perform the functions of the management system. Thus, components of management system 1690 within system 1600 configure the hardware components of system 1600 to provide the functions described in embodiments of a management system described throughout. It will be understood that either as a server or as an accessing device, system 1600 can access the other side of the operation (i.e., either the client side or the server side) via network interface 1650. In one embodiment, system 1600 stores one or more components for execution of land use management 1690.

Figure 17:
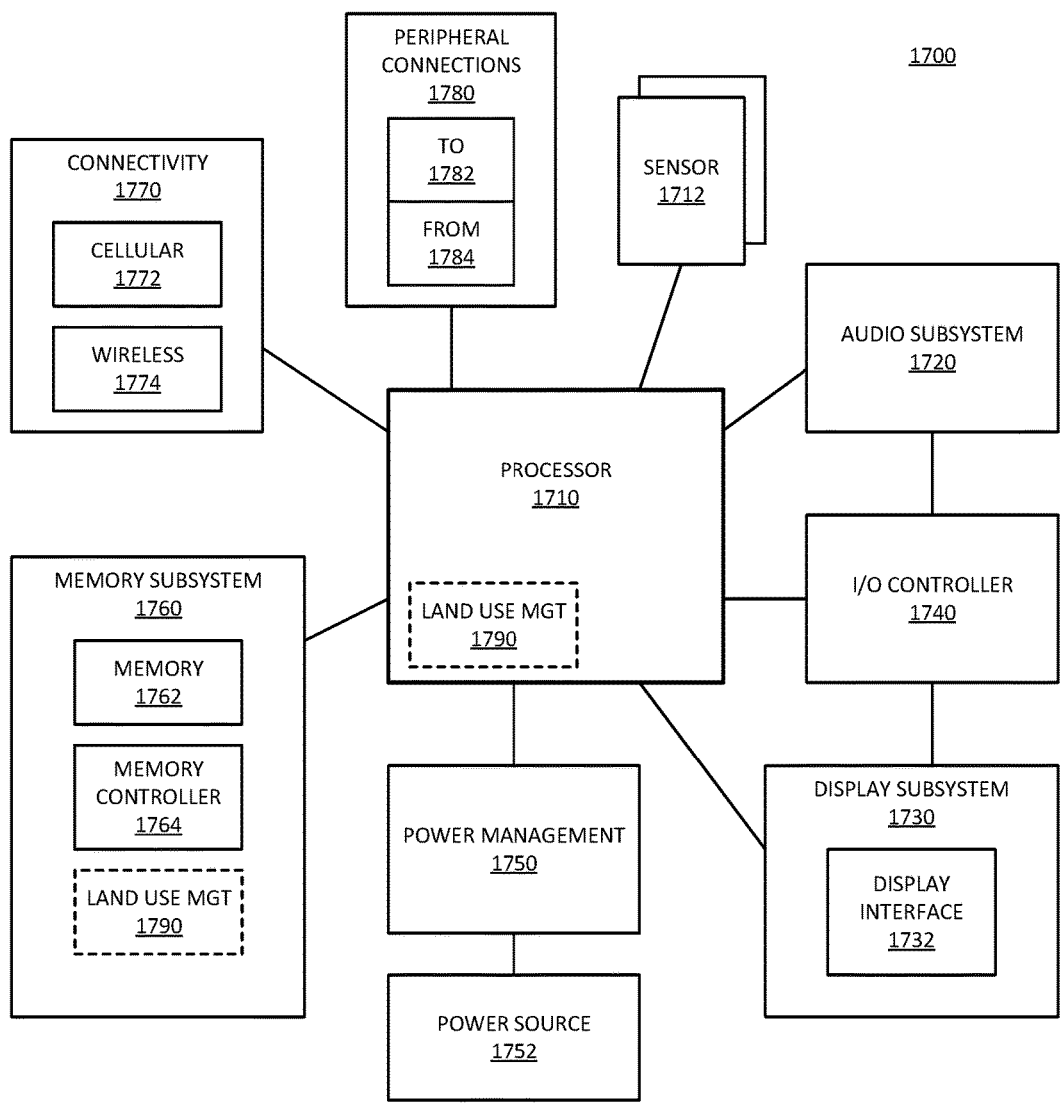
FIG. 17 is a block diagram of an embodiment of a mobile device in which real property rights management can be implemented.

FIG. 17 is a block diagram of an embodiment of a mobile device in which real property rights management can be implemented. Device 1700 represents a mobile computing device, such as a computing tablet, a mobile phone or smartphone, a wireless-enabled e-reader, wearable computing device, an internet-of-things device or other mobile device, or an embedded computing device. It will be understood that certain of the components are shown generally, and not all components of such a device are shown in device 1700.

Device 1700 includes processor 1710, which performs the primary processing operations of device 1700. Processor 1710 can include one or more physical devices, such as microprocessors, application processors, microcontrollers, programmable logic devices, or other processing means. The processing operations performed by processor 1710 include the execution of an operating platform or operating system on which applications and device functions are executed. The processing operations include operations related to I/O (input/output) with a human user or with other devices, operations related to power management, operations related to connecting device 1700 to another device, or a combination. The processing operations can also include operations related to audio I/O, display I/O, or other interfacing, or a combination. Processor 1710 can execute data stored in memory. Processor 1710 can write or edit data stored in memory.

In one embodiment, system 1700 includes one or more sensors 1712. Sensors 1712 represent embedded sensors or interfaces to external sensors, or a combination. Sensors 1712 enable system 1700 to monitor or detect one or more conditions of an environment or a device in which system 1700 is implemented. Sensors 1712 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1712 can also include sensors for biometric systems such as fingerprint recognition systems, face detection or recognition systems, or other systems that detect or recognize user features. Sensors 1712 should be understood broadly, and not limiting on the many different types of sensors that could be implemented with system 1700. In one embodiment, one or more sensors 1712 couples to processor 1710 via a frontend circuit integrated with processor 1710. In one embodiment, one or more sensors 1712 couples to processor 1710 via another component of system 1700.

In one embodiment, device 1700 includes audio subsystem 1720, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 1700, or connected to device 1700. In one embodiment, a user interacts with device 1700 by providing audio commands that are received and processed by processor 1710.

Display subsystem 1730 represents hardware (e.g., display devices) and software components (e.g., drivers) that provide a visual display for presentation to a user. In one embodiment, the display includes tactile components or touchscreen elements for a user to interact with the computing device. Display subsystem 1730 includes display interface 1732, which includes the particular screen or hardware device used to provide a display to a user. In one embodiment, display interface 1732 includes logic separate from processor 1710 (such as a graphics processor) to perform at least some processing related to the display. In one embodiment, display subsystem 1730 includes a touch-screen device that provides both output and input to a user. In one embodiment, display subsystem 1730 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, display subsystem includes a touchscreen display. In one embodiment, display subsystem 1730 generates display information based on data stored in memory or based on operations executed by processor 1710 or both.

I/O controller 1740 represents hardware devices and software components related to interaction with a user. I/O controller 1740 can operate to manage hardware that is part of audio subsystem 1720, or display subsystem 1730, or both. Additionally, I/O controller 1740 illustrates a connection point for additional devices that connect to device 1700 through which a user might interact with the system. For example, devices that can be attached to device 1700 might include microphone devices, speaker or stereo systems, video systems or other display device, keyboard or keypad devices, or other I/O devices for use with specific applications such as card readers or other devices.

As mentioned above, I/O controller 1740 can interact with audio subsystem 1720 or display subsystem 1730 or both. For example, input through a microphone or other audio device can provide input or commands for one or more applications or functions of device 1700. Additionally, audio output can be provided instead of or in addition to display output. In another example, if display subsystem includes a touchscreen, the display device also acts as an input device, which can be at least partially managed by I/O controller 1740. There can also be additional buttons or switches on device 1700 to provide I/O functions managed by I/O controller 1740.

In one embodiment, I/O controller 1740 manages devices such as accelerometers, cameras, light sensors or other environmental sensors, gyroscopes, global positioning system (GPS), or other hardware that can be included in device 1700, or sensors 1712. The input can be part of direct user interaction, as well as providing environmental input to the system to influence its operations (such as filtering for noise, adjusting displays for brightness detection, applying a flash for a camera, or other features).

In one embodiment, device 1700 includes power management 1750 that manages battery power usage, charging of the battery, and features related to power saving operation. Power management 1750 manages power from power source 1752, which provides power to the components of system 1700. In one embodiment, power source 1752 includes an AC to DC (alternating current to direct current) adapter to plug into a wall outlet. Such AC power can be renewable energy (e.g., solar power, motion based power). In one embodiment, power source 1752 includes only DC power, which can be provided by a DC power source, such as an external AC to DC converter. In one embodiment, power source 1752 includes wireless charging hardware to charge via proximity to a charging field. In one embodiment, power source 1752 can include an internal battery or fuel cell source.

Memory subsystem 1760 includes memory device(s) 1762 for storing information in device 1700. Memory subsystem 1760 can include nonvolatile (state does not change if power to the memory device is interrupted) or volatile (state is indeterminate if power to the memory device is interrupted) memory devices, or a combination. Memory 1760 can store application data, user data, music, photos, documents, or other data, as well as system data (whether long-term or temporary) related to the execution of the applications and functions of system 1700. In one embodiment, memory subsystem 1760 includes memory controller 1764 (which could also be considered part of the control of system 1700, and could potentially be considered part of processor 1710). Memory controller 1764 includes a scheduler to generate and issue commands to control access to memory device 1762.

Connectivity 1770 includes hardware devices (e.g., wireless or wired connectors and communication hardware, or a combination of wired and wireless hardware) and software components (e.g., drivers, protocol stacks) to enable device 1700 to communicate with external devices. The external device could be separate devices, such as other computing devices, wireless access points or base stations, as well as peripherals such as headsets, printers, or other devices. In one embodiment, system 1700 exchanges data with an external device for storage in memory or for display on a display device. The exchanged data can include data to be stored in memory, or data already stored in memory, to read, write, or edit data.

Connectivity 1770 can include multiple different types of connectivity. To generalize, device 1700 is illustrated with cellular connectivity 1772 and wireless connectivity 1774. Cellular connectivity 1772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1774 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1780 include hardware interfaces and connectors, as well as software components (e.g., drivers, protocol stacks) to make peripheral connections. It will be understood that device 1700 could both be a peripheral device ("to" 1782) to other computing devices, as well as have peripheral devices ("from" 1784) connected to it. Device 1700 commonly has a "docking" connector to connect to other computing devices for purposes such as managing (e.g., downloading, uploading, changing, synchronizing) content on device 1700. Additionally, a docking connector can allow device 1700 to connect to certain peripherals that allow device 1700 to control content output, for example, to audiovisual or other systems.

In addition to a proprietary docking connector or other proprietary connection hardware, device 1700 can make peripheral connections 1780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 1700 includes elements of a land use management or manager 1790 (alternately referred to as management system 1790) in accordance with any embodiment described throughout. Typically, system 1700 would represent a computing device through which a user accesses a server that execute the management system. However, system 1700 can represent one embodiment of a computing device that executes management system 1790. Management system 1790 exists within system 1700 as components for execution. As illustrated, code, data, and objects can be stored within memory subsystem 1760 for execution. Processor 1710 executes the code and objects, and uses the data to perform the functions of the management system. Thus, components of management system 1790 within system 1700 configure the hardware components of system 1700 to provide the functions described in embodiments of a management system described throughout. It will be understood that either as a server or as an accessing device, system 1700 can access the other side of the operation (i.e., either the client side or the server side) via network connectivity component 1770.

Figure 18:
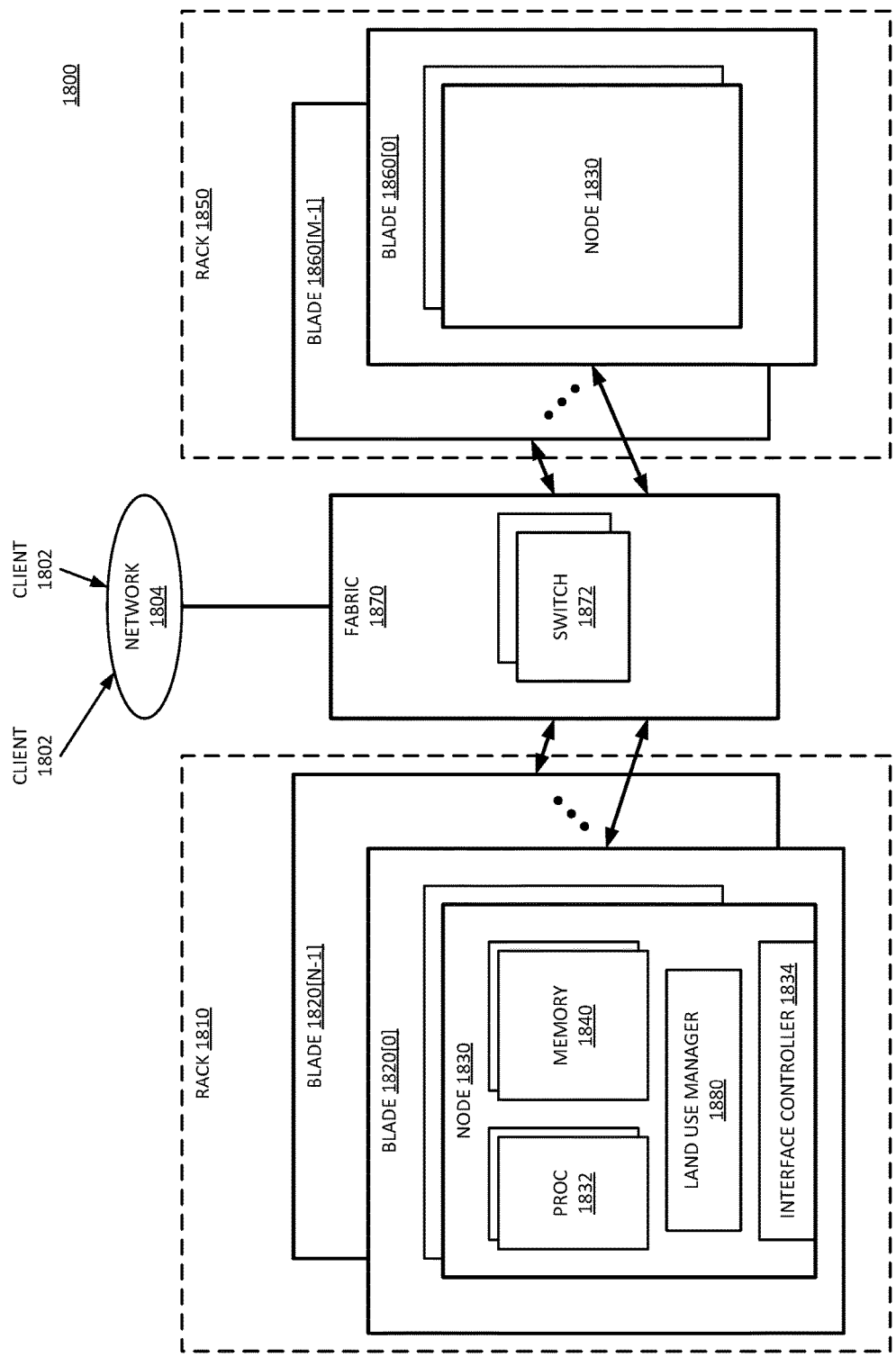
FIG. 18 is a block diagram of an embodiment of a multi-node network in which real property rights management can be implemented.

FIG. 18 is a block diagram of an embodiment of a multi-node network in which real property rights management can be implemented. System 1800 represents a data center or cloud server. In one embodiment, system 1800 represents a server farm. In one embodiment, system 1800 represents a data cloud or a processing cloud. System 1800 can include one or more computing devices in accordance with system 1600.

One or more clients 1802 make requests over network 1804 to system 1800. Network 1804 represents one or more local networks, or wide area networks, or a combination. Clients 1802 can be human or machine clients, which generate requests for the execution of operations by system 1800. System 1800 executes applications or data computation tasks requested by clients 1802.

In one embodiment, system 1800 includes one or more racks, which represent structural and interconnect resources to house and interconnect multiple computation nodes. In one embodiment, rack 1810 includes multiple nodes 1830. In one embodiment, rack 1810 hosts multiple blade components 1820. Hosting refers to providing power, structural or mechanical support, and interconnection. Blades 1820 can refer to computing resources on printed circuit boards (PCBs), where a PCB houses the hardware components for one or more nodes 1830. In one embodiment, blades 1820 do not include a chassis or housing or other "box" other than that provided by rack 1810. In one embodiment, blades 1820 include housing with exposed connector to connect into rack 1810. In one embodiment, system 1800 does not include rack 1810, and each blade 1820 includes a chassis or housing that can stack or otherwise reside in close proximity to other blades and allow interconnection of nodes 1830.

System 1800 includes fabric 1870, which represents one or more interconnectors for nodes 1830. In one embodiment, fabric 1870 includes multiple switches 1872 or routers or other hardware to route signals among nodes 1830. Additionally, fabric 1870 can couple system 1800 to network 1804 for access by clients 1802. In addition to routing equipment, fabric 1870 can be considered to include the cables or ports or other hardware equipment to couples nodes 1830 together. In one embodiment, fabric 1870 has one or more associated protocols to manage the routing of signals through system 1800. In one embodiment, the protocol or protocols is at least partly dependent on the hardware equipment used in system 1800.

As illustrated, rack 1810 includes N blades 1820. In one embodiment, in addition to rack 1810, system 1800 includes rack 1850. As illustrated, rack 1850 includes M blades 1860. M is not necessarily the same as N; thus, it will be understood that various different hardware equipment components could be used, and coupled together into system 1800 over fabric 1870. Blades 1860 can be the same or similar to blades 1820. Nodes 1830 can be any type of node as described herein, and are not necessarily all the same type of node. System 1800 is not limited to being homogenous, nor is it limited to not being homogenous.

For simplicity, only the node in blade 1820[0] is illustrated in detail. However, other nodes in system 1800 can be the same or similar. At least some nodes 1830 are computation nodes, with processor 1832 and memory 1840. A computation node refers to a node with processing resources (e.g., one or more processors) that executes an operating system and can receive and process one or more tasks. In one embodiment, at least some nodes 1830 are storage server nodes with a server as processing resources 1832 and memory 1840. A storage server refers to a node with more storage resources than a computation node, and rather than having processors for the execution of tasks, a storage server includes processing resources to manage access to the storage nodes within the storage server.

In one embodiment, node 1830 includes interface controller 1834, which represents logic to control access by node 1830 to fabric 1870. The logic can include hardware resources to interconnect to the physical interconnection hardware. The logic can include software or firmware logic to manage the interconnection. In one embodiment, interface controller 1834 is or includes a host fabric interface (HFI). Node 1830 includes memory subsystem 1840, which provides storage services for data to be computed by processors 1832. Processor 1832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1840 can be or include memory devices and a memory controller.

In one embodiment, node 1830 includes land use manager 1880, which represents elements of a land use management system in accordance with any embodiment described throughout. Land use manager 1880 exists within system 1800 as components for execution. As illustrated, code, data, and objects can be stored within node 1830 for execution. Multiple nodes 1830 can include multiple instances of land use manager 1880, or components of land use manager 1880 can be spread across multiple nodes 1830. Land use manager 1880 in system 1800 enables the providing of land use management services over network 1804 to clients 1802.

In one embodiment, the management system can instantaneously detect overconveyance and strangers in title (i.e., a name that has not been tied back to a conveyance document), or other errors, or a combination, in the chain of title. As stated before, human understanding does not normally comprehend information in dimensions beyond three. However, representing the conveyances as intervals and sets can enable the management system to quickly and correctly identify errors in conveyance information.

In one embodiment, the management system can display information based on time, percentage ownership, or alphabetical order of conveyor names/aliases, or a combination. In one embodiment, the management system can rearrange the view based on recent conveyances instead of alphabetical order. In one embodiment, the rendering engine enables the representation of information based on individual conveyors. In one embodiment, the graphical representation is organized based on which conveyance documents are associated with which individuals or parties.

As explained above, as use rights expand, the traditional methods used to track actual ownership rights gets exponentially more complex. Current mechanisms for tracking rights are inadequate, and people do not track adequately. Traditional conveyance management involves the use of a number of assumptions that are made when conveying, and based on the multidimensional complexity involved in tracking, such assumptions cannot adequately track rights.

From one perspective, the management system performs indexing of the conveyance information. In one embodiment, the management system sets up indexing with the intervals. In one embodiment, the management system applies set operations to intervals rather than traditional sets. That enables the system to apply set operations to multidimensional computation problems. In one embodiment, the management system organizes all conveyance information in set form. In one embodiment, with intervals and sets, the specific intervals can be separated via conveyances. The original conveyances can be preserved to be applied against later conveyances. Such management can prevent "merging" back rights based only on scalar percentages, which could mix conveyances.

In one aspect, a method includes: representing each of multiple land use rights as a bounded space, where a portion of a whole right is a specifically designated subspace within the bounded space; and tracking land use rights conveyances as subdivisions of whole or partial subspaces within the bounded space, including performing set operations to compute the subdivisions.

In one embodiment of the method, representing each of the multiple land use rights as a bounded space further comprises representing the land use rights as objects having the bounded space, and representing a subspace as an object having a specifically designated interval portion of the bounded space, including defined starting and ending points of the interval to preserve the specific right conveyed. In one embodiment of the method, tracking the land use rights conveyances further comprises performing a set operation on separate subspaces to compute a subdivision conveyed. In one embodiment of the method, performing the set tracking the land use rights conveyances further comprises performing the set operation comprises performing a union operation between two or more subspaces. In one embodiment of the method, performing the set tracking the land use rights conveyances further comprises performing the set operation comprises performing an intersection operation between two or more subspaces. In one embodiment of the method, tracking the land use rights conveyances further comprises tracking conveyances based on all of: right type, x-axis and y-axis tract dimensions, z-axis land depth, mineral type, and time. In one embodiment of the method, tracking the land use rights conveyances comprises computing a subdivision conveyed based on right type intervals, x-axis tract dimension intervals, y-axis tract dimension intervals, z-axis land depth intervals, mineral type intervals, and time intervals.

In one aspect, an apparatus includes hardware and/or software components to execute operations in accordance with any embodiment of the method. In one aspect, an article of manufacture comprising a computer readable storage medium having content stored thereon, which when executed by a machine performs operations to execute any embodiment of the method.

In one aspect, a method includes: computing land use rights conveyances as conveyances of specified intervals of a whole land use right, where each interval includes a starting and ending point within the whole land use right, the conveyances based on conveyance instruments; generating a graphical representation of the conveyance instruments, including representing the conveyance instruments ordered in accordance with specific rights intervals affected by the respective conveyance instruments; and generating relationship lines between graphical representations of conveyance instruments, each relationship line indicating an influence of the conveyance instrument on one or more other conveyance instruments to which it is connected.

In one embodiment of the method, generating the graphical representation further comprises generating a flowchart of conveyance instruments. In one embodiment of the method, generating the relationship lines comprises generating a relationship line between representations of two conveyance instruments to indicate an influence per interval for at least one right type, and for one or more of: x-axis tract dimension, y-axis tract dimension, z-axis land depth, mineral type, or time. In one embodiment of the method, computing the land use rights conveyances further comprises performing operations in accordance with any embodiment of the method for computing land use rights.

In one aspect, an apparatus includes hardware and/or software components to execute operations in accordance with any embodiment of the method. In one aspect, an article of manufacture comprising a computer readable storage medium having content stored thereon, which when executed by a machine performs operations to execute any embodiment of the method.

Figure 19:
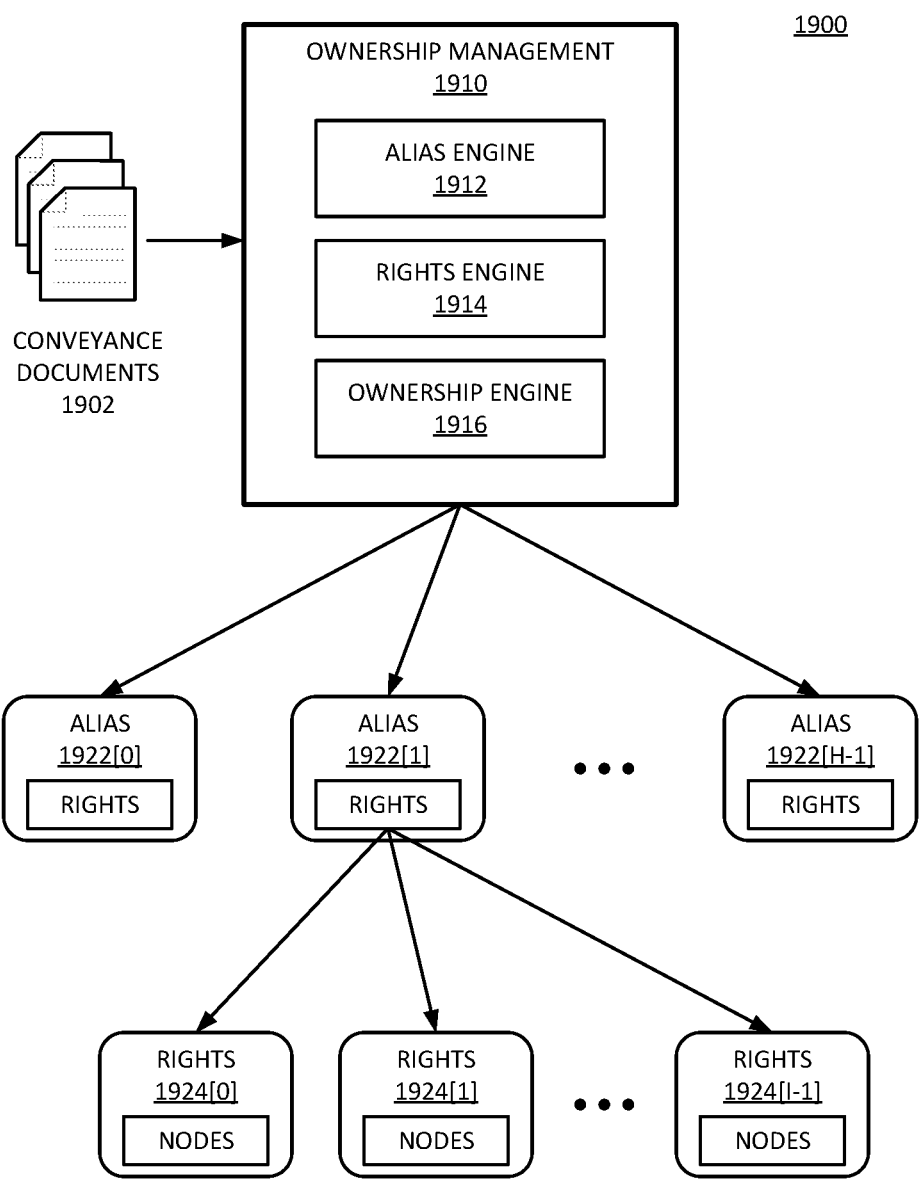
FIG. 19 is a block of an example of an architecture to manage real property rights ownership.

FIG. 19 is a block of an example of an architecture to manage real property rights ownership. System 1900 provides an example of a management architecture for real property and land use rights. Ownership management 1910 represents logic within a computing device that controls management of real property rights. Ownership management 1910 can be considered computational logic configured to perform various operations related to management of real property rights. Ownership management 1910 can be or include logic executed by a processor device.

In one example, ownership management 1910 includes alias engine 1912. Alias engine 1912 represents logic configured to determine the alias or identification of a party with a land use right. In one example, ownership management 1910 includes rights engine 1914. Rights engine 1914 enables system 1900 to compute the rights held by various rights holders. In one example, rights engine 1914 determines rights for rights holders or parties identified by alias engine as having an ownership interest. In one example, ownership management 1910 includes ownership engine 1916, which represents logic to compute ownership rights for real property. In one example, ownership engine 1916 computes rights for an individual. In one example, ownership engine 1916 computes rights for specified real property.

Ownership management 1910 can receive one or more conveyance documents 1902, or information from conveyance documents. The information indicates a transfer of rights from one party to another. A transfer of rights can be a split of rights, where rights held by one party are separated to multiple different parties. In one example, a transfer of rights can include a transfer to a party that has other rights. The other rights can be rights already held or can be rights conveyed from another party in the same transaction. In either case, a transfer to someone with rights or a party with an ownership interest is a transfer from multiple sources or multiple predecessors in interest to a common successor in interest.

In one example, for each transfer the system creates a computer object to represent the interest transfer or the interest itself. A computer object can refer to structured data that has both values or properties or states, and methods. The methods refer to interface mechanisms such as service calls to the method or operations to be executed on the object. A computer object thus refers to more than data values, but includes defined interfaces and operations. The computer objects can expand exponentially as the conveyances are tracked or managed from a starting point to current conveyances. The exponential expansion of objects results in the exponential expansion of nodes to be traversed to compute ownership interests. In one example, system 1900 enables the merging of interests to merge rights representations in a computer object and reduce the number of objects or nodes that need to be traversed to compute rights.

In one example, ownership engine 1916 computes running ownership by keeping track of the current state of ownership for each individual having an ownership interest. Aliases 1922[0] to 1922[H-1] represent H aliases, which can collectively be referred to as aliases 1922. Aliases 1922 represent a structure of interests computed and mapped out by ownership management 1910 to indicate ownership interests. Each alias 1922 includes a set of associated rights that represent land use rights for real property as conveyed in conveyance documents 1902 to the individuals represented by the aliases.

In one example, the aliases include an alias name associated with a set object, where the set object indicates the ownership interest or rights held by the individual. Such rights can be computed from conveyance documents 1902. In one example, in accordance with what is described herein, the rights include a representation of interests by an ownership vector. Rather than a scalar percentage, the percentage ownership can be a vector having a defined start and stop point within a range. Thus, interests can be tracked in accordance with details about the specific rights transferred and held. A merger of rights can maintain the granularity of data in the interest representation by merging the interest vectors into a single vector for contiguous interests or into a set for non-contiguous interests.

In one example, the rights are each object sets to indicate the rights. Rights 1924[0] to 1924[I-1] represent I rights that can be managed in system 1900. In one example I is equal to H, although there is not necessarily any relationship between the two numbers. Rights 1924[0] to 1924[I-1] can be collectively referred to as rights 1924. In one example, rights 1924 point to multiple nodes or computer objects that are created to represent the rights conveyances. In one example, the rights represent a sparse array of RightsSet objects associated with each conveyance (e.g., severance or merger or both). In one example, RightsSet objects include nodes in an array of Node objects. The Node objects include the structures needed to represent the ownership percentages and interests associated with a conveyance transaction.

Figure 20:
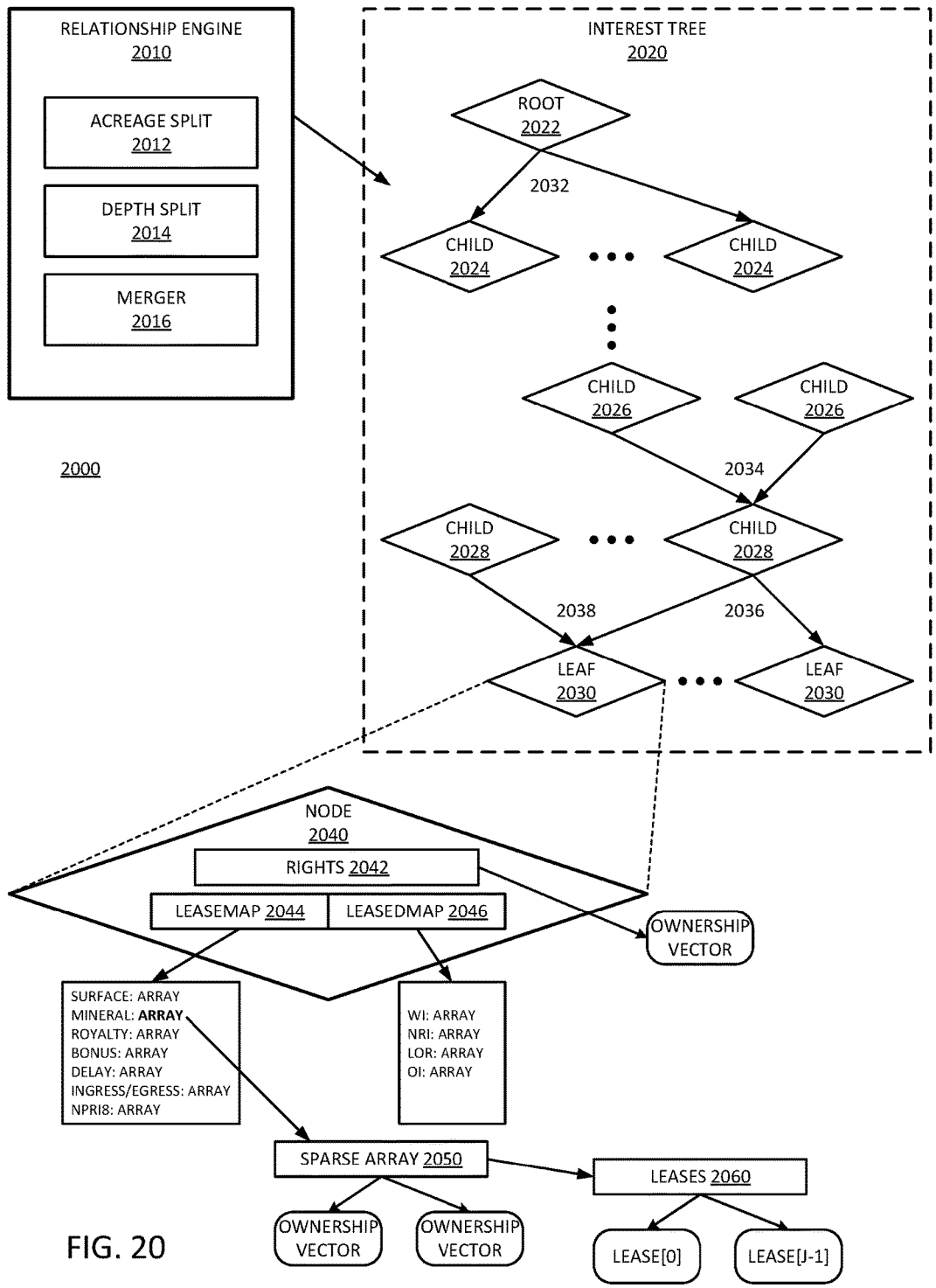
FIG. 20 is a block of an example of an architecture to manage real property rights conveyances.

FIG. 20 is a block of an example of an architecture to manage real property rights conveyances. System 2000 represents components of a property rights management system. System 2000 illustrates elements related to derivation of interests from a source of rights to current ownership interests. An implementation of system 2000 can operate with an example of system 1900 of FIG. 19, for example, with nodes in accordance with the nodes of system 2000.

In one example, system 2000 includes relationship engine 2010, which represents logic to manage the relationship of rights in a chain of interest. The chain of interest can be referred to as an interest tree, as represented by interest tree 2020 in system 2000. Interest tree 2020 can be referred to as a computation graph. Interest tree 2020 illustrates source 2022, and can identify the conveyance of interests from a parent node to a child node. The child node can then be a parent node for purposes of a subsequent conveyance. Each diamond represents an interest created by a conveyance at some point in time, starting from source 2022 where the real property interest originated (e.g., typically by government grant). Each diamond can be considered a node in the interest tree, and can be represented by an object or container or collection of objects. Node 2040 represents an example of a node object, and is discussed in more detail below.

In one example, relationship engine 2010 can include various functional components to execute logic to change the ownership of real property rights. Any conveyance to another party changes the ownership, and there is a relationship of succession of rights based on the conveyances. When rights are split to different parties, there are also relationships among the various rights holders. In one example, relationship engine 2010 can create a relationship based on acreage split 2012, which is a division of real property into smaller plots or segments of the real property. In one example, relationship engine 2010 can create a relationship based on depth split 2014, which is a division of interests in surface and sub-surface portions of the real property. Thus, with acreage splits, the land can be segmented into smaller portions, and with depth splits, the rights to what is under the surface at various depths can be segmented.

It will be understood that as described herein, land use rights management can represent land use rights or interests as bounded space, with a conveyance to multiple separate parties or a conveyance that results in interests being held by multiple parties being referred to as a split, which creates interests represented as portions of whole rights. The portions are specifically designated subspaces within the bounded space. Rights or ownership interests can be determined by a set or array of interests as indicated by separate computer objects. Conveyances that indicate a split of rights causes the generation of multiple separate interests.

In one example, relationship engine 2010 can create a relationship based on merger 2016. Conveyances that indicate a merger of rights can cause the generation of a merged interest where rights from multiple sources can be combined in one interest as indicated by a single computer object. The merged interest can reduce the number of individual rights in the set to enable the computer to perform more efficient computation of ownership interests.

Without merger 2016, it will be understood that the conveyances can result in an exponential expansion of the number of computer objects representing separate interests that are grouped as rights. To compute interests will require traversing a significant number of nodes, which slows down ownership computation. Additionally, with overlapping interests represented by the multiple different nodes, the computation of the rights can result in errors.

Merger can enable the creation of a single object to represent merged interests, and then the merged interest object can take the place of the separate objects in the rights set. The parent objects can still exist in system 2000, which allows for verification of the results and for auditing the interests. However, certain objects whose interests are merged can be left out of the rights sets for present interest calculations, simplifying the computation of rights, resulting in faster computations by reducing the amount of data to be traversed. The simplification likely also results in more accurate computations because redundancies or overlapping representation of interests within a rights set do not need to be managed.

Thus, it will be understood that system 2000 enables the creation of new objects to represent every conveyance, and manages the objects used for computation of rights to reduce the complexity of the computations.

Referring again to interest tree 2020, root 2022 represents a starting interest. Conveyance 2032 results in a split of rights to multiple child nodes 2024. The process of splitting and merging interests can continue to child nodes 2026. In one example, all conveyances result in new objects being created. Thus, a conveyance resulting in a merger may actually result in the creation of objects to reflect the conveyance, the recognition of a merger condition that the same rights types are conveyed to a common party, and the creation of a merged node. For purposes of illustration in interest tree 2020, the merger is illustrated to reflect the relationship among the nodes, that a single ownership interest has multiple sources. For example, merger 2034 illustrates interests from multiple child nodes 2026 to a single child node 2028. Other child nodes 2028 can derive ownership interests from other conveyance paths that are not shown.

Interest tree 2020 also illustrates leaf nodes 2030. A leaf node refers to a node that has interests that have not been conveyed to a child node. In one example, system 2000 only performs computation operations on leaf nodes. Computation operations can include set operations as described above. The operations determine interest by computing the sets that represent ownership interests. As illustrated, in one example, the leaf node to the right of the page traces its interests to conveyance transaction 2036 in a split from child node 2028 on the right of the page. A separate conveyance transaction 2038 can occur concurrently with, prior to, or after 2036, and result in a transfer of rights from child 2028 on the left side of the page to leaf node 2030 on the left side of the page. Even if the interests do not result from conveyances that are contemporary, in one example, system 2000 can identify the resulting interests as being in the same party for different portions or percentages of the same rights. Based on identifying the same rights, the system can create a merged node where the rights are combined in a single object.

Node 2040 can represent any of the diamonds of interest tree 2020, and can thus represent a node in a computation graph. Node 2040 represents one or more objects within system 2000. In one example, node 2040 can be of several types. Root 2022 represents a Root node or a source node, which can split into several child nodes. Child nodes (e.g., 2024, 2026, 2028) of a split are Split nodes. In one example, Split nodes always each only have a single parent, and Merge nodes are Child nodes that have several parents instead of just one. In one example, parents of Merge nodes each only have one child (the Merge node). In one example, a split will create a new child node, and a merge will merge only the resulting child nodes. For example, for leaf node 2030 on the left to be a child node, system 2000 may actually create a separate Child node as a result of conveyance 2036, which is then combined with child node 2028 on the left to create leaf node 2030 as a Merge node. Thus, the illustration of system 2000 may include an additional operation not illustrated.

Conveyances typically expand interest tree 2020, creating new Leaf nodes, and removing Leaf-node status from existing Leaf nodes. A Split operation creates one or more Split node children under one existing Leaf node. The existing node now has children, so it is no longer a Leaf node, but its new child nodes are. Merges prevent the number of nodes from growing geometrically to the point where the tree can no longer be easily stored in memory or computed quickly. In one example, a Merge operation creates one Merge node child under two or more existing Leaf node parents. The existing parents now each have the new Merge node as a child node, and maybe their only child. When a parent node only represents interests that have been conveyed to Child nodes, the parent node is no longer a Leaf node, but the new Merge node or other Child node is. In one example, Leaf nodes can be of any of the three node types listed above, but Leaf nodes do not themselves have any children.

In one example, system 2000 keeps a list of Leaf nodes, and all tree operations are performed on the Leaf nodes only. When operations are always performed on Leaf nodes only, and not on non-Leaf nodes, the system can manage the size of the tree. In one example, once an operation has completed, the nodes that are no longer Leaf nodes can be discarded from interest calculations, seeing they do not need to be referenced again. In one example, the discarding of a non-Leaf node refers to removing the Leaf node from a rights set array, and the actual data object can be retained in the system, but managed in a way that it does not need to be traversed for computation of interests, which significantly improves system performance. The system can maintain non-Leaf nodes for example, for purposes of reviewing the tree to catch computation errors that indicate bugs in the computation engine.

In one example, node 2040 includes a relationship (such as a pointer) to its parent node or nodes, unless the node is the Root or source node 2022). In one example, node 2040 includes a relationship to its child nodes, if it has any child nodes. Node 2042 includes a field to indicate rights 2042. In one example, rights 2042 is itself an object that includes the interests (such as mineral estate rights) for the node. Rights 2042 can include multiple different types of rights, and each can include an ownership percentage. The ownership percentage can be an ownership vector with bounded space representations of the rights. Such representations can indicate not only the percentage of ownership, but the specific percentage space of the whole rights set that the interest covers.

In one example, node 2040 includes leasemap 2044, which can represent an object containing the interests mapped to current leases, such as a mapping of mineral estate rights to leases. In one example, node 2040 includes leasedmap 2046, which can represent an object containing the lease estate rights mapped to current leased rights. In one example, any or all of rights 2042, leasemap 2044, or leasedmpa 2046 can be or include a pointer to an array of objects.

Rights 2042 and leasemap 2044 can include information for rights such as: scalar surface rights (S), scalar bonus rights (B), scalar delay rights (D), scalar Ingress/egress rights (I), scalar Royalty (R, also called "NPRI" if split from the executive rights), or scalar 8/8 NPRI rights (NPRI8), or others, or a combination. Scalar mineral or executive rights (M) whether M refers to mineral or executive rights can depend on whether it is split from other rights. In one example, leasemap 2044 includes a sparse array of scalars mapping the identified rights to leases. Leasedmap 2046 can include information for rights such as: working interest rights (WI), NRI rights (NRI), LOR rights (LOR), overriding interest rights (OI), or others or a combination. In one example, leasedmap 2046 includes a sparse array of scalars mapping identified rights to leases.

It will be understood that a sparse array refers to an object keyed from 0 to (N−1), where any keys may be missing, which saves on memory and computation time to leave out unneeded keys. Typically a sparse array is sparse because while N is a relatively high number of entries or indexes (could be on the order of dozens, hundreds, or thousands, depending on the implementation of the sparse array), most of the entries have null value. The entries can be referenced by an index value. In one example, different indexes can represent different rights, and the value at the index can indicate the ownership interest. The ownership interest can be represented as a bounded space value at the index. Thus, rather than representing all entries for the array with mostly zeros, the sparse array can be configured to represent only the specific entries that have a nonzero value. A sparse array can be thought of as a set of associations.

Thus, node 2040 can include mappings to leases, which are sparse arrays 2050 that show ownership interests for the various rights. The ownership interests can be represented as ownership vectors, having a range within a bounded space. Sparse arrays 2050 can be mapped to leases 2060, which can include J leases of the rights.

In one example, system 2000 can traverse interest tree 2020 with a depth-first traversal or a breadth-first traversal. A depth-first traversal starts with leased interests and track back up to root 2022. A breadth-first traversal follows leasemap interests down to the Leaf nodes. In one example, system 2000 does not require depth-first or breadth-first tree traversal. The tree traversal can be eliminated by storing interest state only stored in the Leaf nodes, which allows system 2000 to remove all other nodes from the rights arrays. Thus, all non-Leaf nodes can be ignored or removed in one example, which saves both time and space in the computation.

In one embodiment, system 2000 enables links between nodes. In one example, system 2000 generates Links between Leaf nodes to keep full state in the Leaf nodes only. The Links can record tied rights that have been Split. In one example, each Leaf node, for each Slave right, will have an outgoing tied rights Link to another Leaf node if the Slave right has been Split from its Master right which exists in the other Leaf node. Alternatively, the Master right that the Slave right is tied to can exist in multiple other Leaf nodes. In such a case there will be multiple outgoing tied rights Links for that right.

In one example, a Link contains the weight of the Link, which is a scalar that records the total amount of the Slave right which was originally tied to the Master right in the other node. In one example, a sparse array sums to the Link weight and indicates how the right is distributed among leases and UMI.

As examples, consider that rights such as Royalty are Slave rights which are tied to the Mineral Master right, and can become untied in a Split, or retied in a Merge. NPRI is a Slave right which has Royalty as its Master, instead of Mineral. Thus, given a node containing an untied NPRI, it may be necessary to follow two Links to find the Master Mineral right: first follow the Link to the node containing the Master Royalty from which the NPRI was untied, and then follow the Link to the node containing the Master Mineral from which the Royalty was untied. When a lease occurs, UMI in the sparse array can be moved to a specific lease index, or when a lease expires a specific lease index can be moved to UMI. Following the Links in reverse and mirroring these changes in the sparse arrays of the source nodes enables system 2000 to update the ownership of the owners whose ownership is represented by those source nodes.

In one example, during a Split, any Links to or from the Split node are themselves Split up, and redirected to the children of the Split, in proportion to how much each of the externally tied Slave or Master right each child receives. In similar fashion, in one embodiment, during a merge, any Links to or from the parents of the Merge node can be redirected to the Merge node, and any Links that are congruent (in the same direction to or from the same node and of the same Slave right type) can be merged together to form one. If a merge results in a Link from a node to that same node, then the Link can be removed and the rights are considered retied.

Figure 21:
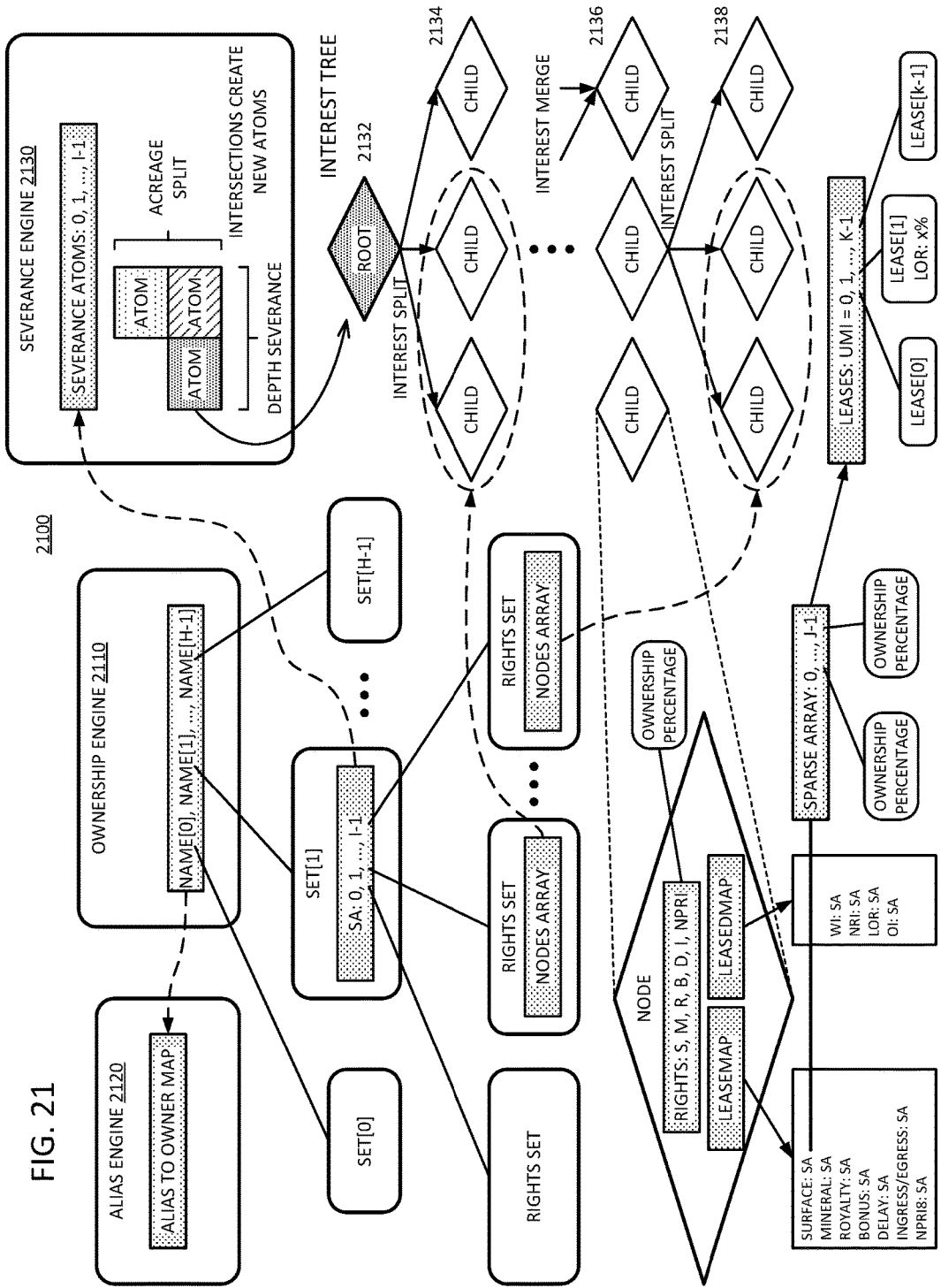
FIG. 21 is a block of an example of a system to represent real property rights conveyances including an interest split tree.

FIG. 21 is a block of an example of a system to represent real property rights conveyances including an interest split tree. System 2100 represents an example of a system in accordance with systems 1900 and 2000. System 2100 provides an example of an architecture for management of land use rights. In one example, system 2100 computes and monitors running ownership. The running ownership keeps track of the current state of ownership for each individual party.

In one example, system 2100 includes ownership engine 2110 to compute ownership interests for the H names, which represent parties with interests. In one example, system 2100 includes alias engine 2120 to identify parties to the transactions indicated by the conveyances. Thus, alias engine 2120 can provide an alias to owner map, and generate a system representation of different owners.

In one example, the H names correspond with H sets, where the sets can each include a sparse array (SA) of rights. The rights can be represented as sparse arrays of RightsSet objects. A sparse array of RightsSet objects can point to a group of nodes in the interest tree. In one example, the RightsSet is an array of Node objects. The array of nodes can point to the nodes that indicate the rights or interests of the specific party named.

In one example, each set corresponds to a severance atom. System 2100 can include severance engine 2130 to indicate the relationships among different objects that are nodes in an interest tree to identify the interests transferred in conveyances. In one example, there are I severance atoms as there are I rights. In one example, severance engine 2130 manages a sparse array of severance atoms used to indicate interests. An atom can refer to a smallest undivided severance intersection unit, where a severance atom can be an object that points to a tree of interests. Atoms can be created at the intersection of different splits or severances of rights, such as the intersection of acreage splits and depth severances. Other segmentation is possible. In one example, a RightsSet object is associated with each severance atom.

In one example, the interest tree includes a root node 2132. In response to detection of an interest split indicated by a conveyance document, system 2100 can generate multiple child nodes 2134 to represent the different parties. Other layers of child nodes can be created to represent other conveyances. In one example, an interest merge can result in the joining of multiple child nodes as illustrated with child nodes 2136. Another interest split from a child node at level 2136 results in the creation of child nodes 2138. In one example, child nodes 2138 do not have child nodes, and can thus be considered leaf nodes. The arrows from the rights sets to the interest tree indicate node arrays indicating the interests or rights possessed by various parties.

In one example, the rights point to arrays of nodes. With interest splits, the number of nodes in the interest tree explodes, and the system would have to traverse all the nodes to compute interests. The traversal of a large number of nodes is time consuming and resource intensive. As described above, with node merger, interests can be merged in a single node as illustrated in level 2136. In one example, a nodes array of a rights set points to the nodes that represent the interests of the set. With a merge node, certain child nodes can be removed from the nodes array, replaced with the merge node.

In one example, any of the nodes with the interest tree can include an indication of rights, such as S, M, R, B, D, I, NPRI, or others, or a combination. The rights can each be indicated by an ownership percentage vector. In one example, the node includes a leasemap to indicate S, M, R, B, D, I, or NPRI8 rights or other rights. Each right can have an associated interest represented by a sparse array. In one example, the node includes a leasedmap to indicate WI, NRI, LOR, or IO rights, or a combination. While not specifically shown, all lease rights, both for the leasempa and for the leasedmap can be represented by a sparse array. The sparse array can indicate ownership percentage for any of J rights, which can then point to leases, which can include K UMI. The leases can each indicate a lease percentage for the different leases.

System 2100 performs operations in response to identification of a transfer of one of multiple land use rights in real property. The system receives one or more conveyance documents and determines what rights were transferred, and to whom the rights were transferred. System 2100 generates computer objects to represent ownership interests in the real property identified in the conveyance documents. In one example, system 2100 generates a rights set to indicate an ownership interest through an array of computer objects. For a split of rights, system 2100 can generate a rights set identifying separate computer objects for separate rights sets. In one example, identifying separate parties includes identifying a new party to hold an interest. The split can result in multiple parties in interest by maintaining rights in the conveyor and transferring other rights to another party. For a merger of rights, system 2100 can combine ownership interests, such as combining bounded subspaces for a common land use right. In one example, the system generates the rights set to point to a node with the merged ownership interest and not point to other computer objects with non-merged ownership interests. In one example, system 2100 calculates ownership interests by performing set operations on the computer objects of the arrays. In one example, the system only performs set operations on leaf nodes, or computer objects that have an interest that has not been conveyed.

Figure 22:
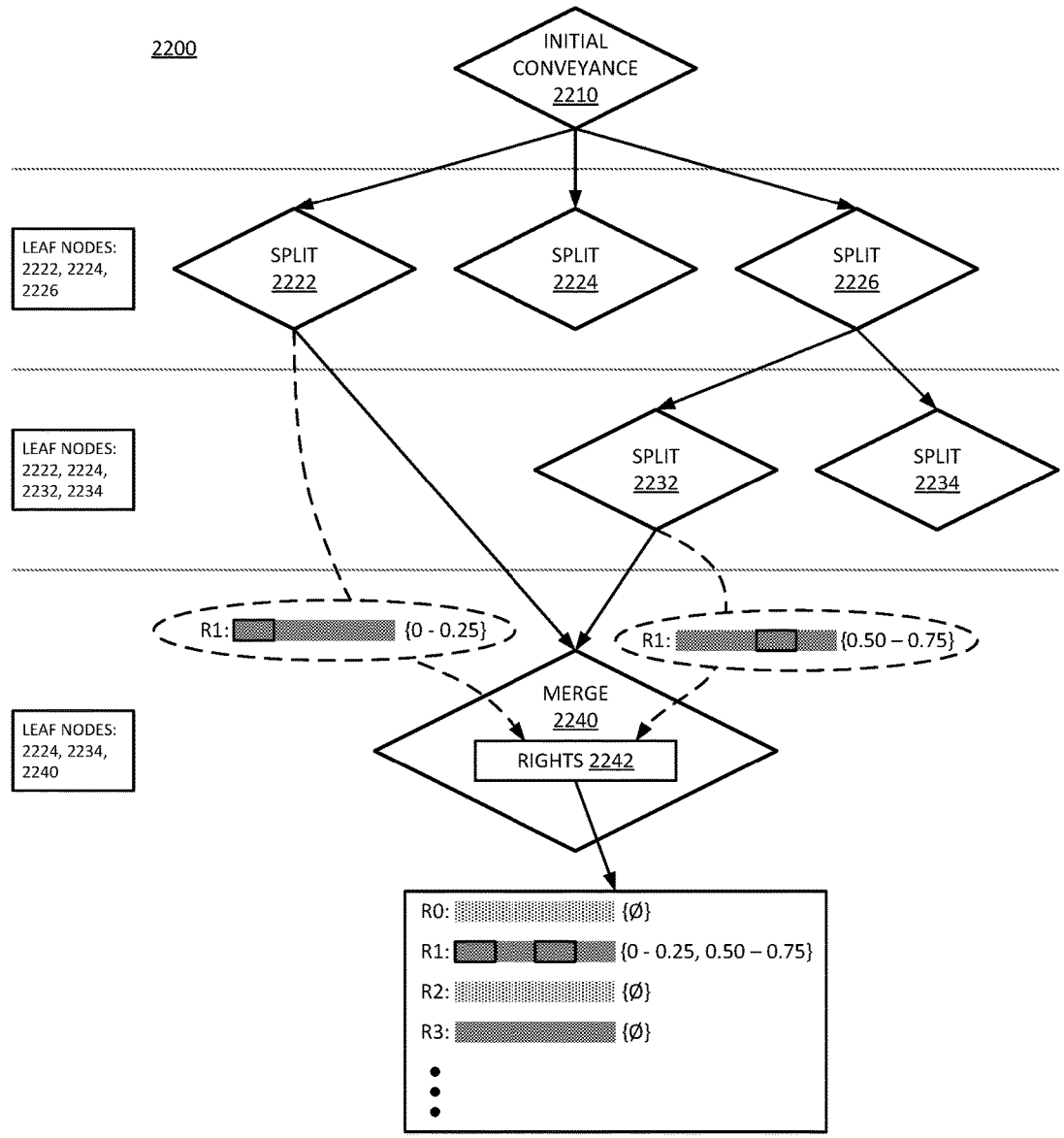
FIG. 22 is a block of an example of property rights splits and merges in a real property rights management system.

FIG. 22 is a block of an example of property rights splits and merges in a real property rights management system. Interest tree 2200 illustrates an example of conveyance data as a management system builds an interest tree. Initial conveyance 2210 represents a root node or a source of rights. In one example, initial conveyance 2210 represents the first conveyance for a section of real property. However, initial conveyance 2210 can represent any initial point in an interest tree, and initial conveyance 2210 can be a node in a larger or more detailed interest tree. The elements of interest tree 2200 are merely meant to represent the split and merger of interests, and illustrate one example of how a management system can track and represent such information.

In one example, initial conveyance 2210 divides rights or interests to three different parties, resulting in the creation of three Split nodes, node 2222, node 2224, and node 2226. A conveyance or other instrument transaction can result in multiple tree operations. For example, if multiple grantors convey interests, then not only will there be a split operation for the one grantor as illustrated in interest tree 2200, but a split operation would also be performed for each other grantor.

In one example, the number of Split nodes created in each split operation could be one more than the number of grantees, as an additional node may be needed for a remainder interest. Such an example of creating an additional node to represent the remainder interest can occur if the system only hold state in a Leaf node. Thus, the original node can no longer be used in the system to represent ownership interests because it has children, and thus a Leaf node can be created to represent the retained interest.

In one example, the management system applies tied rights links to manage and compute ownership interests. In one example, the management system keeps full state of ownership interests in the Leaf nodes only. To keep full state in the Leaf nodes only, the system can record and track tied rights that have been split. In one example, the system generates links between Leaf nodes to record the split of tied rights. In one example, each Leaf node, for each slave right, includes an outgoing tied rights link to another Leaf node if the slave right has been split from its master right which exists in the other Leaf node. In one example, the master right to which a slave right is tied can exist in multiple other Leaf nodes, in which case the system can generate multiple outgoing tied rights links for that right. In one example, each link contains the weight of the link, which can be a scalar recording the total amount of the slave right which was originally tied to the master right in the other node. In one example, the link include a sparse array which sums to the link weight, and indicates how the right is distributed among leases and UMI.

Rights such as Royalty are Slave rights which are tied to the Mineral Master right, and can become untied in a split, or retied in a merge. NPRI is a Slave right which has Royalty as its Master, instead of Mineral. Thus, given a node containing an untied NPRI, it may be necessary to follow two links to find the Master Mineral right. In such an example, the system can first follow the link to the node containing the Master Royalty from which the NPRI was untied, then follow the link to the node containing the Master Mineral from which the Royalty was untied. When a lease occurs, the system can move the UMI in the sparse array to a specific lease index, or when a lease expires a specific lease index the system can move it to UMI. Following the links in reverse and mirroring these changes in the sparse arrays of the source nodes enables the management system to update the ownership of the owners whose ownership is represented by those source nodes.

In one example, during a split operation, for links between nodes that are split, the management system can split the links themselves. In one example, with the splitting of the links associated with Split nodes, the management system can redirect the links to the children of the Split node, in proportion to how much each of the externally tied slave or master right each child receives. In one example, during a merge operation, the management system redirects links to or from the parents of the merge node to the merge node, and any of these links that are congruent (in the same direction to or from the same node and of the same slave right type) can be merged together to form one. If a merge results in a link from a node to that same node, in one example, the system removes the link and considers the rights to be retied.

For purposes of interest tree 2200, after the initial conveyance, the leaf nodes will be nodes 2222, 2224, and 2226. In one example, the node for initial conveyance 2210 does not hold state for computation of interests by the management system. Consider a subsequent split transaction in which the interests represented by Split node 2226 are conveyed to separate parties, whether those separate parties are multiple parties other than the grantor, or whether the separate parties include the grantor and one or more additional parties. As illustrated, the system creates Split nodes 2232 and 2234. At this point, the Leaf nodes would be nodes 2222, 2224, 2232, and 2234.

Consider a subsequent conveyance that joins rights from multiple parties to a single party. In one example, as described, the system can perform a merge operation. Merge operations take place when there are multiple grantors in a conveyance, or when interest is granted to a grantee who already owns interest from a previous transaction. The diagram of interest tree 2200 can illustrate either case, but an example of interest tree 2200 can be interpreted differently depending on which case exists.

In one example, there are multiple grantors and multiple grantees. In such a case, consider that node 2222 represents the rights of the first grantor, and node 2226 represents the rights of the second grantor. In one example, to represent the conveyance of rights from the two grantors to a single grantee, the management system first performs a split operation, to create Split nodes 2232 and 2234, where node 2234 represents either a remainder interest for the grantor of the rights represented in node 2226, or represents an interest to a separate party. Node 2232 represents the rights to be conveyed to the same party who is also receiving the rights represented by node 2222. After the split operation, the management system can perform a merge operation to merge the rights of nodes 2222 and 2232 into Merge node 2240.

For purposes of illustration, consider that the rights conveyed from node 2222 is the set for R1 (some real property interest) with the ownership percentage [0-0.25], and the rights conveyed from node 2232 is the set for R1 with the ownership percentage [0.50-0.75]. It will be understood that there is infinite variation in how rights might be merged. For example, multiple different rights could be merged, instead of just the rights of R1. For purposes of simplicity, the rights represented as R0, R2, R3, and others are assumed to be null. However, in one example, one or more of those rights may have a value. Rights 2242 represents all rights R0, R1, R2, ..., which might be indicated in a node of interest tree 2200. After merger, in one example, the Leaf nodes of interest tree 2200 are nodes 2224, 2234, and 2240.

In another example of merger, there may be separate grantors but only a single grantee. Nodes 2222 and 2232 can represent the rights of the multiple grantor, and both grantors will grant all rights to the single grantee indicated in node 2240. In such a case, the management system may not need to perform split operations, but rather simply merges the interests of the multiple grantors into Merge node 2240. Again, after the merger the Leaf nodes of interest tree 2200 are nodes 2224, 2234, and 2240.

In one example, the management system can generate tied rights links. In one example, the system creates new links whenever a node is split to result in a slave right from one sibling tied to the master of another right. For example, perhaps NPRI rights are split from Royalty or Executive rights. In one example, the management system manages a special case when new links are created in a split operation and one sibling of the split has a new link in a certain slave right created to its other sibling, but that other sibling already has a link of the same slave right to another Leaf node that is not a sibling of the split. In such a case, in one example, if the sparse arrays of the two links partially match or equally match, then the matching portion can be subtracted from them and moved to a new Link, or added to an existing Link if present, from the first sibling to the non-sibling node. This has the result of maximizing the tied rights in a split. In one example, for each sparse array index in this case, the minimum of the two values at that index in the two sparse arrays can be subtracted or added. In one example, the system generates maximally tied rights to keep the computation results logically correct, although whether it should be used in every single case may be a legal determination.

In one example of merger, in the case of multiple grantors to multiple grantees where a merger will be performed for one of the grantees, in one example, the system first performs split operations on each grantor, followed by merge operations for each grantee. The merge operation can determine whether or not a merge should be performed, and then execute it. Such a case illustrates an example where tied rights do not become retied until they reach the grantee, and any remainder rights go to the grantor who owned them originally.

Figure 23:
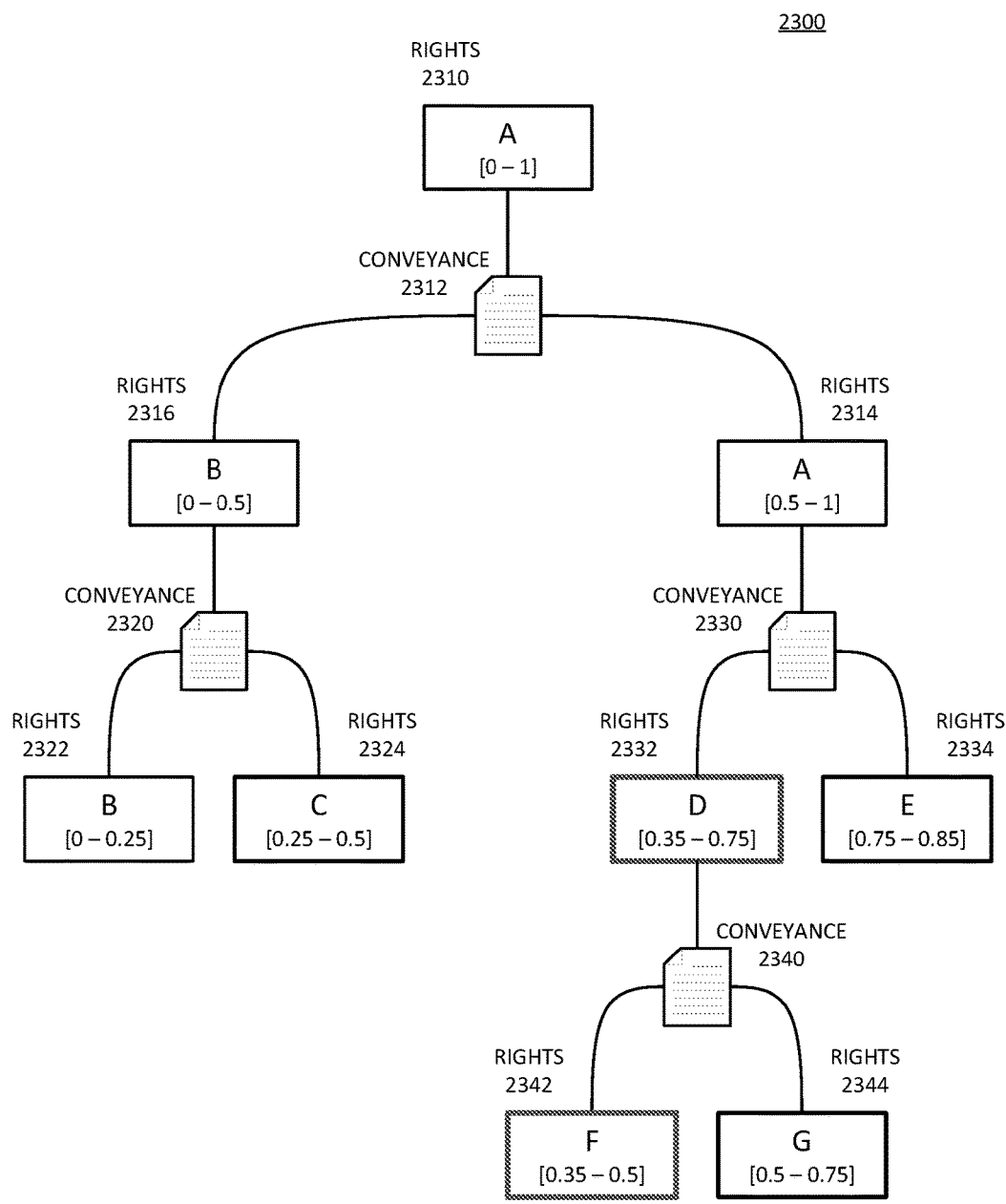
FIG. 23 is a representation of an example of a conveyance flowchart illustrating ownership evaluation based on interval sets.

FIG. 23 is a representation of an example of a conveyance flowchart illustrating ownership evaluation based on interval sets. Diagram 2300 illustrates a conveyance scenario similar what is depicted with respect to previous diagrams, and which can be created by the hardware systems described herein. For purposes of illustration, diagram 2300 includes blocks to represent rights bundles that result from a conveyance or property rights transaction. The rights can be understood as node objects or object collections. Diagram 2300 also includes a representation of conveyances, which will be understood to be objects with properties defining the property rights transaction. The representations in diagram 2300 are not limiting, but merely representative of how the various objects are perceived by a user. Within the computing system, the system can label and define the objects in any way that makes sense for the system to perform rights management.

Diagram 2300 illustrates specific conveyance portions, which are provided for purposes of example, and any portions could exist. Additionally, a single bounded space is illustrated, and any rights in diagram 2300 could be a node or object with many rights sets. The use of a single bounded space is for simplicity in description, and a practical system would benefit from tracking all rights conveyed, with separate bounded spaces for each right. It will be understood that there is an infinite combination of portions and conveyances that can be represented for diagram 2300.

In one example, rights 2310 is an initial point for diagram 2300. For example, rights 2310 can represent an ownership node where rights began, such as a government deed. Alternatively, diagram 2300 could be a subset of a larger conveyance transaction, and rights 2310 can represent a node of verified rights as the starting point for evaluating rights based on subsequent conveyances. Rights 2310 illustrates that A has 100% ownership of the rights, as represented by the interval [0-1]. For purposes of diagram 2300, consider that with conveyance 2312, A intends to convey 50% of the rights to B. Rights 2314 illustrates that conveyance 2312 created a remainder in A, for [0.5-1], and rights 2316 illustrates the interest created in B, for [0-0.5]. Assume that these transactions are valid and effective. It will be understood that the conveyance documents can represent one or more conveyance documents each. A single conveyance document can illustrate a conveyance to one party or to multiple parties. Multiple conveyance documents can be used to perform conveyances, or a single conveyance can perform multiple conveyances.

If conveyance 2312 is valid and effective, when B conveys 50% of B's rights to C with conveyance 2320, B has valid rights to convey. Rights 2322 illustrates with interval [0-0.25] B's remainder, and rights 2324 illustrates with interval [0.25-0.5] C's rights. Both of these rights should be valid. However, as will be seen, depending on a future conveyance by A, C's rights may overlap and therefore conflict with other rights. Thus, rights 2324 are illustrated in a darker line to represent the potential question or potential conflict of rights.

Consider that sometime after conveyance 2312, A intends to convey the remaining 50% of rights 2314. If the conveyance is incorrect, whether by intent (a fraudulent transaction perpetrated on others), or by mistake (such as by incorrectly identifying the rights conveyed), the resulting rights may be invalid, or inferior to the perfected rights of others. Thus, conveyance 2330 represents an improper conveyance. The computing system does not need to determine a morality of the conveyance (i.e., it does not need to determine whether the conveyance is an innocent or an intentional error), but merely track what rights are conveyed to indicate the validity of subsequent rights.

Assume that in conveyance 2330, A intends to convey the remaining 50% rights, but instead attempts to convey the interval [0.35-0.75] to C, and the interval [0.75-0.85] to D. Rights 2334 illustrates the interval [0.75-0.85] for D, as the darker line of the box represents how the conveyance may be in error. It will be observed that the interval [0.75-0.85] does not conflict with any rights conveyed to B, and from B to C. However, since conveyance 2330 is in error, rights 2334, which do not overlap with other rights conveyed, may also be called into question. Rights 2332 of D overlap with rights 2324 of C, because the intersection of [0.35-0.75] with [0.25-0.5] is not a null set, but is [0.35-0.5]. In one example, the management system can identify a conflict of rights with such a computation.

Additionally, if D executes subsequent conveyance 2340 to convey rights 2342 with [0.35-0.5] to F, and rights 2344 with interval [0.5-0.75] to G, the overlap of D's rights is now in F. F's rights 2342 are in error and are thus represented by a darker gray line. Even though conveyance 2340 may purport to convey rights 2344 to G, which do not overlap with any rights of B or C, nor do they overlap with E, there may still be a question of the validity of the rights that can be further explored. Perhaps G's rights 2344 will be determined to be valid, and perhaps they will not.

In one example, the management system can map all purported conveyances and determine, as in diagram 2300, what rights have been conveyed to whom. By tracking the specific intervals of the conveyance, the management system will not confuse two 50% conveyances as being a complete transfer of 100% of rights when the separate conveyances have overlap of rights purported to be conveyed. As such, the system can identify errors in the chain of title and determine what rights are in question.

Figure 24:
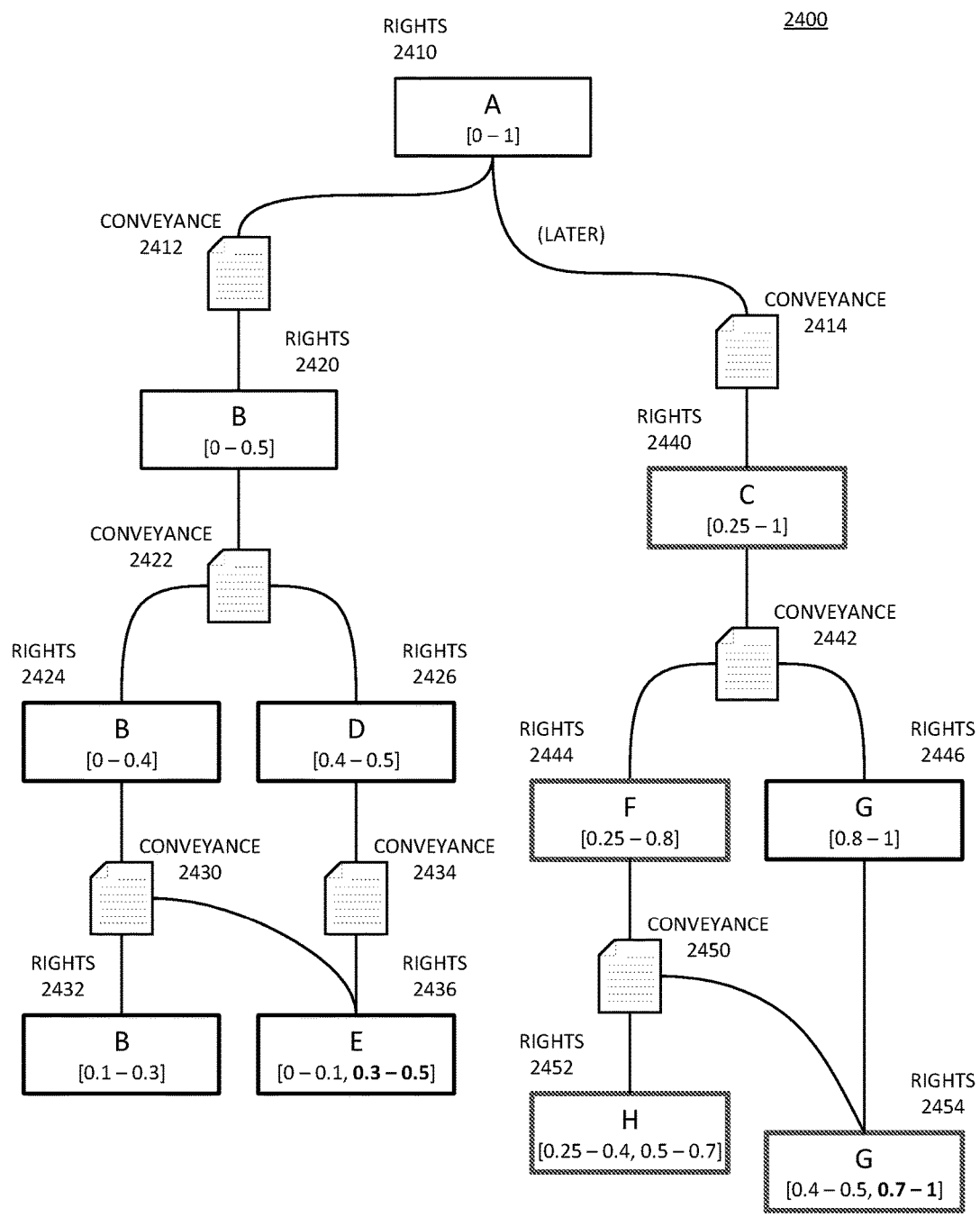
FIG. 24 is a representation of an example of a conveyance flowchart illustrating ownership evaluation based on interval sets and merger and split management.

FIG. 24 is a representation of an example of a conveyance flowchart illustrating ownership evaluation based on interval sets and merger and split management. Diagram 2400 is in accordance with diagram 2300 of FIG. 23. Namely, conveyances represent documents or instruments that effect a transfer of property rights, where only a single right is shown for simplicity and the rights represent the amount of ownership or control over the rights. The rights are labeled as "rights" in the diagram, with lines illustrating the relationships between rights and conveyances. Rights source back to a conveyance, and the management system or management engine can determine the validity of rights by evaluating the flow of conveyances. The management system can generate and manipulate objects to represent the conveyances. The management system can generate and manipulate objects to represent the rights. Diagram 2400 illustrates a non-limiting example. The rights objects include an interval representation of the rights, which allows for tracking of specific rights. Additionally, diagram 2400 includes errors in the conveyance, and illustrates rights that may be called into question or that have a conflict in a dark line, and rights that are erroneous in a thicker gray line.

Consider the starting point for diagram 2400 to be the rights held by A, rights 2410. Thus, rights 2410 illustrates rights as the interval [0-1]. Conveyance 2412 represents a conveyance that comes first in time, and conveys rights 2420 to B, with interval [0-0.5]. It will be understood that with conveyance 2412, A will also retain rights, which are excluded from diagram 2400 for simplicity. In a practical implementation of a management system, A's remainder rights could be represented.

Consider that conveyance 2414 is a conveyance that is later in time relative to conveyance 2412, and purports to convey rights 2440 to C, with interval [0.25-1]. It will be understood that conveyance 2414 cannot be correct, since at the time of conveyance 2414, A only held the rights represented by the interval [0.5-1]. Thus, rights [0.25-0.5] are purported to be owned by both B and by C. In one example, the management system can identify such a rights conflict by set operations, such as by intersecting the rights of the two "branches" of the conveyance from A. In one example, the management system performs a check by intersecting rights held by all parties at each point in time when a new conveyance occurs. Diagram 2400 is not necessarily laid out in a timeline, but could be with information about when each of the separate conveyances occurs. Thus, the management system can evaluate the specific interval or portion of rights purported to be conveyed, and determine at each point in time what rights are held where. Based on the timing of the transactions, the management system can also determine what rights came first in time, and flag the rights as having a preferred date for determination of whose rights control, for example.

The branch of diagram 2400 that goes through B includes conveyance 2422 to convey rights 2424 to B, with interval [0-0.4] and rights 2426 to D, with interval [0.4-0.5]. If conveyance 2412 is proper, then B actually has the rights conveyed, even though they can be determined to overlap with rights 2440 purported to be conveyed to C through conveyance 2414. Furthermore, if D executes conveyance 2434 to transfer all rights to E, and B executes conveyance 2430 to convey some rights to E, the management system can manage the rights splits in accordance with any example provided. The result of conveyances 2430 and 2434 is that B has rights 2432 with [0.1-0.3], and E has rights 2436 with [0-0.1, 0.3-0.5]. It will be observed that with a rights split, new objects can be created to represent the rights, with appropriate intervals, such as rights 2424 and 2426. Rights 2436 illustrates an example of a merger, in which rights from D and rights from B are merged into an object that represents both rights, including modifying interval [0.4-0.5] from rights 2426 to [0.3-0.5] in rights 2436. In one example, the management system accomplishes a modification of an interval by changing properties of an existing object. In one example, the management system accomplishes a modification of an interval by creating a new object and eliminating previous objects.

The branch of diagram 2400 that passes through C could potentially create many errors. Diagram 2400 illustrates how split and merger can result in affected rights sets based on an improper starting point. Assume that C subsequently conveys all rights to F and G. Even if conveyance 2442 is executed properly, it may result in improper rights sets because C does not have the rights purported to be conveyed. Consider rights 2444 to F, with [0.25-0.8]. It can be observed that the interval of rights 2444 overlap with rights 2420 of B, as well as rights 2424 of B and rights 2426 of D, and rights 2432 of B and rights 2436 of E. Thus, in any scenario, the management system can find a conflict with rights 2444 of F. However, it will be observed that rights 2446 for G has an interval of [0.8-1], which does not overlap with any party in the branch starting with B at conveyance 2412. At that point in time, G's rights may be valid, because the split of rights only conveyed undisputed rights to G.

However, further assume that F splits rights between H and G with conveyance 2450. Conveyance 2450 purports to convey rights 2452 to H, with interval [0.25-0.4, 0.5-0.7]. The interval includes one portion that does not overlap ([0.5-0.7]) and another portion that does overlap ([0.25-0.4]) with rights of parties in B's branch of diagram 2400. Thus, the rights overlap and there is a conflict. It will also be observed that conveyance 2450 results in a merger with rights G already held, resulting in rights 2454 to G with interval [0.4-0.5, 0.7-1]. The interval [0.7-1] is the merger portion, and is highlighted for illustration here. It will be observed that the merger portion still does not overlap with any rights in B's branch, although one of skill in the art will understand a different scenario that could be created where a merger results in an overlap of rights where an overlap did not previously exist. In any case, conveyance 2450 resulted in rights 2454 that include a portion that overlaps with rights in B's branch, and results in a clear conflict of rights that the management system can flag for consideration.

Figure 25:
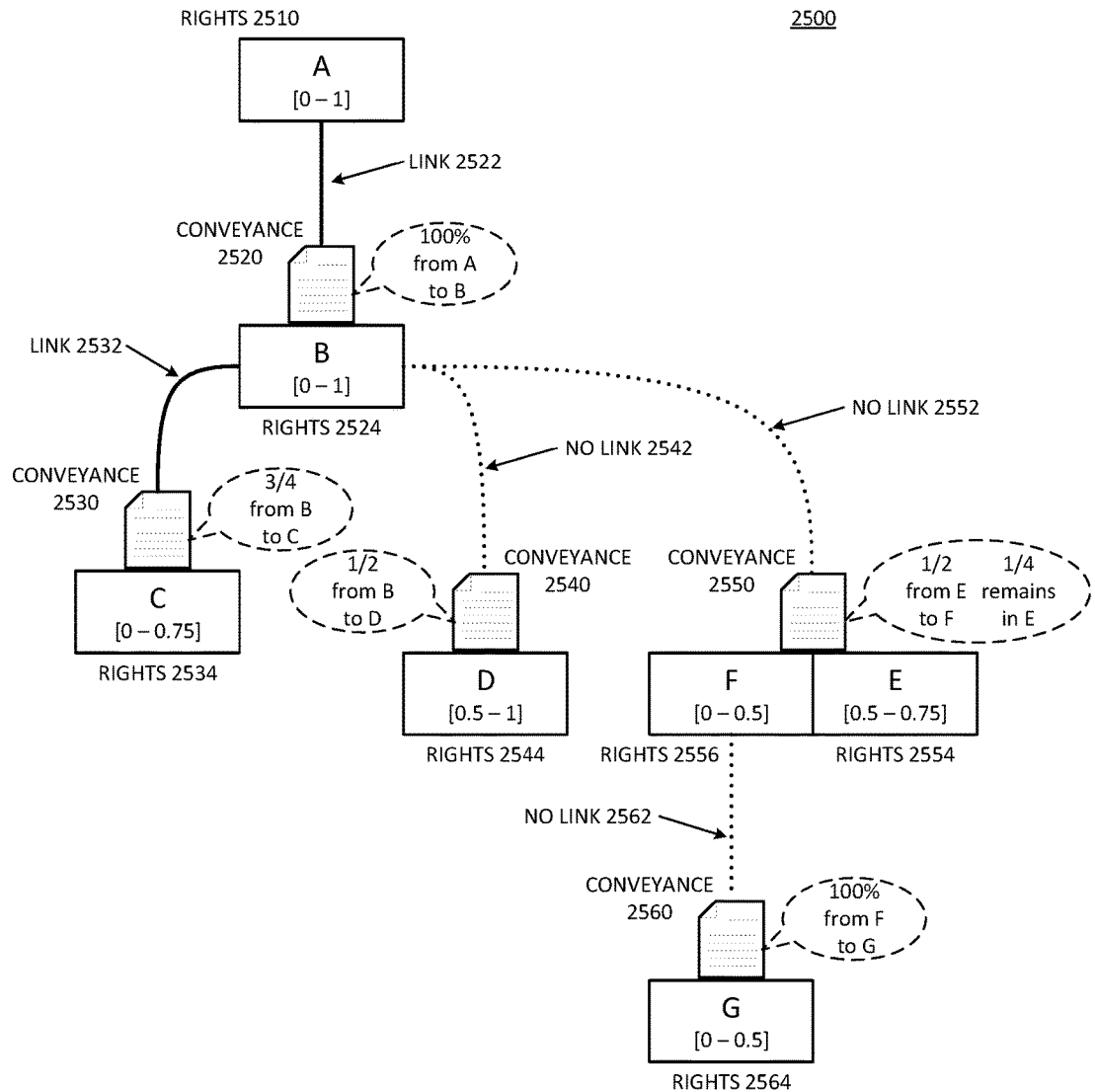
FIG. 25 is a representation of an example of a conveyance flowchart illustrating floating objects.

FIG. 25 is a representation of an example of a conveyance flowchart illustrating floating objects. Diagram 2500 illustrates a conveyance scenario similar what is depicted with respect to previous diagrams, and which can be created by the hardware systems described herein. For purposes of illustration, diagram 2500 includes blocks to represent rights bundles that result from a conveyance or property rights transaction. In diagram 2500, conveyance documents include a representation in a dashed oval that indicates the intent of the conveyance document, and the blocks underneath the documents represent the rights intended to result from the conveyance. The lines between the rights blocks and the documents indicate relationships in the system that tie a conveyance back to the source of the rights. The rights can be understood as node objects or object collections.

Diagram 2500 illustrates specific conveyance ranges, which are provided by way of example, and any range of rights could exist. While the various rights illustrate a single bounded space as the rights range, the rights illustrated could be a node or object with many rights sets. The conveyances can be understood to be objects with properties defining the property rights transaction. The representations in diagram 2500 are not limiting, but merely representative of how the various objects are perceived by a user. Within the computing system, the system can label and define the objects in any way that makes sense for the system to perform rights management.

In one example, rights 2510 is an initial point for diagram 2500. For example, rights 2510 can represent an ownership node where rights began, such as a government deed. Alternatively, diagram 2500 could be a subset of a larger conveyance transaction, and rights 2510 can represent a node of verified rights as the starting point for evaluating rights based on subsequent conveyances. Rights 2510 illustrates that A has 100% ownership of the rights, as represented by the interval [0-1].

For purposes of diagram 2500, conveyance 2520 illustrates an intended conveyance of all rights from A to B. Assuming the transaction is valid, diagram 2500 can illustrate link 2522, which can also be referred to as a relationship between A and B as defined by the conveyance document. The relationship can be considered to be between conveyances. The system can represent the relationship based on the parameters of various objects illustrated in diagram 2500. If conveyance 2520 successfully transfers all rights from A to B, B has 100% ownership of the rights as represented by rights 2524, with interval [0-1].

Consider a subsequent conveyance 2530 executed by B, to convey ¾ of the rights from B to C. Assuming conveyance 2530 is proper, the result is that C has rights 2534, as illustrated by interval [0-0.75]. While not explicitly shown, if rights [0-0.75] are transferred to C, then rights [0.75-1] remain in B. Thus, at that point B only has rights [0.75-1] left to convey.

Assume that after conveyance 2530, there is a purported subsequent conveyance 2540. Whether conveyance 2540 is fraudulent or by some mistake, conveyance 2540 is in error because it purports to convey more rights than B holds at that point. Conveyance 2540 intends to convey one half of B's rights to D, and more specifically, is identified by interval [0.5-1]. For example, considering that B still holds rights [0.75-1] after the conveyance to C, the conveyance to D could have identified the portion that was intended (i.e., [0.75-1]) as well as a portion of what had previously been granted (i.e., [0.5-0.75]), which could then not be granted again. Rights 2544 identifies what the results of the transaction of conveyance 2540 would be. In one example, conveyance 2540 can be considered a floating conveyance, as the system can generate the information but not form a relationship to the previous chain. Thus, diagram 2500 has no link 2542, because conveyance 2544 purports to convey rights that the system identifies as rights that are not owned and can thus not be conveyed. The overconveyance of rights can be one example of a resulting floating conveyance.

Conveyance 2550 purports to convey ½ of rights from E to F, with ¼ of the rights remaining in E. As illustrated, the remainder can be represented by rights 2554 with interval [0.5-0.75], while the conveyance to F is represented by rights 2556 with interval [0-0.5]. It will be understood that E is a party that is not previously identified in the chain of title of diagram 2500. Thus, there is no traceable interest back to A from E. As such, the system can determine that conveyance 2550 by E is in error, and there is no link 2552. Perhaps there was a misunderstanding or disagreement, and E asserted the rights that had been conveyed to C. Perhaps E is aware that E has no rights, but transacts with F. In one example, in any case, the system can determine that E is not a party to any prior transaction, and thus has no rights to convey. Conveyance 2550 illustrates another type of floating conveyance that can be represented, where a stranger (a non-party) to the chain purports to convey rights within the chain. In one example, the system does not create a relationship, or identifies the lack of relationship.

Suppose that F in good faith believes that valid rights were acquired from E, and subsequently executes conveyance 2560 purporting to transfer all rights from F to G. The rights identified in conveyance 2560 can be identified as rights 2564 with interval [0-0.5], which are the rights F believes are owned. Even if the rights are correctly identified, since F had no legal title to the identified rights, there were no legal rights to transfer, and no valid relationship can exist within the chain of title. Thus, in one example, the system can identify the transaction, and generate objects to represent the conveyance and rights, but no link 2562 exists because there were no rights to convey. Thus, conveyance 2560 can illustrate another type of floating conveyance, where a conveyance in good faith derives from a person that has no legal rights to convey, resulting in a failed transaction. In one example, the system can identify such a transaction and not create a link in the chain of title.

Figure 26:
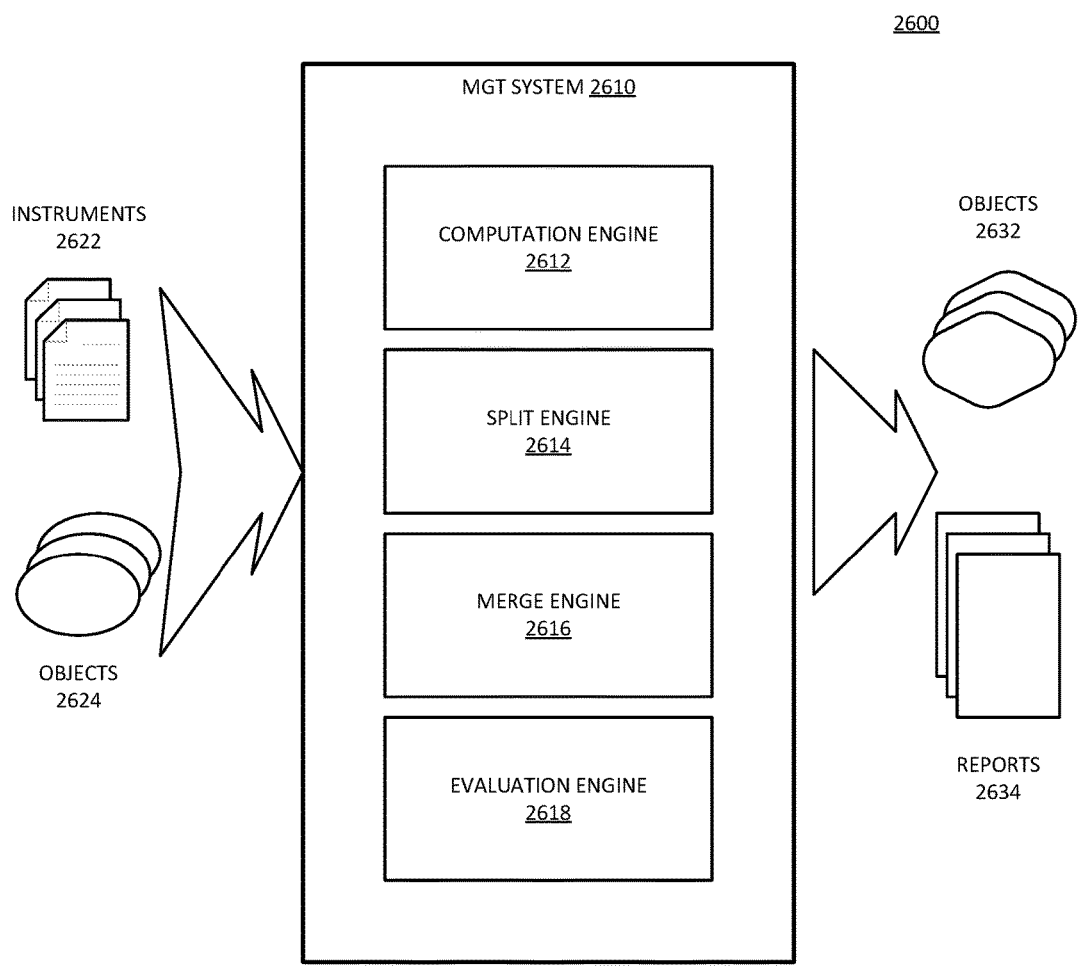
FIG. 26 is a block diagram of an example of a management system that computes conveyance relationships based on bounded space representations.

FIG. 26 is a block diagram of an example of a management system that computes conveyance relationships based on bounded space representations. System 2600 includes a management system in accordance with what is described herein, represented by management system 2610. It will be understood that while not explicitly illustrated in system 2600, hardware elements execute the management system. Management system 2610 in accordance with what is described herein improves the operations of a computing system. The representation of rights as interval sets allows tracking and management of property rights that has never been possible. By identifying the specific intervals of rights conveyed, the system improves operation by tracking specific conveyances and can trace those conveyances in a way that is actually understandable to a user.

Additionally, with split and merger operations as described herein, management system 2610 enables an improvement and efficiency of a computer system. Management of property rights through the use of bounded intervals can result in a memory and computational burden on a traditional computing system. With the set operations as described, the computer system can operate more effectively by managing the actual rights transferred with each transaction. With split and merge operations as described, the computer system can operate more efficiently by management of computational resources needed and memory management needed to manage the land use rights. Other advantages will also be understood by those skilled in the art.

In one example, management system 2610 receives instruments 2622 or representations of land use rights conveyances or transactions. Management system 2610 represents instruments 2622 as objects with conveyance properties to define the parameters of a land use rights transaction. Management system 2610 can also receive or create objects 2624 to represent the parties to the transactions, and to represent the rights of the parties including the rights intervals.

In one example, management system 2610 generates objects 2632, which can be different objects to represent modified rights. In one example, management system 2610 generates objects 2632, which can be modified versions of objects 2622 to represent modified rights. In one example, management system 2610 generates one or more reports 2634, which represents information provided to represent the results of land rights use transactions represented by instruments 2622. The reports can be generated and provided as a graphical representation or as a file that can be saved for retrieval or sent to a user.

In one example, management system 2610 includes computation engine 2612, which represents components to perform computations on land use rights. The computations include set operations as described herein. Computation engine 2612 can perform calculations to determine whether rights on different branches of a land rights use tree are valid.

In one example, management system 2610 includes split engine 2614. Split engine 2614 enables management system 2610 to perform rights splits in accordance with any example provided. The splits enable management system 2610 to replace objects with other objects to represent land use rights. In one example, management system 2610 includes merge engine 2616. Merge engine 2616 enables management system 2610 to perform rights merges in accordance with any example provided. The merges enable management system 2610 to control the number of objects used to represent land use rights by combining rights into merged objects instead of just grouping or concatenating information.

In one example, management system 2610 includes evaluation engine 2618. Evaluation engine 2618 enables management system 2610 to utilize the engines illustrated or other components, or a combination, to determine what rights are held by parties at various locations on a timeline tree of land use rights, or at specific points in time. In accordance with what is described herein, evaluation engine 2618 can determine when there is a conflict of rights or when rights overlap. Evaluation engine 2618 may also determine that there is no conflict of rights and indicate such a state. When overlaps occur, in one example, evaluation engine 2618 can identify a specific overlap based on the intervals of rights provided to represent rights in management system 2610. Thus, management system 2610 can identify a specific document that created a conflict of rights and identify specific rights that can be further investigated to determine which rights control.

Figure 27:
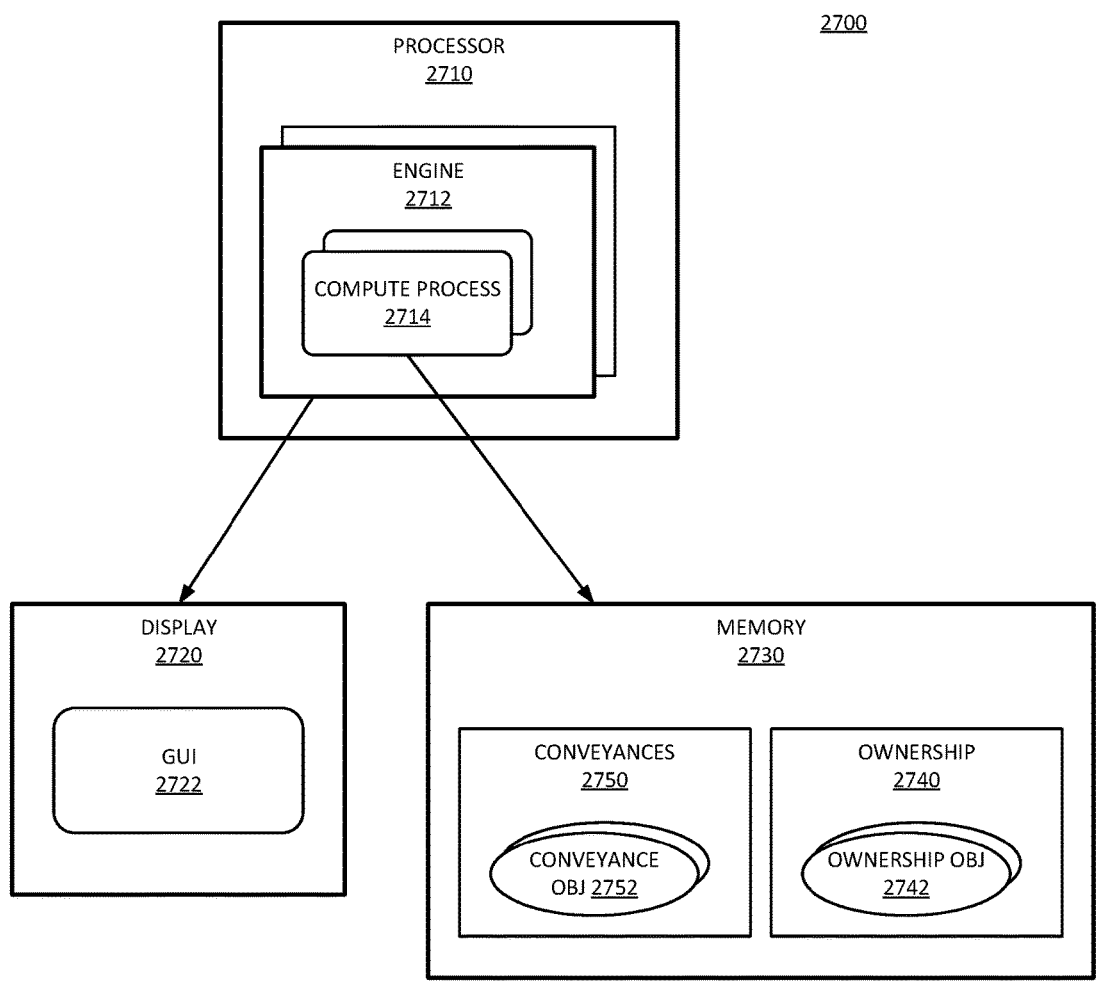
FIG. 27 is a block of an example of a system to manage real property rights ownership and conveyances.

FIG. 27 is a block of an example of a system to manage real property rights ownership and conveyances. System 2700 represents hardware elements that can execute a management system in accordance with what is described herein. System 2700 can be part of any of system 1600, system 1700, or system 1800. System 2700 represents a computing system configured to execute such a management system, which can be in accordance with any land use management system or other management system such as what is described with reference system 2000 or others. The computing system can be or include a desktop or laptop computer, or a server, or part of a cloud computing node. The cloud computing node typically is or includes a blade or modular hardware configuration where operations are spread across many hardware elements depending on availability of hardware resources and requests for computational tasks.

System 2700 includes hardware computational resource as illustrated by processor 2710. Processor can be or include any type of processor to execute the management tasks. The management tasks can include performing split operations and merger operations. The management tasks can include computation of rights. Processor 2710, as part of the management, can create computer objects within memory 2730.

The creation or generation of computer objects is often referred to as instantiation of an object, which refers to allocating memory space and configuring the structured data of the object for execution of its routines and services. In one example, memory 2730 includes ownership architecture 2740 with ownership objects 2742, and conveyance management 2750 with conveyance objects 2752. Ownership objects 2742 refer to objects that represent ownership interests. As described herein, system 2700 can generate ownership objects 2742 in response to conveyances to represent the various interests resulting from transfers of rights, including splitting of rights and division of rights. Ownership objects 2742 can also include merger objects to represent the merger of interests from multiple parties to a single party or a joining of interests from multiple grantors in a single grantee.

In one example, the ownership objects and the conveyance objects can at least partially overlap, in that the system generates the conveyance information and manages the ownership by associating conveyance information with ownership information. Conveyance objects 2752 represent the objects created and used by system 2700 to organize the real property interests. In one example, ownership objects 2742 can refer to the interest tree node objects, and conveyance objects 2752 can refer to the arrays and other architectural components of the management system and the link objects to manage the ownership.

In one example, system 2700 includes a display or display driver 2720. Display 2720 represents the engine to generate and send information to create a graphical user interface or GUI 2722 for viewing by a user. The GUI can include interactive components as described herein to provide information about the conveyances and the ownership interests or land use interests.

Processor 2710 executes the management engine or engines that perform the operations to create the objects and manage the objects stored in memory 2730. Engine 2712 represents the one or more engines, and can determine when to create objects and when to merge and eliminate objects. Engine 2712 can also drive the creation of GUI information for display 2720 to provide a visual representation of the rights. Engines 2712 are implemented by one or more compute processes 2714, which can represent code or logic that is executed to perform the operations of object creation, splitting, merger, computation operations, or other operations, or a combination. In one example, different compute processes 2714 are executed for different operations.

In one example, system 2700 through engine 2712 generates and manages sparse arrays to provide associations between objects that represent the conveyance transactions and the interests held by a party. With the associations defined by the indexes in sparse arrays, engine 2712 can perform vector operations such as scaling, addition, and subtraction. Performing set operations on sparse arrays can allow engine 2712 and its compute processes 2714 to preserve the object associations in the resulting output. Similarly, the sparse arrays that define the associations to severance atoms enables engine 2712 and its compute processes 2715 to perform vector operations on the arrays, such as union, intersection, negation, or others, or a combination.

In one example, engines 2712 include a compute process 2714 to identify a transfer of rights or interests from a conveyance transaction. In response to the conveyance, engines 2712 can perform other compute processes 2714 to represent the conveyance information in objects of an interest tree, and update ownership information. The system can compute interests by traversing the resulting structure of computer objects, with bounded space rights representation, and associations between objects. The associations can include links or pointers from one object to another. The links can be considered a type of pointer in one example.

The associations can include making objects part of a sparse array that represents ownership or lease information, or other management representation. The objects are selectively placed in and taken out of the structures to represent the current interests based on conveyance information received.

Figure 28:
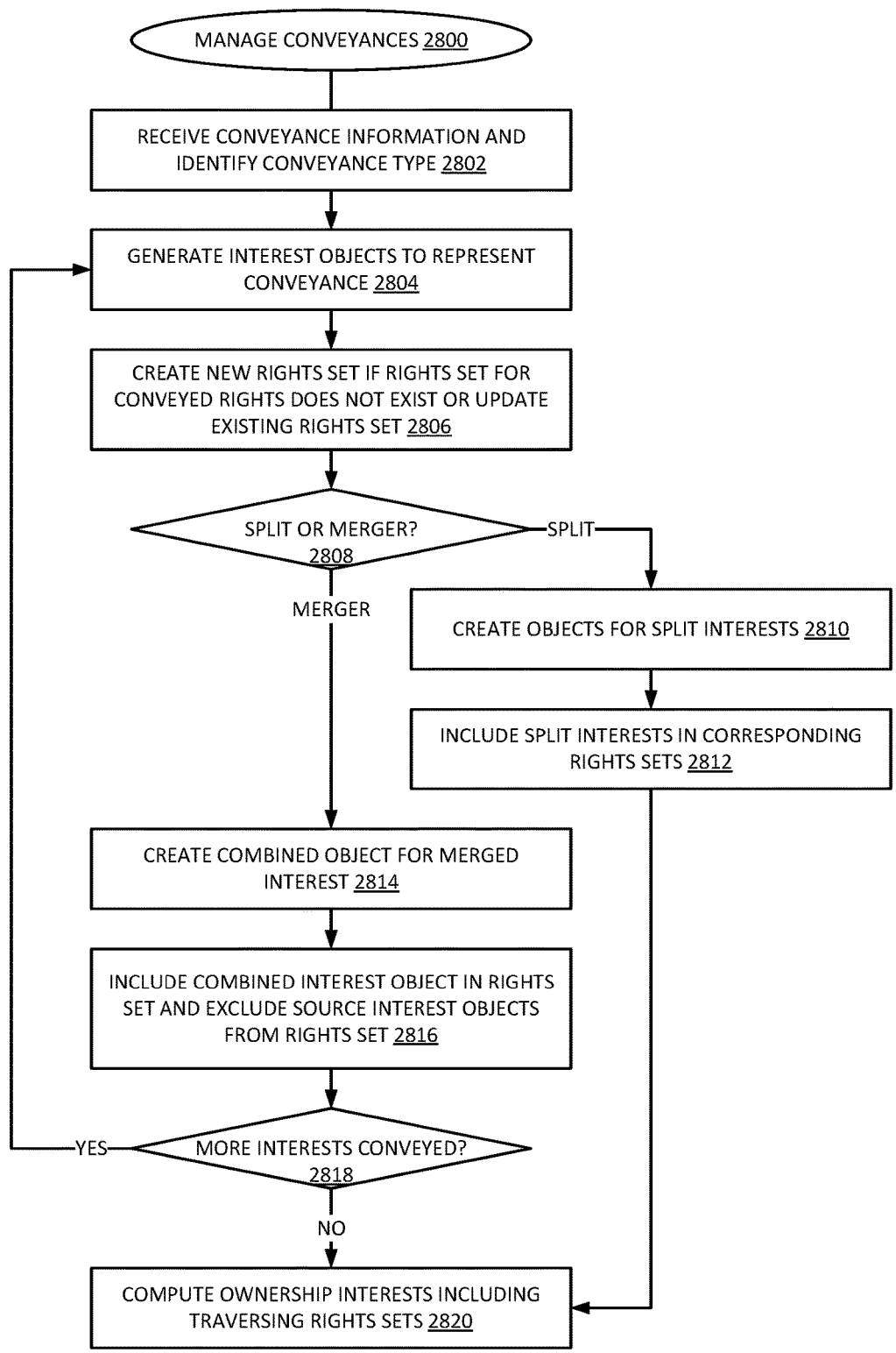
FIG. 28 is an example of a flow diagram of a process for managing real property rights with object splits and merges.

FIG. 28 is an example of a flow diagram of a process for managing real property rights with object splits and merges. Process 2800 for managing conveyances can be performed, for example, by system 2700, by system 2600, by system 2500, by system 2100, or others. The conveyance management is referred to generally, and can include the management of the computing resources by managing the architecture used to manage the property interests.

In one example, the management system receives conveyance information and identifies a conveyance type indicated in the conveyance information, 2802. In one example, the system allows for the input of documents or allows the user to fill out a document with information to input into the system. The conveyance documents can indicate different types of conveyances to different parties.

In one example, the system generates one or more interest objects to represent the conveyance, 2804. The generation of the interest objects can refer to the objects used to indicate the rights resulting from the transfer of the conveyance transaction. In one example, the management system creates new rights sets if no rights set exists, or updates an existing rights set, depending on the conveyance of rights, 2806. In one example, the rights set points to interest objects or holds interest objects such as an array of objects or an object container. For a modification to a rights set, the system can adjust what objects are pointed to or contained within the array, or adjust a value of an object in the array.

In one example, the system performs different operations based on whether the conveyance includes a split or a merger, 2808. In the case of a split of interests, 2808 SPLIT branch, in one example, the system can create objects to represent the split interests, 2810. For example, the system can create child nodes to represent the splits. In one example, the node objects are separate from the interest objects that indicate the rights percentages held. In one example, a node object includes one or more rights objects or one or more sparse array objects, or both. In one example, the system includes split interests in corresponding rights sets 2812, to represent the current rights. In one example, the inclusion of the split interests also corresponds with the removal of previous nodes from a rights set. Thus, the rights sets can be maintained to selectively point to current interest objects, while previous objects can be maintained or eliminated, depending on the system configuration. Such information can be maintained in conveyance objects that represent parties and prior interests. Whether or not the objects are removed, the system can specifically ignore them for rights calculations.

In one example, for a merger, 2808 MERGER branch, the system can create a combined object or merge object to represent the merged interest, 2814. In one example, a conveyance transaction involves both a split and a merge, and the system will perform both operations. A single conveyance document may indicate multiple splits or multiple merges, or a combination, resulting in the repeating of the creating of objects for each interest created by the transaction.

In one example, the system will include the combined interest object in a rights set of a node object (e.g., it will be included in a sparse array), and the system will exclude source interest objects from the rights set, 2816. In one example, the system will always exclude parent objects or source objects from rights sets, and will only use Leaf node objects to represent interests. The parent objects with retained interests could be used to represent interests in one example, but it increases complexity of the system by having to traverse the objects and determine what rights are and are not retained. An implementation with creating new objects for retained interests and using only Leaf nodes for computations may increase the number of overall creation operations, but can significantly simplify the system. While the overall memory usage may not be reduced by using only Leaf nodes, if the parent nodes are maintained, the working memory will be considerably less by traversing only active Leaf nodes. Additionally, the interest computations will be significantly reduced with fewer computations needed, while also providing the likelihood of a more accurate result.

In one example, either after the creation of the merge (from 2816), or after the creation of the split (from 2812), the system can determine if the conveyance transaction involves additional interest conveyed, 2818. If there are more interests conveyed, 2818 YES branch, the system can again generate one or more interest objects for the next interest, 2804, and repeat the process for that interest. In there are no more interests conveyed, 2818 NO branch, in one example, the system can compute ownership interest including traversing the rights sets, 2820. The computing of the ownership interest may or may not occur in conjunction with the processing of the conveyance document interest, but the system can compute the interests after the conveyance information is processed. The computation operations will include traversing the objects and rights sets affected in response to the conveyance information.

In general, in one example, a method for land use rights management includes: identifying a transfer of one of multiple land use rights in real property from a conveyance document; generating a computer object to represent ownership interests in the real property in response to identifying the transfer, including defining a bounded space for the one of multiple land use rights of the transfer, where a portion of a whole right is a specifically designated subspace having specific starting and ending points within the bounded space; and generating a rights set to indicate an ownership interest in the real property, the rights set configured to include an array of computer objects related to a specific ownership interest; wherein when the transfer conveys a split of a land use right to separate parties, the generating the computer object includes generating separate computer objects for the separate parties, with each computer object identifying separate bounded subspaces to represent split rights for the separate parties, and generating the rights set includes identifying separate computer objects for separate rights sets; and wherein when the transfer conveys a land use right to a party with another ownership interest in the land use right, the generating the computer object includes merging the other ownership interest in the land use right in a single computer object that represents the other ownership interest and the conveyed land use right, including combining bounded subspaces for a common land use right, and generating the rights set includes identifying the single computer object with the merged ownership interest and not other computer objects with non-merged ownership interests.

In one example, generating the rights set comprises generating a pointer to an array of computer objects that indicate the specific ownership interest. In one example, generating the rights set comprises generating a pointer to a sparse array. In one example, the sparse array has an identifier of the bounded space as an index. In one example, the method further comprising: calculating ownership interests in the real property by performing set operations on the computer objects of the array. In one example, performing the set operations comprises performing the set operations only on computer objects that have an interest that has not been conveyed. In one example, further comprising maintaining computer objects where all interests have been conveyed, but not including these computer objects in the array. In one example, the computer object further includes a pointer to an array of objects that represent lease information for land use rights.

In general, in one aspect, a computing device for land use management includes: a memory device to store computer objects to represent ownership interests in real property, the computer objects including a bounded space for a land use right, where a portion of a whole right is a specifically designated subspace having specific starting and ending points within the bounded space, the memory device to further store rights sets to indicate an ownership interest in the real property, wherein a rights set is configured to include an array of computer objects related to a specific ownership interest; and a processor to identify a transfer of one of multiple land use rights in the real property from a conveyance document, and generate computer objects to represent the transfer, wherein when the transfer is to split land use right to separate parties, the generation includes generation of separate computer objects for the separate parties, with each computer object to identify separate bounded subspaces to represent split rights for the separate parties, wherein when the transfer is to merge land use rights to a single party, the generation includes merger of ownership interests in the land use right in a single computer object to represent the merged land use rights, including combined bounded subspaces for a common land use right, wherein the processor is to include the separate computer objects for separate rights sets for a split, and wherein the processor is to include the single computer object for a rights set for a merge and exclude computer objects from the rights set for a merge that represent where the merged rights were derived.

In one example, the processor is configured to generate a pointer to an array of computer objects that indicate the specific ownership interest to represent the rights set. In one example, the processor is configured to generate a pointer to a sparse array of computer objects to represent the rights set. In one example, the sparse array has an identifier of the bounded space as an index. In one example, the processor is configured to calculate ownership interests in the real property by execution of set operations on the computer objects of the array. In one example, execution of the set operations by the processor comprises the processor to execute the set operations only on computer objects that have an interest that has not been conveyed. In one example, the processor is configured to maintain in the memory device computer objects where all interests have been conveyed, but not point to these computer objects in the array. In one example, the computer object further includes a pointer to an array of objects that represent lease information for land use rights.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for land use rights management, comprising:
    identifying a transfer of one of multiple land use rights in real property from a conveyance document;
    generating a computer object to represent ownership interests in the real property in response to identifying the transfer, including defining a bounded space for the one of multiple land use rights of the transfer, where a portion of a whole right is a specifically designated subspace having specific starting and ending points within the bounded space; and
    generating a rights set to indicate an ownership interest in the real property, the rights set configured to include an array of computer objects related to a specific ownership interest;
    wherein when the transfer conveys a split of a land use right to separate parties, the generating the computer object includes generating separate computer objects for the separate parties, with each computer object identifying separate bounded subspaces to represent split rights for the separate parties, and generating the rights set includes identifying separate computer objects for separate rights sets; and
    wherein when the transfer conveys a land use right to a party with another ownership interest in the land use right, the generating the computer object includes merging the other ownership interest in the land use right in a single computer object that represents the other ownership interest and the conveyed land use right, including combining bounded subspaces for a common land use right, and generating the rights set includes identifying the single computer object with the merged ownership interest and not other computer objects with non-merged ownership interests.

2. The method of claim 1, wherein generating the rights set comprises generating a pointer to an array of computer objects that indicate the specific ownership interest.

3. The method of claim 2, wherein generating the rights set comprises generating a pointer to a sparse array.

4. The method of claim 3, wherein the sparse array has an identifier of the bounded space as an index.

5. The method of claim 1, further comprising:
    calculating ownership interests in the real property by performing set operations on the computer objects of the array.

6. The method of claim 5, wherein performing the set operations comprises performing the set operations only on computer objects that have an interest that has not been conveyed.

7. The method of claim 6, further comprising maintaining computer objects where all interests have been conveyed, but not including these computer objects in the array.

8. The method of claim 1, wherein the computer object further includes a pointer to an array of objects that represent lease information for land use rights.

9. A computing device for land use management, comprising:
    a memory device to store computer objects to represent ownership interests in real property, the computer objects including a bounded space for a land use right, where a portion of a whole right is a specifically designated subspace having specific starting and ending points within the bounded space, the memory device to further store rights sets to indicate an ownership interest in the real property, wherein a rights set is configured to include an array of computer objects related to a specific ownership interest; and
    a processor to identify a transfer of one of multiple land use rights in the real property from a conveyance document, and generate computer objects to represent the transfer,
    wherein when the transfer is to split land use right to separate parties, the generation includes generation of separate computer objects for the separate parties, with each computer object to identify separate bounded subspaces to represent split rights for the separate parties,
    wherein when the transfer is to merge land use rights to a single party, the generation includes merger of ownership interests in the land use right in a single computer object to represent the merged land use rights, including combined bounded subspaces for a common land use right,
    wherein the processor is to include the separate computer objects for separate rights sets for a split, and wherein the processor is to include the single computer object for a rights set for a merge and exclude computer objects from the rights set for a merge that represent where the merged rights were derived.

10. The computing device of claim 9, wherein the processor is configured to generate a pointer to an array of computer objects that indicate the specific ownership interest to represent the rights set.

11. The computing device of claim 10, wherein the processor is configured to generate a pointer to a sparse array of computer objects to represent the rights set.

12. The computing device of claim 11, wherein the sparse array has an identifier of the bounded space as an index.

13. The computing device of claim 9, wherein the processor is configured to calculate ownership interests in the real property by execution of set operations on the computer objects of the array.

14. The computing device of claim 13, wherein execution of the set operations by the processor comprises the processor to execute the set operations only on computer objects that have an interest that has not been conveyed.

15. The computing device of claim 14, wherein the processor is configured to maintain in the memory device computer objects where all interests have been conveyed, but not point to these computer objects in the array.

16. The computing device of claim 9, wherein the computer object further includes a pointer to an array of objects that represent lease information for land use rights.

* * * * *